(12) United States Patent
Klass et al.

(10) Patent No.: US 11,268,026 B2
(45) Date of Patent: Mar. 8, 2022

(54) LIQUID-CRYSTALLINE MEDIUM

(71) Applicant: Merck Patent GmbH, Darmstadt (DE)

(72) Inventors: Dagmar Klass, Darmstadt (DE); Carsten Fritzsch, Darmstadt (DE)

(73) Assignee: Merck Patent GmbH, Darmstadt (DE)

(*) Notice: Subject to any disclaimer, the term of this patent is extended or adjusted under 35 U.S.C. 154(b) by 52 days.

(21) Appl. No.: 16/361,687

(22) Filed: Mar. 22, 2019

(65) Prior Publication Data
US 2019/0292458 A1 Sep. 26, 2019

(30) Foreign Application Priority Data
Mar. 23, 2018 (EP) .................................... 18163715

(51) Int. Cl.
| | | |
|---|---|---|
| G02F 1/1333 | (2006.01) | |
| C09K 19/30 | (2006.01) | |
| C09K 19/54 | (2006.01) | |
| H01Q 1/38 | (2006.01) | |
| C09K 19/04 | (2006.01) | |
| H01Q 21/22 | (2006.01) | |
| C09K 19/18 | (2006.01) | |
| C09K 19/12 | (2006.01) | |

(52) U.S. Cl.
CPC .......... C09K 19/3098 (2013.01); C09K 19/04 (2013.01); C09K 19/3003 (2013.01); C09K 19/54 (2013.01); H01Q 1/38 (2013.01); C09K 2019/0444 (2013.01); C09K 2019/0448 (2013.01); C09K 2019/123 (2013.01); C09K 2019/181 (2013.01); C09K 2019/183 (2013.01); C09K 2019/3016 (2013.01); H01Q 21/22 (2013.01)

(58) Field of Classification Search
CPC ............... C09K 19/3098; C09K 19/04; C09K 19/3003; C09K 19/54; C09K 2019/0444; C09K 2019/0448; C09K 2019/123; C09K 2019/181; C09K 2019/183; C09K 2019/3016; G02F 1/1333; H01Q 1/38; H01Q 21/22
USPC .................................................. 252/299.63
See application file for complete search history.

(56) References Cited

U.S. PATENT DOCUMENTS

| | | | |
|---|---|---|---|
| 6,569,505 B2 * | 5/2003 | Poetsch .................. | C09K 19/02 252/299.66 |
| 7,361,288 B2 | 4/2008 | Lussem et al. | |
| 9,593,279 B2 | 3/2017 | Wittek et al. | |
| 2005/0067605 A1 | 3/2005 | Lussem et al. | |
| 2016/0040066 A1 | 2/2016 | Wittek et al. | |
| 2017/0130129 A1 | 5/2017 | Wittek et al. | |
| 2019/0352564 A1* | 11/2019 | Klass .................. | C09K 19/3059 |

FOREIGN PATENT DOCUMENTS

| | | |
|---|---|---|
| DE | 102004029429 A1 | 2/2005 |
| EP | 1126006 A2 | 8/2001 |
| EP | 2982730 A1 | 2/2016 |
| JP | 2005-120208 A | 5/2005 |

OTHER PUBLICATIONS

Search report in corresponding EP19163932.7 dated Jul. 27, 2019 (pp. 1-6).
English Abstract of JP 2005-120208 A published May 12, 2005.

* cited by examiner

*Primary Examiner* — Geraldina Visconti
(74) *Attorney, Agent, or Firm* — Millen White Zelano and Branigan, PC; Csaba Henter

(57) ABSTRACT

Liquid-crystalline media containing one or more compounds of formula T $$R^T \!-\!\!\left[\!A^{T1}\!\right]_t\!\!-\!\!A^{T2}\!\!-\!\!A^{T3}\!-\!NCS$$

and one or more compounds of formulae I, II and/or III, $$R^1 \!-\!\!\left[\!A^{11}\!\right]_n\!\!-\!\!A^{12}\!\!-\!\!A^{13}\!-\!NCS \quad \text{I}$$

$$R^2 \!-\!\!A^{21}\!-\!Z^{21}\!-\!A^{22}\!-\!NCS \quad \text{II}$$

$$R^2 \!-\!\!A^{31}\!-\!Z^{31}\!-\!A^{32}\!-\!Z^{32}\!-\!A^{33}\!-\!NCS \quad \text{III}$$

high-frequency components containing these media, especially microwave components for high-frequency devices, such as devices for shifting the phase of microwaves, tunable filters, tunable metamaterial structures, and electronic beam steering antennas, e.g., phased array antennas.

23 Claims, No Drawings

LIQUID-CRYSTALLINE MEDIUM

The present invention relates to liquid-crystalline media and to high-frequency components comprising these media, especially microwave components for high-frequency devices, such as devices for shifting the phase of microwaves, tunable filters, tunable metamaterial structures, and electronic beam steering antennas (e.g. phased array antennas).

Liquid-crystalline media have a been used for many years in electro-optical displays (liquid crystal displays: LCDs) in order to display information. More recently, however, liquid-crystalline media have also been proposed for use in components for microwave technology, such as, for example, in DE 10 2004 029 429.1 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, Ph. Gelin, C. Legrand: Electrically Microwave Tunable Components Using Liquid Crystals. $32^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the wave-guide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters. It has already investigated liquid-crystalline media with respect to their properties in the corresponding frequency range. It describes liquid-crystalline media based on mixtures of mostly aromatic nitriles and isothiocyanates; in EP 2 982 730 A1, mixtures are described that completely consist of isothiocyanate compounds. However, these compositions are all still afflicted with several disadvantages as for example high dielectric loss or inadequate phase shift or inadequate material quality, resulting in limited performance in devices operating in the microwave regime. Further it is required to improve these media with respect to their general physical properties, such as, the clearing point, the phase range, especially their storage stability at low temperatures, and their viscosities, in particular their rotational viscosity.

The known devices for high frequency-technology comprising these media do still lack sufficient stability and, in particular, fast response.

For these applications, liquid-crystalline media having particular, hitherto rather unusual and uncommon properties or combinations of properties are required.

In particular, the dielectric loss in the microwave region must be reduced and the material quality ($\eta$, also known as "figure of merit" (FoM) i.e., a high tunability and a low dielectric loss) must be improved. Besides these requirements the focus must increasingly be directed to improved response times especially for those devices using planar structures such as e.g. phase shifters and leaky antennas.

In addition, there is a steady demand for an improvement in the low-temperature behaviour of the components. Both an improvement in the operating properties at low temperatures and also in the shelf life are necessary here. Especially upon cooling, the formation of smectic phases or crystallisation is undesired and may even lead to the destruction of a display device. The existence of a nematic phase without formation of smectic phases or crystallisation at low temperatures and over a period of time sufficient for the operation of a device is referred to as low temperature stability (LTS).

Therefore, there is a considerable demand for liquid-crystalline media having suitable properties for corresponding practical applications.

Surprisingly, it has been found that it is possible to achieve liquid-crystalline media having a high dielectric anisotropy, suitably fast switching times, a suitable, nematic phase range, high tunability and low dielectric loss, which do not have the disadvantages of the prior-art materials, or at least only do so to a considerably reduced extent, by using compounds of formula T below. The liquid-crystalline media are further distinguished by a very good LTS.

The present invention relates to liquid-crystalline media comprising one or more compounds of formula T

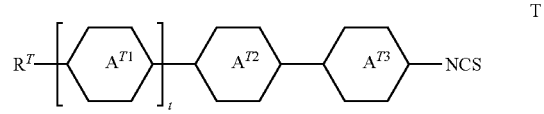

in which
$R^T$ denotes halogen, CN, NCS, $R^F$, $R^F$—O— or $R^F$—S—, wherein $R^F$ denotes fluorinated alkyl or fluorinated alkenyl having up to 12 C atoms,

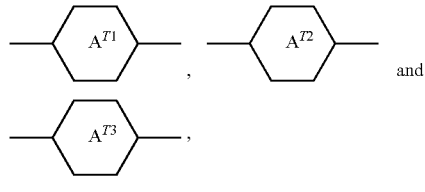

on each occurrence, independently of one another, denote

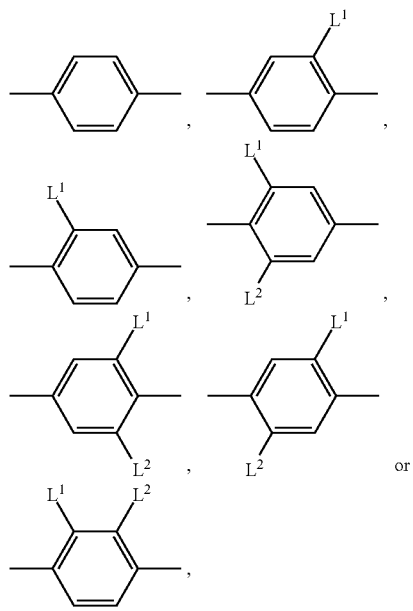

in which
$L^1$ and $L^2$ identically or differently, denote F, Cl or methyl, preferably F;
preferably

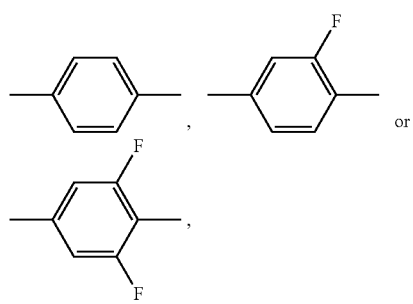

t is 0, 1 or 2, preferably 1;
and
one or more compounds selected from the group of compounds of formulae I, II and III,

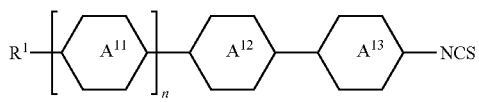

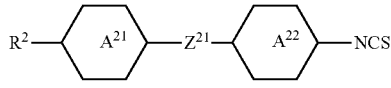

in which
$R^1$ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more $CH_2$— groups may be replaced by

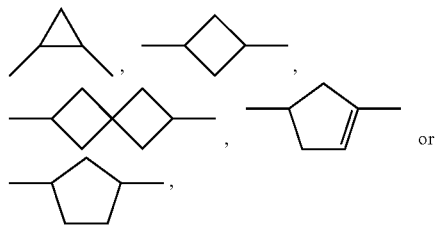

preferably unfluorinated alkyl or unfluorinated alkenyl,
n is 0, 1 or 2,

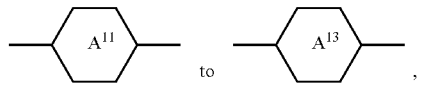

on each occurrence, independently of one another, denote

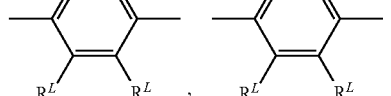

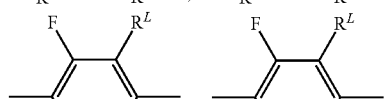

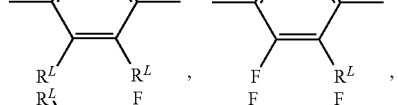

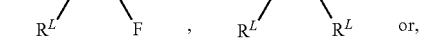

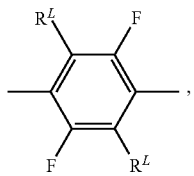
in which $R^L$, on each occurrence, identically or differently, denotes H or alkyl having 1 to 6 C atoms, preferably H, methyl or ethyl, particularly preferably H,
and wherein
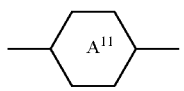
alternatively denotes
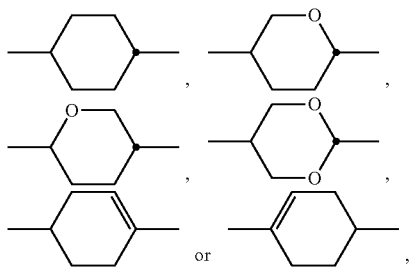
preferably
and in case n=2, one of
preferably denotes
and the other preferably denotes
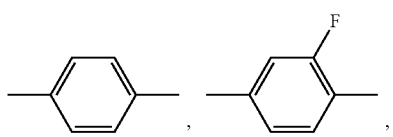
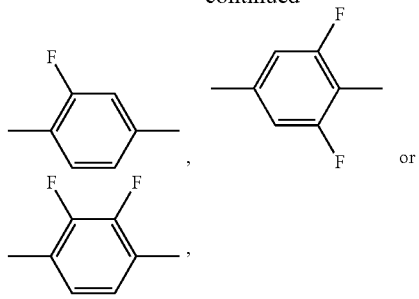
preferably
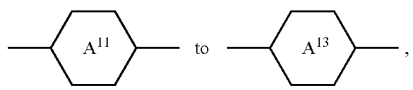
independently of one another, denote
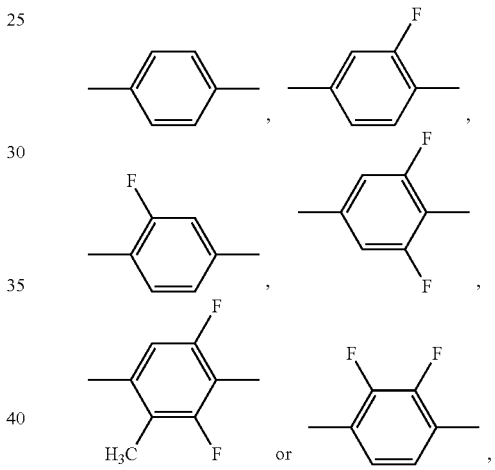
more preferably
denotes
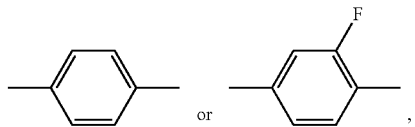
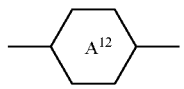

denotes

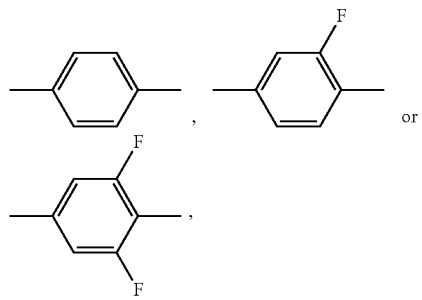

denotes

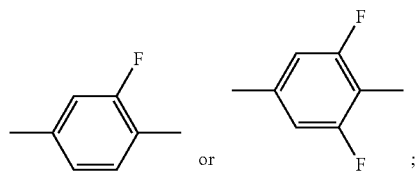

$R^2$ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more $CH_2$-groups may be replaced by

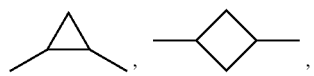

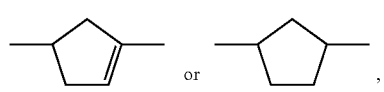

preferably unfluorinated alkyl or unfluorinated alkenyl,
$Z^{21}$ denotes trans-CH=CH—, trans-CF=CF— or —C≡C—, preferably —C≡C— or trans-CH=CH—, and

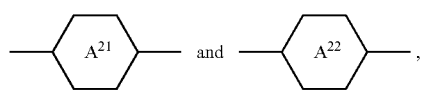

independently of one another, denote

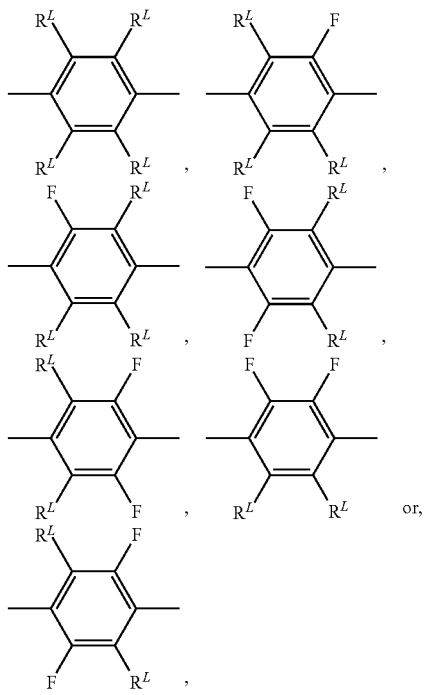

in which $R^L$, on each occurrence, identically or differently, denotes H or alkyl having 1 to 6 C atoms, preferably H, methyl or ethyl, particularly preferably H,
and wherein
preferably

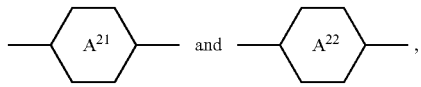

independently of one another, denote

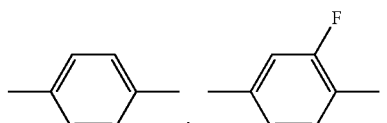

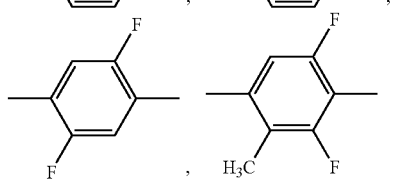

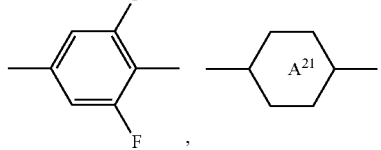

preferably denotes

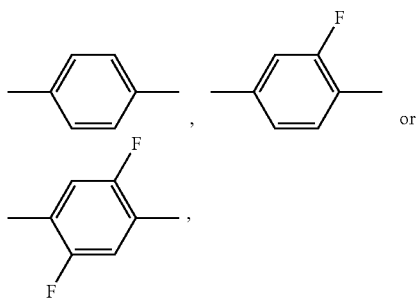

and

preferably denotes

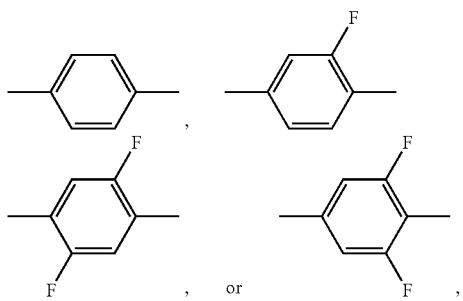

more preferably

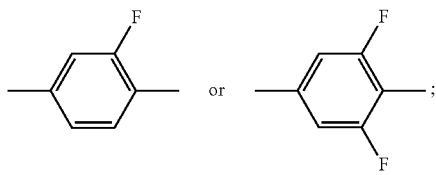

$R^3$ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more $CH_2$-groups may be replaced by

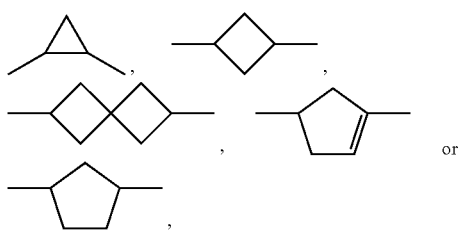

preferably unfluorinated alkyl or unfluorinated alkenyl, one of $Z^{31}$ and $Z^{32}$, preferably $Z^{32}$; denotes trans-CH=CH—, trans-CF=CF— or —C≡C— and the other one, independently thereof, denotes —C≡C—, trans-CH=CH—, trans-CF=CF— or a single bond, preferably one of them, preferably $Z^{32}$; denotes —C≡C— or trans-CH=CH— and the other denotes a single bond, and

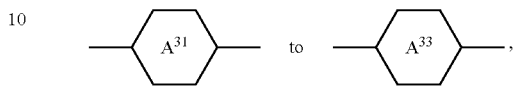

independently of one another, denote

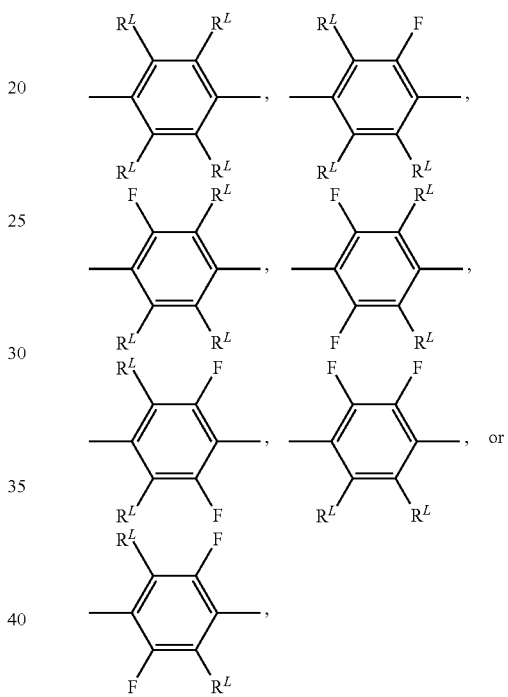

in which $R^L$, on each occurrence, identically or differently, denotes H or alkyl having 1 to 6 C atoms, preferably H, methyl or ethyl, particularly preferably H,
and wherein

alternatively independently denotes

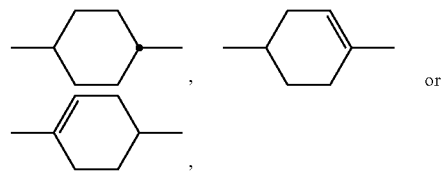

preferably

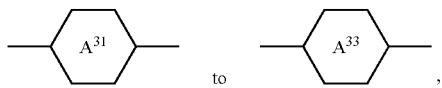

to , independently of one another, denote

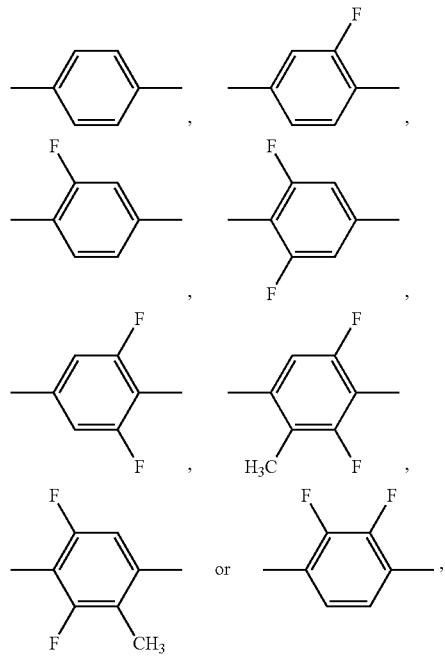

more preferably

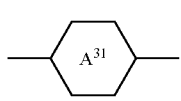

denotes

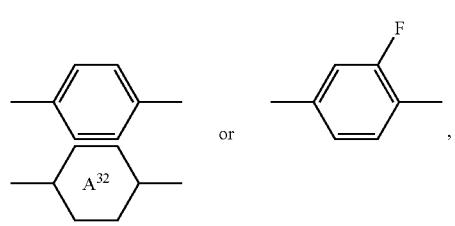

or , denotes

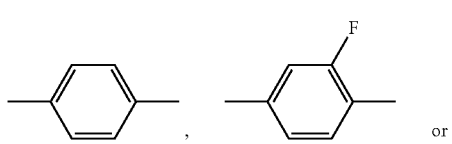

, or

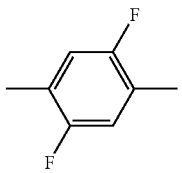

in particular

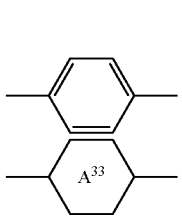 or 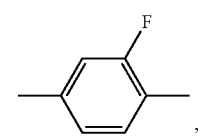

denotes

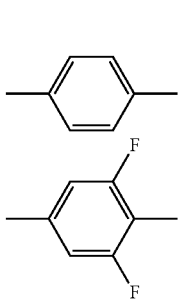 , 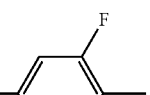 or

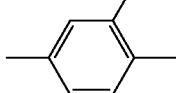

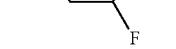 , in particular

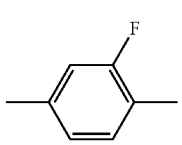 or 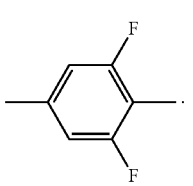 .

In the compounds of the formulae I, II and III, $R^L$ preferably denotes H.

In another preferred embodiment, in the compounds of formulae I, II and III, one or two groups $R^L$, preferably one group $R^L$ is different from H.

The media according to the present invention are distinguished by a high clearing temperature, a broad nematic phase range and excellent LTS. As a result, devices containing the media are operable under extreme temperature conditions.

The media are further distinguished by a high values of the dielectric anisotropy and a low rotational viscosities. As a result, the threshold voltage, i.e. the minimum voltage at which a device is switchable, is very low. A low operating voltage and low threshold voltage is desired in order to enable a device having improved switching characteristics and high energy efficiency. Low rotational viscosities enable fast switching of the devices according to the invention.

These properties as a whole make the media particularly suitable for use in components and devices for high-frequency technology and applications in the microwave range, in particular devices for shifting the phase of microwaves, tunable filters, tunable metamaterial structures, and electronic beam steering antennas (e.g. phased array antennas).

A further object of the present invention are components operable in the microwave region of the electromagnetic spectrum and devices comprising said components.

Preferred components are phase shifters, varactors, wireless and radio wave antenna arrays, matching circuits, adaptive filters and others.

Halogen is F, Cl, Br or I, preferably F or Cl, particularly preferably F.

In case $R^F$ denotes a halogenated alkyl- or alkenyl, it can be branched or unbranched. Preferably it is unbranched, mono-poly or perfluorinated, preferably perfluorinated and has 1, 2, 3, 4, 5, 6 or 7 C atoms, in case of alkenyl 2, 3, 4, 5, 6 or 7 C atoms.

$R^T$ preferably denotes CN, NCS, Cl, F, $-(CH_2)_n-CH=CF_2$, $-(CH_2)_n-CH=CHF$, $-(CH_2)_n-CH=Cl_2$, $-C_nF_{2n+1}$, $-(CF_2)_n-CF_2H$, $-(CH_2)_n-CF_3$, $-(CH_2)_n-CHF_2$, $-(CH_2)_nCH_2F$, $-CH=CF_2$, $-O(CH_2)_n-CH=CF_2$, $-O(CH_2)_nCHCl_2$, $-OC_nF_{2n+1}$, $-O(CF_2)_n-CF_2H$, $-O(CH_2)_nCF_3$, $-O(CH_2)_n-CHF_2$, $-O(CF)_nCH_2F$, $-OCF=CF_2$, $-SC_nF_{2n+1}$, $-S(CF)_n-CF_3$, wherein n is an integer from 0 to 7.

In a preferred embodiment, the liquid crystalline media according to the invention comprise one or more compounds selected from the group of compounds of the formulae T-1 and T-2,

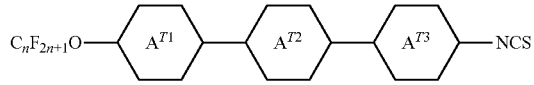

T-1

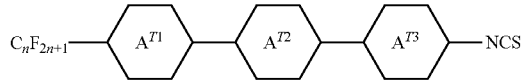

T-2 in which

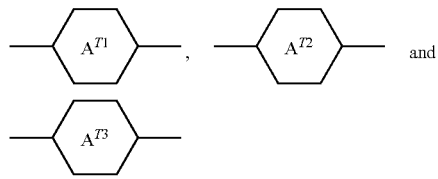

have the meanings given above for formula T, and n is 1, 2, 3, 4, 5, 6 or 7, preferably 1, 2, 3 or 4, particularly preferably 1.

In a particularly preferred embodiment of the present invention the media comprise one or more compounds of formula T-1.

Preferred compounds of formula T-1 are selected from the group of compounds of the following sub-formulae:

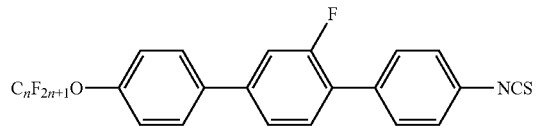

T-1a

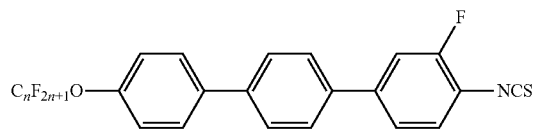

T-1b

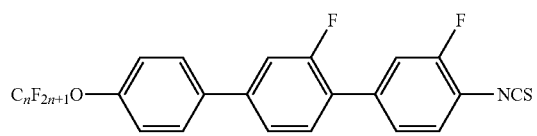

T-1c

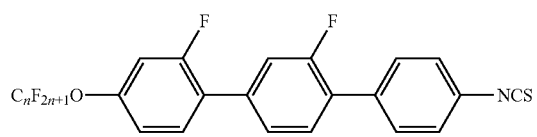

T-1d

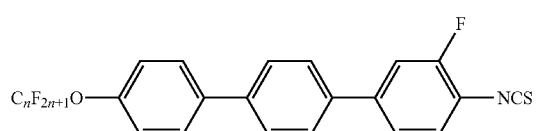

T-1e

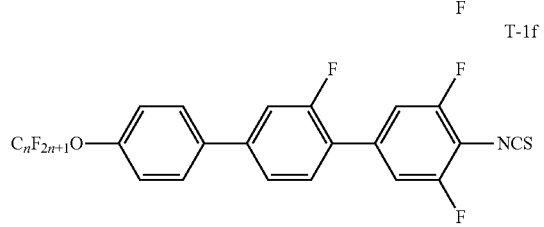

T-1f in which n is 1, 2, 3 or 4, preferably 1.

Very preferably, the medium according to the invention comprises one or more compounds of formula T-1e.

In another particularly preferred embodiment of the present invention the media comprise one or more compounds of formula T-2.

Preferred compounds of formula T-2 are selected from the group of compounds of the following sub-formulae:

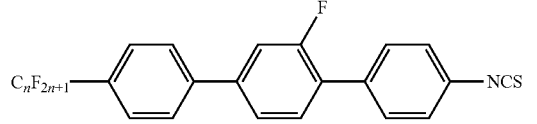

T-2a

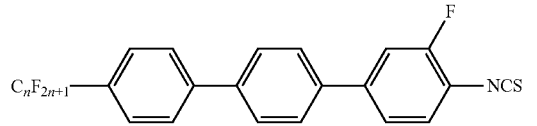

T-2b

-continued

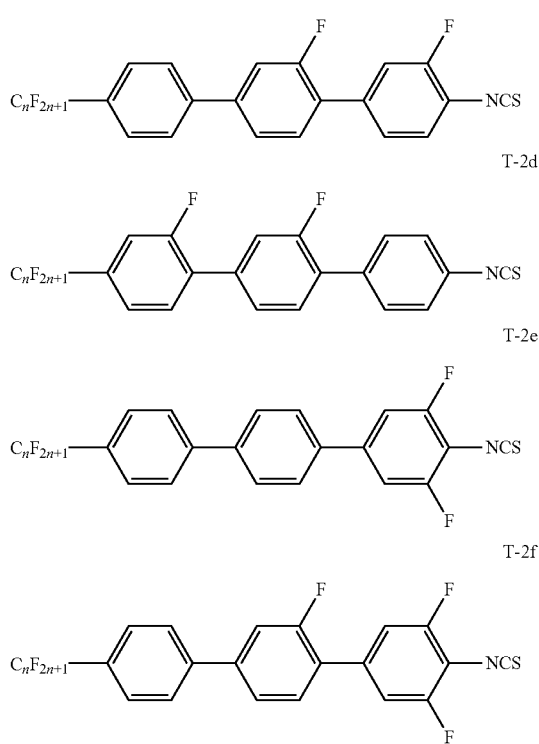

in which n is 1, 2, 3 or 4, preferably 1.

In a preferred embodiment of the present invention, the compounds of formula I are selected from the group of compounds of the formulae I-1 to I-5:

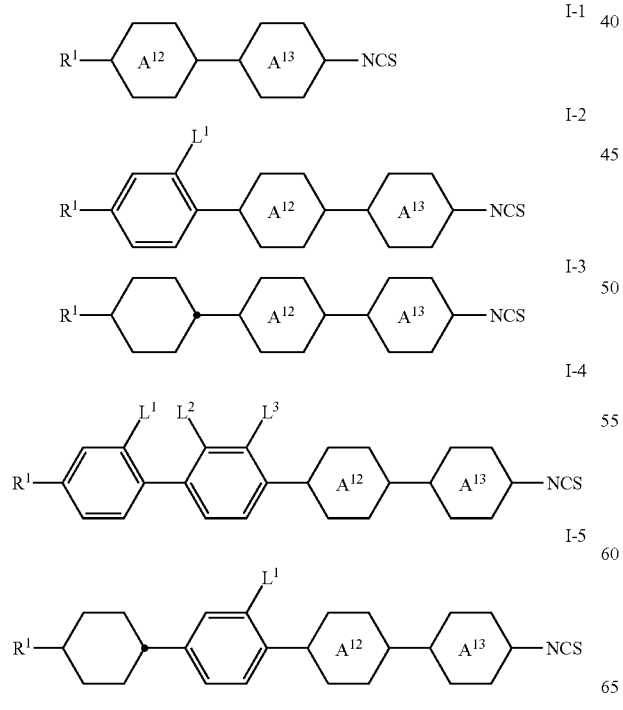

in which

L¹, L² and L³ on each occurrence, identically or differently, denote H or F, and the other groups have the respective meanings indicated above for formula I and preferably R¹ denotes unfluorinated alkyl having 1 to 7 C atoms or unfluorinated alkenyl having 2 to 7 C atoms.

The media preferably comprise one or more compounds of formula I-1, which are preferably selected from the group of the compounds of the formulae I-1a to I-1d, preferably of formula I-1b:

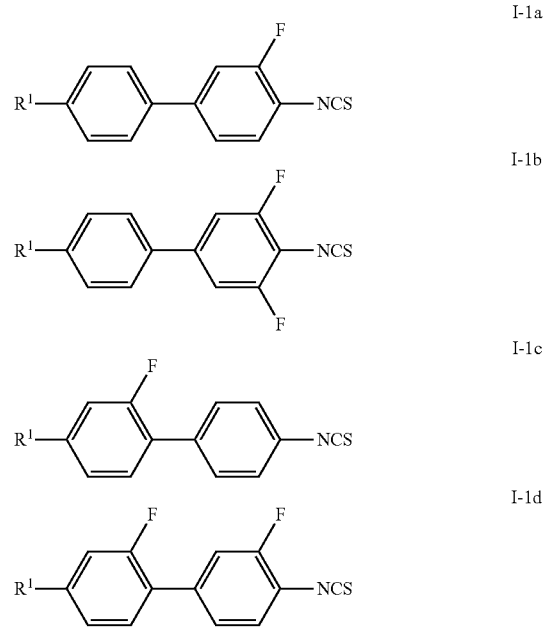

in which R¹ has the meaning indicated above for formula I and preferably denotes unfluorinated alkyl having 1 to 7 C atoms or unfluorinated alkenyl having 2 to 7 C atoms.

The media preferably comprise one or more compounds of formula I-2, which are preferably selected from the group of the compounds of the formulae I-2a to I-2e, preferably of formula I-2c:

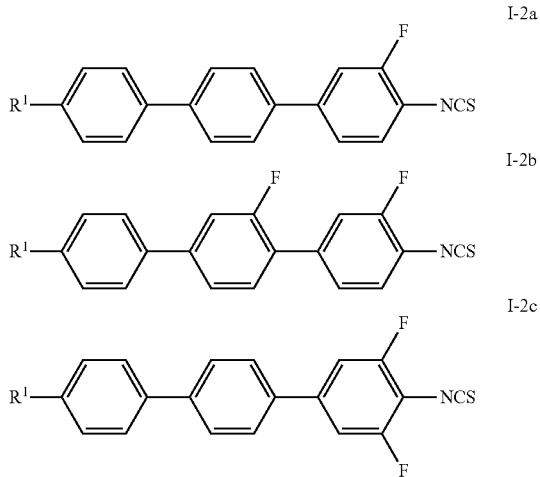

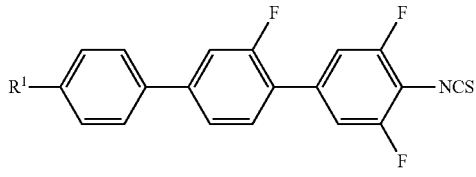
I-2d

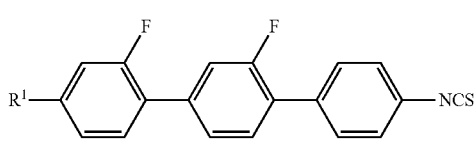
I-2e in which R¹ has the meaning indicated above for formula I and preferably denotes unfluorinated alkyl having 1 to 7 C atoms or unfluorinated alkenyl having 2 to 7 C atoms.

The media preferably comprise one or more compounds of formula I-3, which are preferably selected from the group of the compounds of the formulae I-3a to I-3d, particularly preferably of formula I-3b:

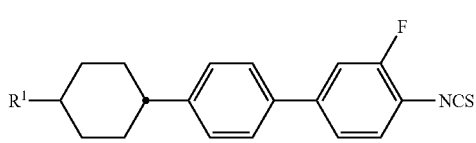
I-3a

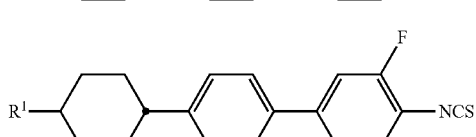
I-3b

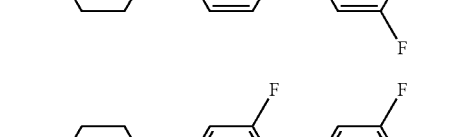
I-3c

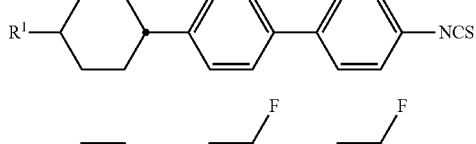
I-3d in which R¹ has the meaning indicated above for formula I and preferably denotes unfluorinated alkyl having 1 to 7 C atoms or unfluorinated alkenyl having 2 to 7 C atoms.

The media preferably comprise one or more compounds of formula I-4, which are preferably selected from the group of the compounds of the formulae I-4a to I-4e, particularly preferably of formula I-4b:

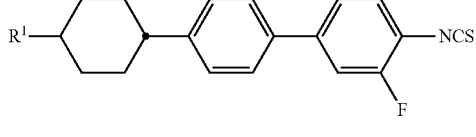
I-4a

I-4b

I-4c

I-4d

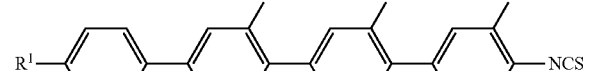
I-4e in which R¹ has the meaning indicated above for formula I and preferably denotes unfluorinated alkyl having 1 to 7 C atoms or unfluorinated alkenyl having 2 to 7 C atoms.

The media preferably comprise one or more compounds of formula I-5, which are preferably selected from the group of the compounds of the formulae I-5a to I-5d, particularly preferably of formula I-5b:

I-5a

I-5b

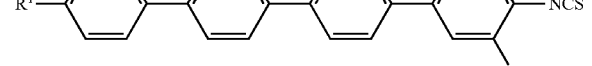
I-5c

-continued

I-5d

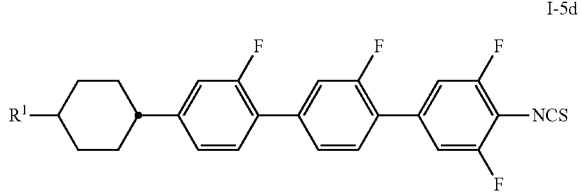

in which R¹ has the meaning indicated above for formula I and preferably denotes unfluorinated alkyl having 1 to 7 C atoms or unfluorinated alkenyl having 2 to 7 C atoms.

The media preferably comprise one or more compounds of formula II, which are preferably selected from the group of the compounds of the formulae II-1 to II-3, preferably selected from the group of the compounds of the formulae II-1 and II-2:

II-1

II-2

II-3

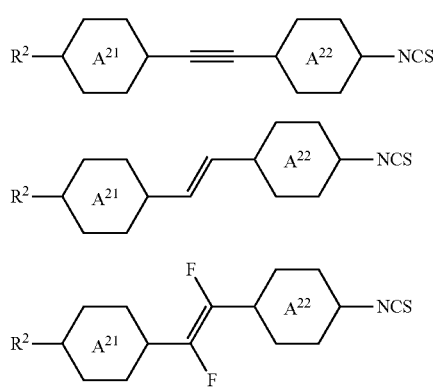

in which the occurring groups have the meanings given under formula II above and preferably
R² denotes H, unfluorinated alkyl or alkoxy having 1 to 7 C atoms or unfluorinated alkenyl having 2 to 7 C atoms, and one of

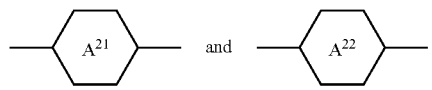

denotes

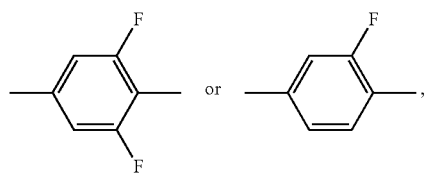

and the other, independently denotes

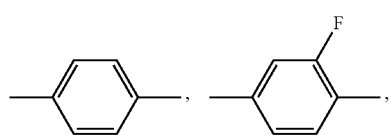

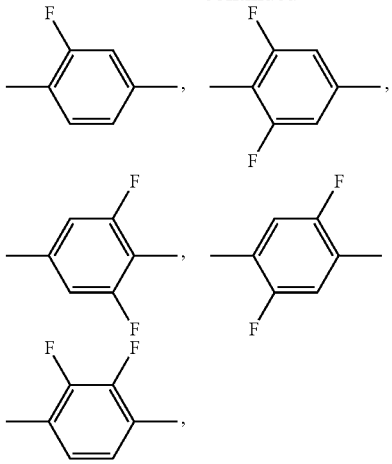

preferably

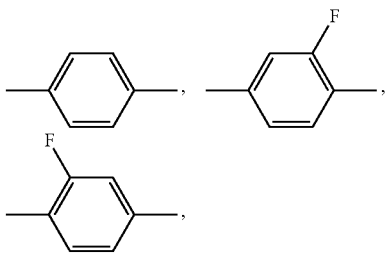

most preferably

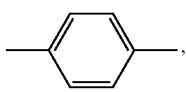

and preferably
R² denotes $C_nH_{2n+1}$ or $CH_2=CH-(CH_2)_z$, and
n denotes an integer in the range from 0 to 15, preferably in the range from 1 to 7 and particularly preferably 1 to 5, and
z denotes 0, 1, 2, 3 or 4, preferably 0 or 2.

The compounds of formula II-1 are preferably selected from the group of the compounds of the formulae II-1a to II-1e:

II-1a

II-1b

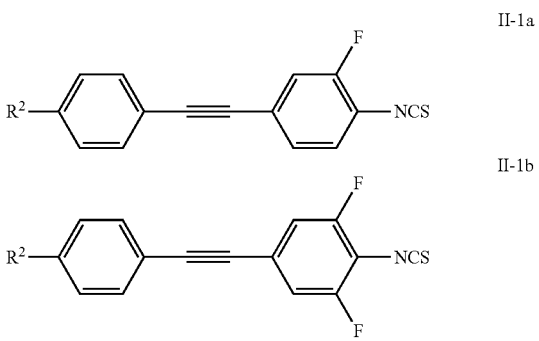

-continued

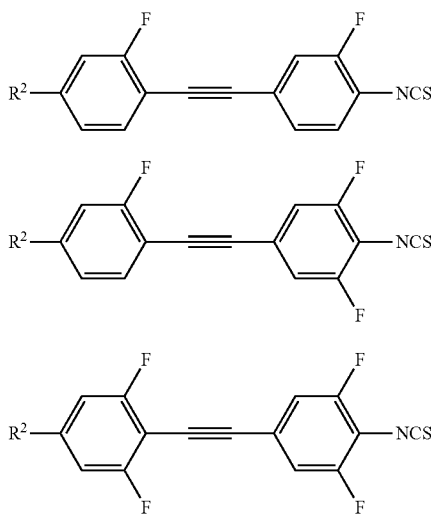

in which

R² has the meaning indicated above and preferably denotes $C_nH_{2n+1}$ or $CH_2=CH-(CH_2)_z$, and n independently of one another, denote an integer in the range from 0 to 15, preferably in the range from 1 to 7 and particularly preferably 1 to 5, and z denotes 0, 1, 2, 3 or 4, preferably 0 or 2.

The compounds of formula II-2 are preferably selected from the group of the compounds of the formulae II-2a and II-2b:

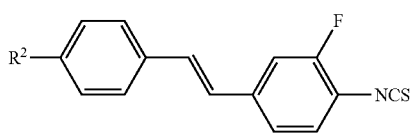

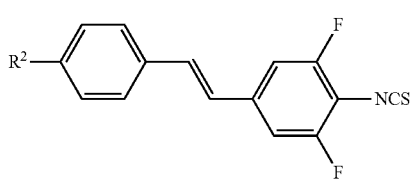

in which

R² has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula II-3 are preferably selected from the group of the of formulae II-3a to II-3d:

[Structures II-3a, II-3b, II-3c, II-3d shown]

in which

R² has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III are preferably selected from the group of the compounds of the formulae III-1 to III-6, more preferably of the formulae selected from the group of the compounds of the formulae III-1, III-2, III-3 and III-4, and particularly preferably of formula III-1:

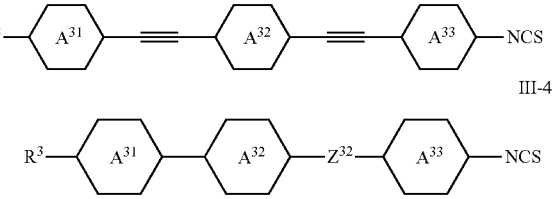

-continued

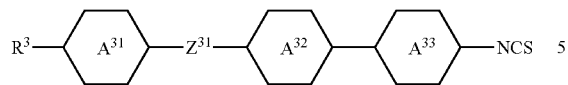
III-5

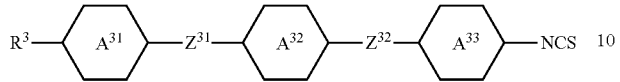
III-6 in which $Z^{31}$ and $Z^{32}$ independently of one another denote trans-CH=CH— or trans-CF=CF—, preferably trans-CH=CH—, and in formula III-6 alternatively one of $Z^{31}$ and $Z^{32}$ may denote —C≡C— and the other groups have the meaning given above under formula III, and preferably $R^3$ denotes H, unfluorinated alkyl or alkoxy having 1 to 7 C atoms or unfluorinated alkenyl having 2 to 7 C atoms, and one of

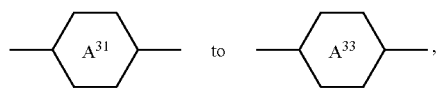

preferably

denotes

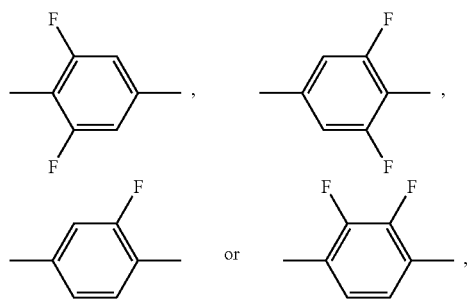

preferably

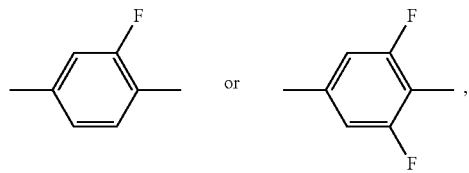

and the others, independently of one another, denote

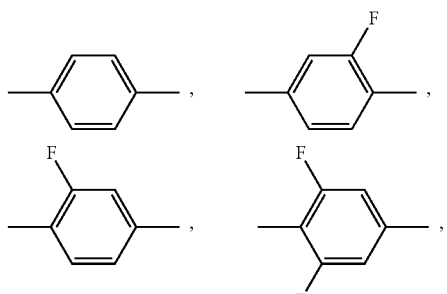

preferably

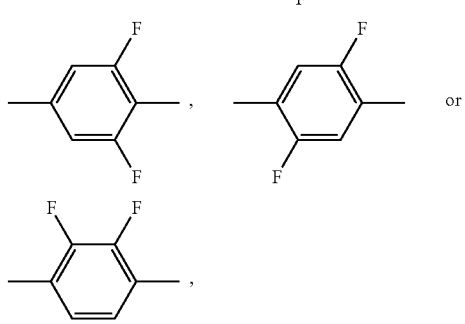

more preferably

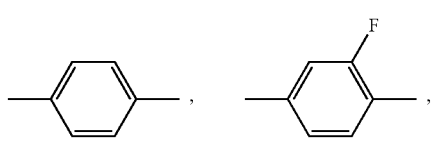

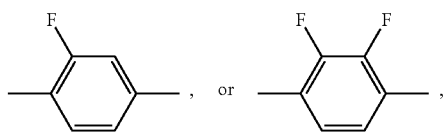

and preferably $R^3$ denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III-1 are preferably selected from the group of the compounds of the formulae III-1a to III-1f, more preferably selected from the group of the compounds of the formulae III-1a and III-1b, particularly preferably of formula III-1b:

III-1a
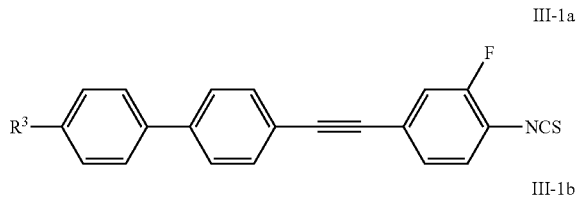

III-1b
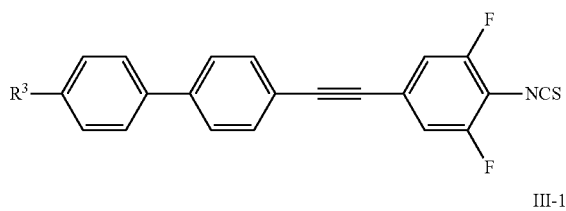

III-1c
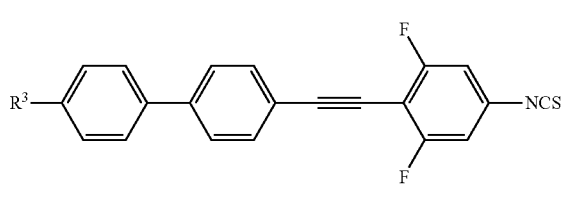

III-1d
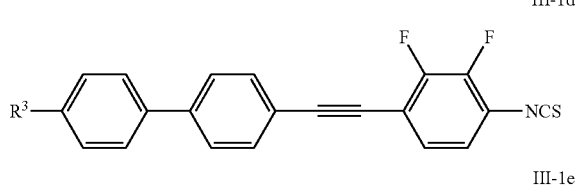

III-1e
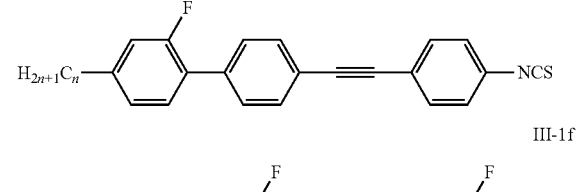

III-1f
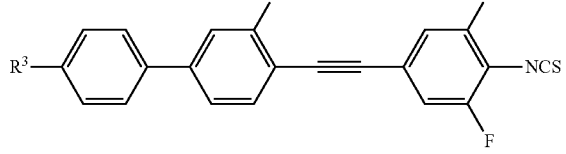

in which

R³ has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III-2 are preferably compounds of formula III-2a to III-2h:

III-2a
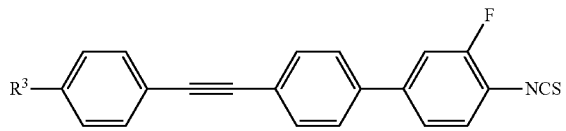

III-2b
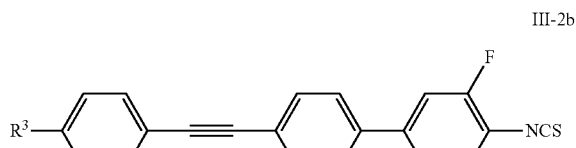

III-2c
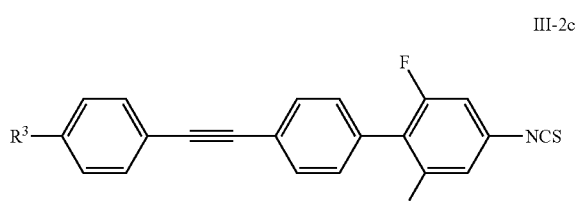

III-2d
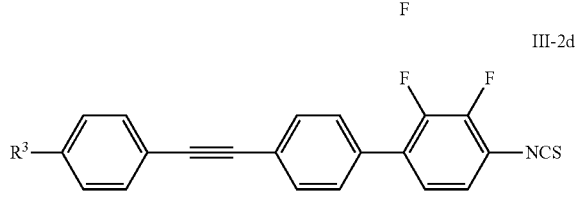

III-2e
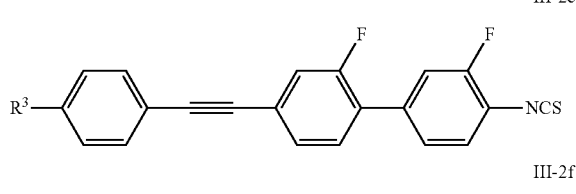

III-2f
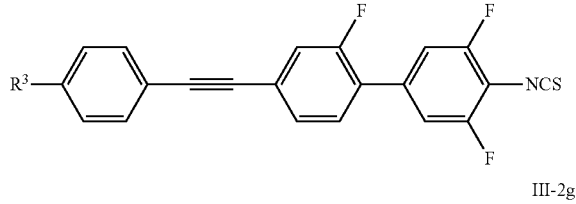

III-2g
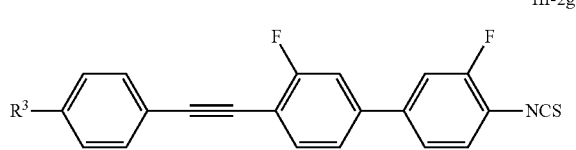

III-2h
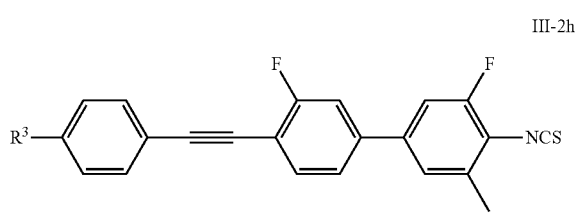

in which

R³ has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III-5 are preferably selected from the compounds of formula III-5a:

III-5a

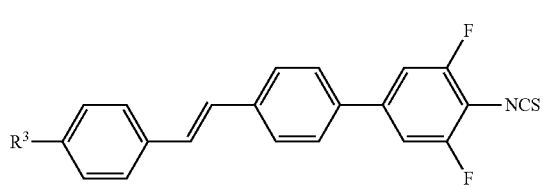

$R^3$ has the meaning indicated above for formula III-5 and preferably denotes $C_nH_{2n+1}$, in which n denotes an integer in the range from 0 to 7, preferably in the range from 1 to 5.

In a preferred embodiment, the media according to the invention comprise one or more compounds selected from the group of compounds of the formulae IIA-1 to IIA-12, very preferably IIA-1 or IIA-2:

IIA-1

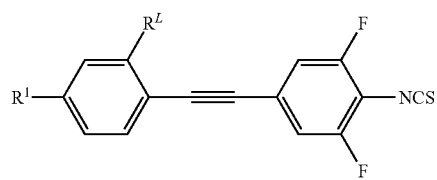

IIA-2

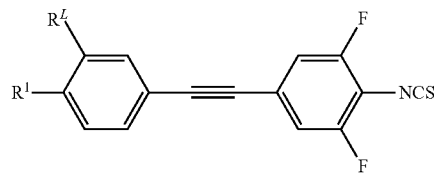

IIA-3

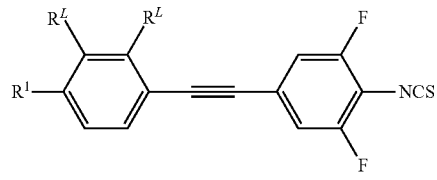

IIA-4

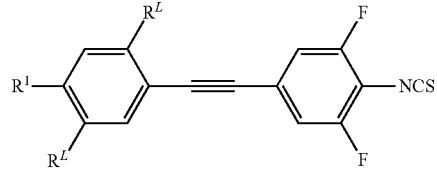

IIA-5

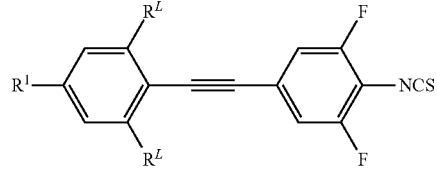

IIA-6

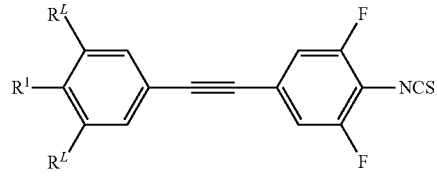

IIA-7

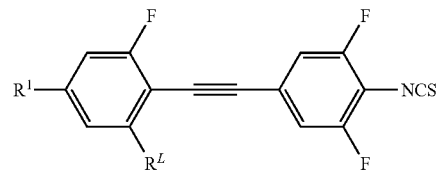

IIA-8

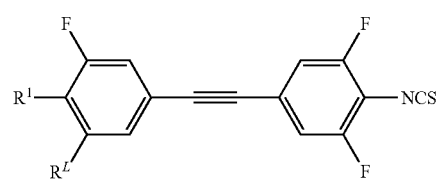

IIA-9

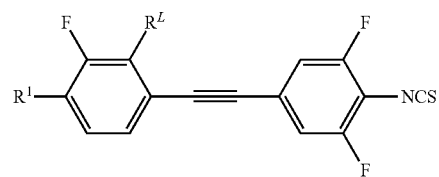

IIA-10

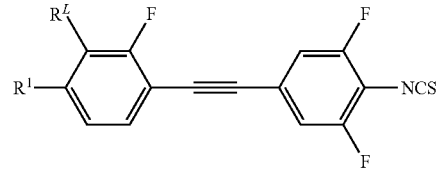

IIA-11

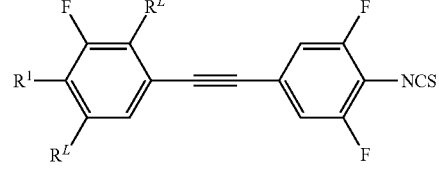

IIA-12

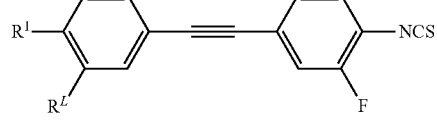

in which $R^1$ denotes alkyl or alkenyl having up to 7 C atoms, preferably ethyl, n-propyl, n-butyl or n-pentyl, n-hexyl, $R^L$ on each occurrence, the same or differently, denotes alkyl or alkenyl having 1 to 5 C atoms, or cycloalkyl or cycloalkenyl each having 3 to 6 C atoms, preferably methyl, ethyl, n-propyl, n-butyl, isopropyl, cyclopropyl, cyclobutyl, cyclopentyl or cyclopent-1-enyl, very preferably ethyl.

Additionally, the liquid-crystalline media according to the present invention in a certain embodiment, which may be the same or different from the previous preferred embodiments preferably comprise one or more compounds of formula IV,

IV

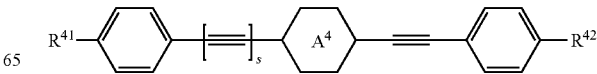

in which

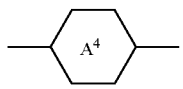

denotes

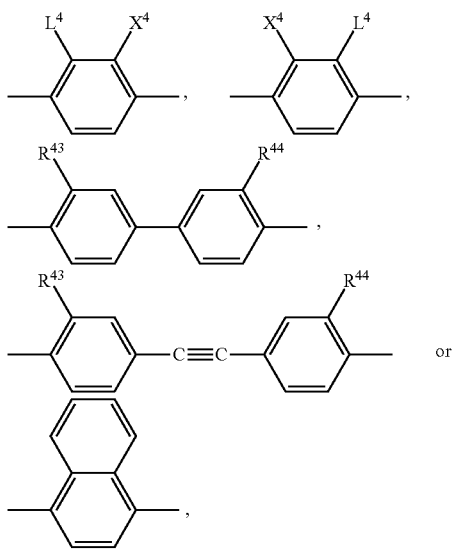

s is 0 or 1, preferably 1, and
preferably

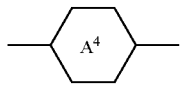

denotes

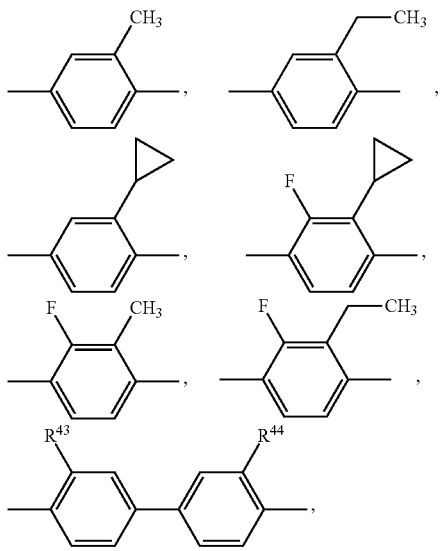

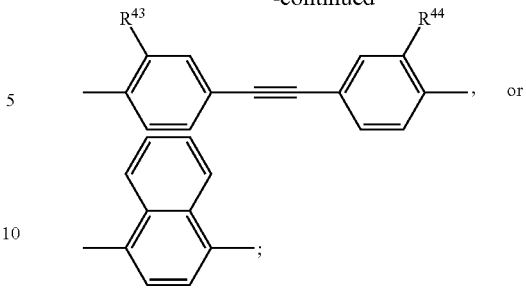

particularly preferably

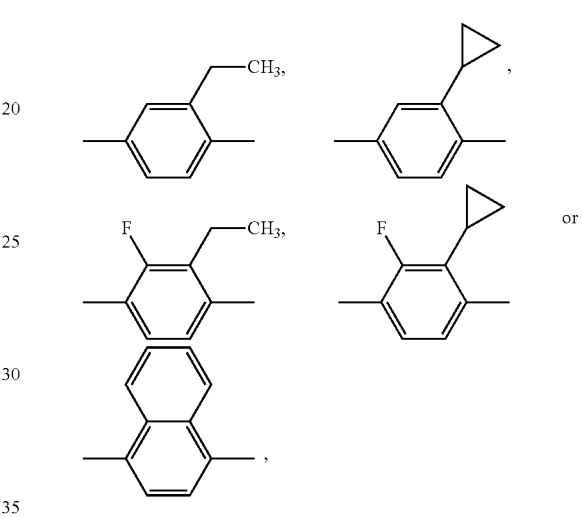

L$^4$ denotes H or alkyl having 1 to 6 C atoms, cycloalkyl having 3 to 6 C atoms or cycloalkenyl having 4 to 6 C atoms, preferably CH$_3$, C$_2$H$_5$, n-C$_3$H$_7$, i-C$_3$H$_7$, cyclopropyl, cyclobutyl, cyclohexyl, cyclopent-1-enyl or cyclohex-1-enyl, and particularly preferably CH$_3$, C$_2$H$_5$, cyclopropyl or cyclobutyl, X$^4$ denotes H, alkyl having 1 to 3 C atoms or halogen, preferably H, F or Cl, more preferably H or F and very particularly preferably F, R$^{41}$ to R$^{44}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and alternatively one of R$^{43}$ and R$^{44}$ or both also denote H, preferably R$^{41}$ and R$^{42}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably R$^{41}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably R$^{42}$ denotes unfluorinated alkyl or unfluorinated alkoxy, each having 1 to 7 C atoms, and preferably $R^{43}$ and $R^{44}$ denote H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl or cyclohexyl, and very particularly preferably at least one of $R^{43}$ and $R^{44}$ denotes n-alkyl, particularly preferably methyl, ethyl or n-propyl, and the other denotes H or n-alkyl, particularly preferably H, methyl, ethyl or n-propyl.

In a preferred embodiment of the present application, the liquid-crystal medium additionally comprises one or more compounds selected from the group of compounds of the formulae V, VI, VII, VIII and IX:

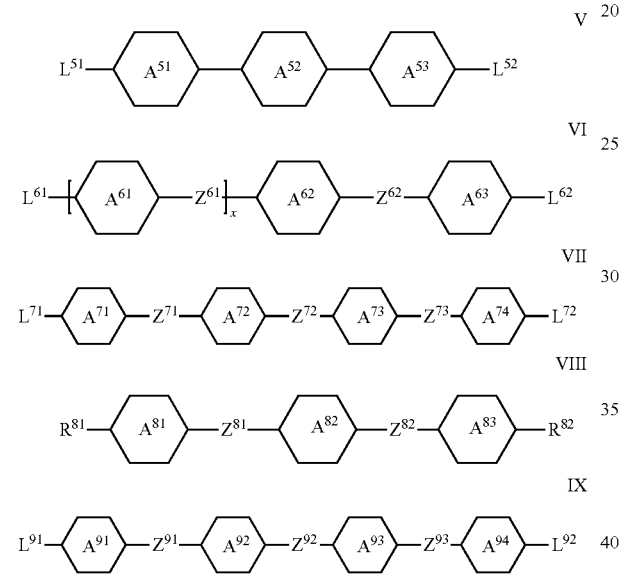

in which $L^{51}$ denotes $R^{51}$ or $X^{51}$, $L^{52}$ denotes $R^{52}$ or $X^{52}$, $R^{51}$ and $R^{52}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{51}$ and $X^{52}$, independently of one another, denote H, F, Cl, —CN, $SF_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F or Cl, and

independently of one another, denote

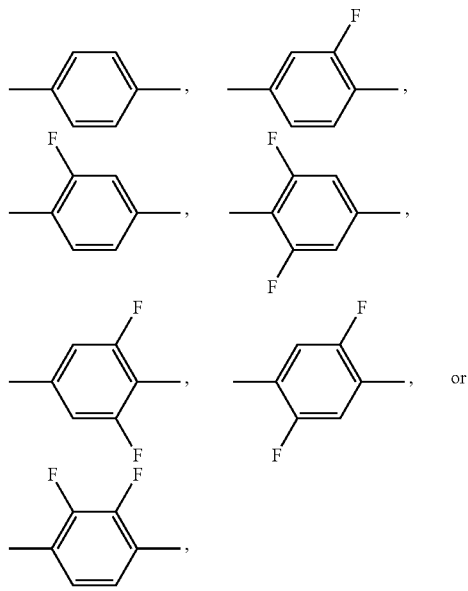

preferably

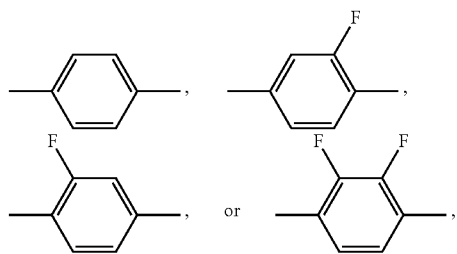

$L^{61}$ denotes $R^{61}$ and, in the case where $Z^{61}$ and/or $Z^{62}$ denote trans-CH=CH— or trans-CF=CF—, alternatively also denotes $X^{61}$, $L^{62}$ denotes $R^{62}$ and, in the case where $Z^{61}$ and/or $Z^{62}$ denote trans-CH=CH— or trans-CF=CF—, alternatively also denotes $X^{62}$, $R^{61}$ and $R^{62}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{61}$ and $X^{62}$, independently of one another, denote F or Cl, —CN, $SF_5$, fluorinated alkyl or alkoxy having 1 to 7 C atoms or fluorinated alkenyl, alkenyloxy or alkoxyalkyl having 2 to 7 C atoms, one of $Z^{61}$ and $Z^{62}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

independently of one another, denote

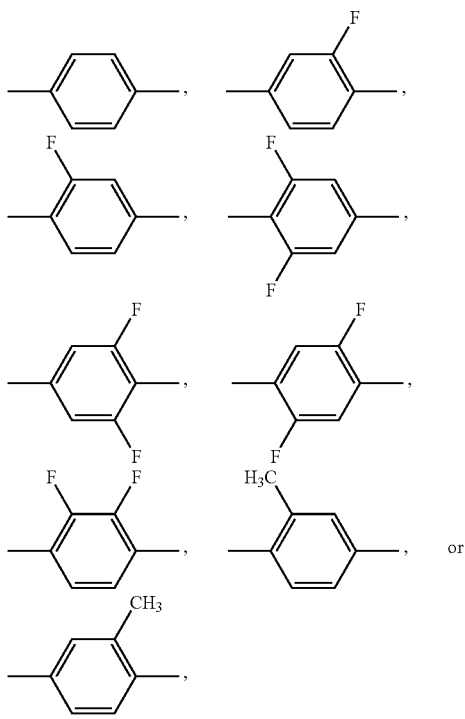

preferably

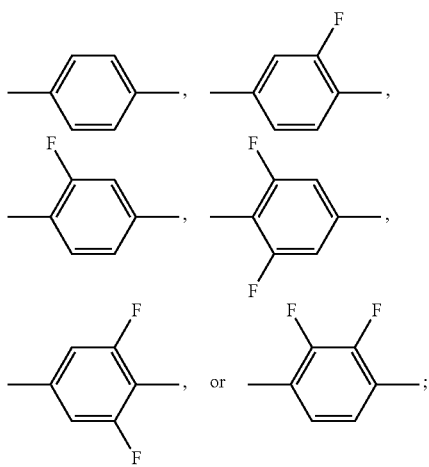

and
x denotes 0 or 1;
L$^{71}$ denotes R$^{71}$ or X$^{71}$,
L$^{72}$ denotes R$^{72}$ or X$^{72}$,
R$^{71}$ and R$^{72}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
X$^{71}$ and X$^{72}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and Z$^{71}$ to Z$^{73}$, independently of one another, denote trans-CH=CH—, trans-CF=CF—, —C≡C— or a single bond, preferably one or more of them denote a single bond, particularly preferably all denote a single bond and

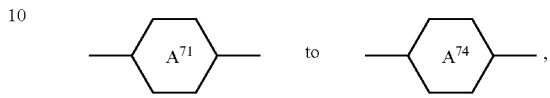

independently of one another, denote

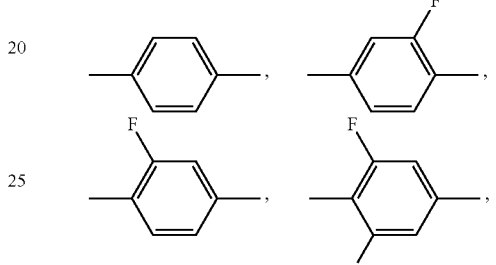

preferably

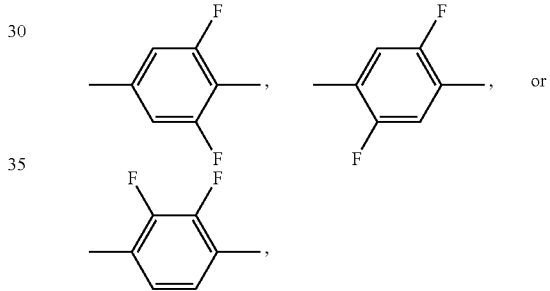

R$^{81}$ and R$^{82}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
one of
Z$^{81}$ and Z$^{82}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

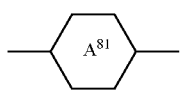

denotes

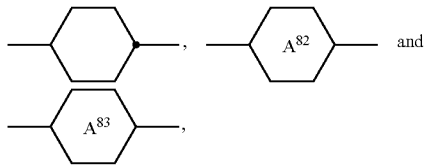

independently of one another, denote

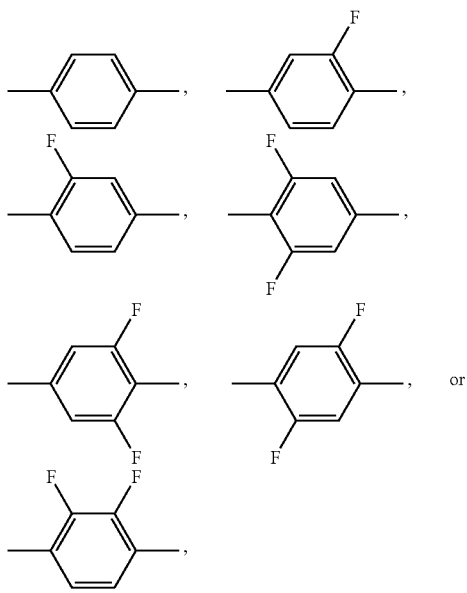

L$^{91}$ denotes R$^{91}$ or X$^{91}$,
L$^{92}$ denotes R$^{92}$ or X$^{92}$,
R$^{91}$ and R$^{92}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
X$^{91}$ and X$^{92}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
Z$^{91}$ to Z$^{93}$, independently of one another, denote trans-CH=CH—, trans-CF=CF—, —C≡C— or a single bond, preferably one or more of them denotes a single bond, and particularly preferably all denote a single bond,

denotes

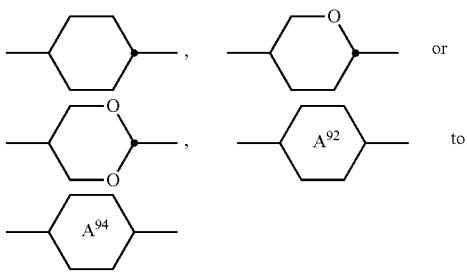

independently of one another, denote

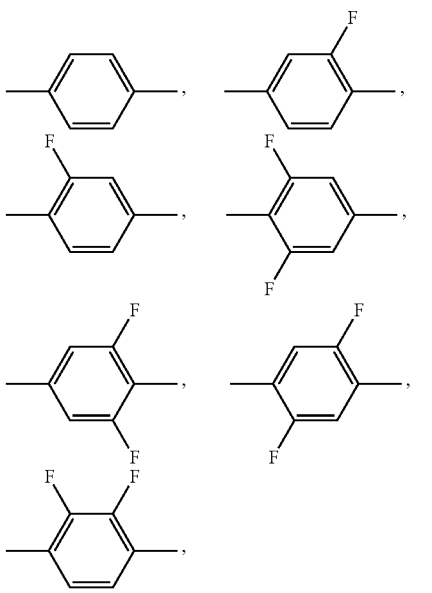

In a preferred embodiment of the present invention, the liquid-crystal medium comprises one or more compounds of the formula V, preferably selected from the group of the compounds of the formulae V-1 to V-3, preferably of the formulae V-1 and/or V-2 and/or V-3, preferably of the formulae V-1 and V-2:

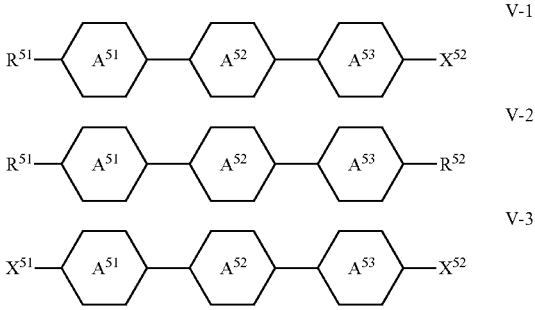

in which the parameters have the respective meanings indicated above for formula V and preferably
R$^{51}$ denotes unfluorinated alkyl having 1 to 7 C atoms or unfluorinated alkenyl having 2 to 7 C atoms, $R^{52}$ denotes unfluorinated alkyl having 1 to 7 C atoms or unfluorinated alkenyl having 2 to 7 C atoms or unfluorinated alkoxy having 1 to 7 C atoms, $X^{51}$ and $X^{52}$, independently of one another, denote F, Cl, —OCF$_3$, —CF$_3$, —CN or —SF$_5$, preferably F, Cl, —OCF$_3$ or —CN.

The compounds of the formula V-1 are preferably selected from the group of the compounds of the formulae V-1a to V-1d, preferably V-1c and V-1d:

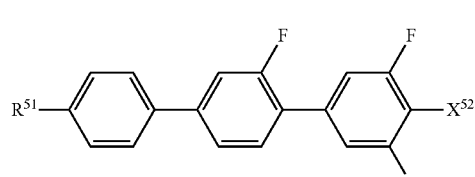

V-1a

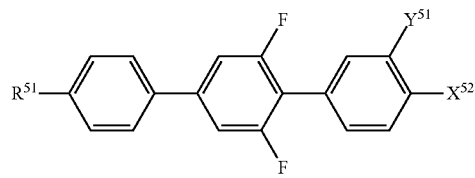

V-1b

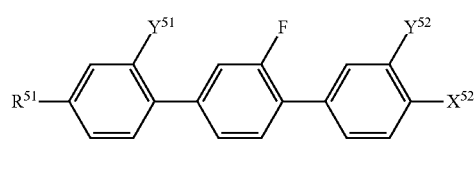

V-1c

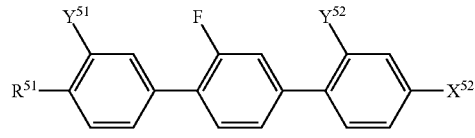

V-1d in which the parameters have the respective meanings indicated above for formula V-1 and in which $Y^{51}$ and $Y^{52}$, in each case independently of one another, denote H or F, and preferably $R^{51}$ denotes alkyl or alkenyl, and $X^{51}$ denotes F, Cl or —OCF$_3$.

The compounds of the formula V-2 are preferably selected from the group of the compounds of the formulae V-2a to V-2e and/or from the group of the compounds of the formulae V-2f and V-2g:

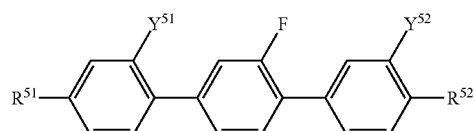

V-2a

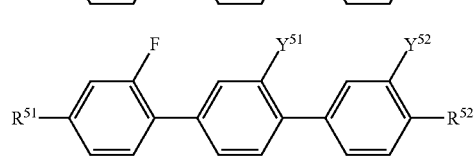

V-2b

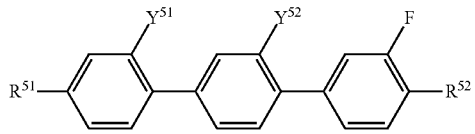

V-2c

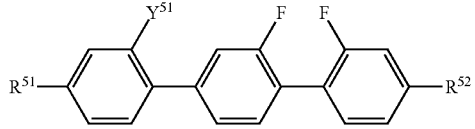

V-2d

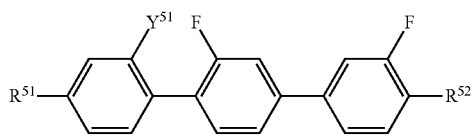

V-2e

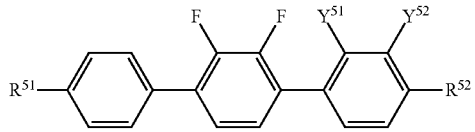

V-2f

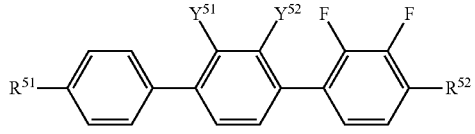

V-2g where in each case the compounds of the formula V-2a are excluded from the compounds of the formulae V-2b and V-2c, the compounds of the formula V-2b are excluded from the compounds of the formula V-2c and the compounds of the formula V-2e are excluded from the compounds of the formula V-2f, and in which the parameters have the respective meanings indicated above for formula V-1 and in which $Y^{51}$ and $Y^{52}$, in each case independently of one another, denote H or F, and preferably $Y^{51}$ and $Y^{52}$ denotes H and the other denotes H or F, preferably likewise denotes H.

The compounds of the formula V-3 are preferably compounds of the formula V-3a:

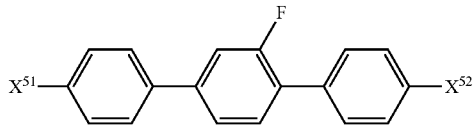

V-3a in which the parameters have the respective meanings indicated above for formula V-1 and in which preferably $X^{51}$ denotes F, Cl, preferably F, $X^{52}$ denotes F, Cl or —OCF$_3$, preferably —OCF$_3$.

The compounds of the formula V-1a are preferably selected from the group of the compounds of the formulae V-1a-1 and V-1a-2, more preferably these compounds of the formula V predominantly consist, even more preferably essentially consist and very particularly preferably completely consist thereof:

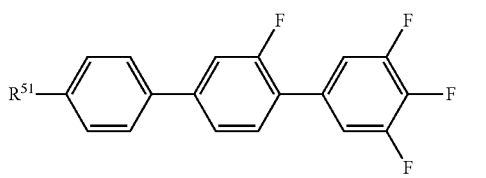

V-1a-1

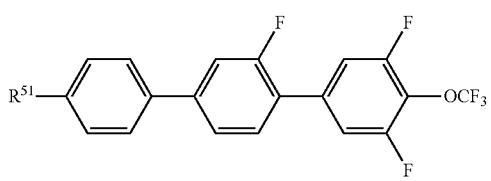

V-1a-2 in which

R$^{51}$ has the meaning indicated above and preferably denotes C$_n$H$_{2n+1}$, in which n denotes an integer in the range from 0 to 7, preferably in the range from 1 to 5 and particularly preferably 3 or 7.

The compounds of the formula V-1b are preferably compounds of the formula V-1b-1:

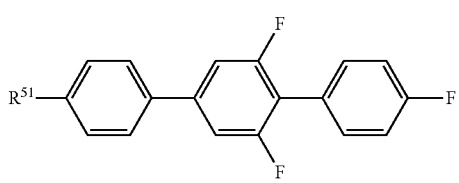

V-1b-1 in which

R$^{51}$ has the meaning indicated above and preferably denotes C$_n$H$_{2n+1}$, in which n denotes an integer in the range from 0 to 15, preferably in the range from 1 to 7 and particularly preferably 1 to 5.

The compounds of the formula V-1c are preferably selected from the group of the compounds of the formulae V-1c-1 to V-1c-4, particularly preferably selected from the group of the compounds of the formulae V-1c-1 and V-1c-2:

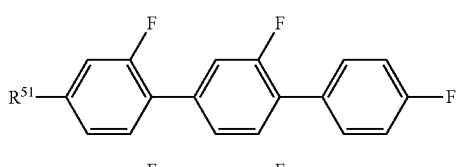

V-1c-1

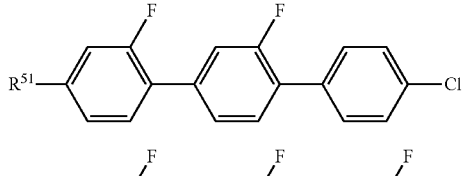

V-1c-2

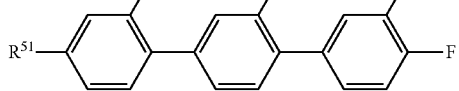

V-1c-3

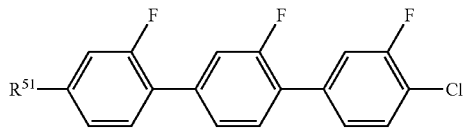

V-1c-4 in which

R$^{51}$ has the meaning indicated above and preferably denotes C$_n$H$_{2n+1}$, in which n denotes an integer in the range from 0 to 15, preferably in the range from 1 to 7 and particularly preferably 1 to 5.

The compounds of the formula V-1d are preferably selected from the group of the compounds of the formulae V-1d-1 and V-1d-2, particularly preferably the compound of the formula V-1d-2:

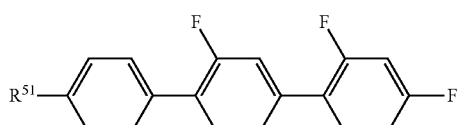

V-1d-1

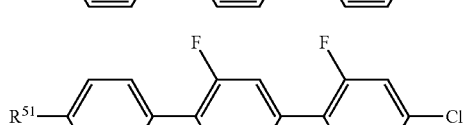

V-1d-2 in which

R$^{51}$ has the meaning indicated above and preferably denotes C$_n$H$_{2n+1}$, in which n denotes an integer in the range from 0 to 15, preferably in the range from 1 to 7 and particularly preferably 1 to 5.

The compounds of the formula V-2a are preferably selected from the group of the compounds of the formulae V-2a-1 and V-2a-2, particularly preferably the compounds of the formula V-2a-1:

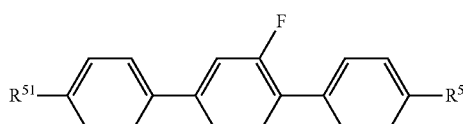

V-2a-1

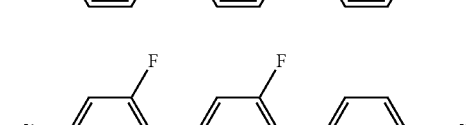

V-2a-2 in which

R$^{51}$ has the meaning indicated above and preferably denotes C$_n$H$_{2n+1}$ or CH$_2$=CH—(CH$_2$)$_z$, and R$^{52}$ has the meaning indicated above and preferably denotes C$_m$H$_{2m+1}$ or O—C$_m$H$_{2m+1}$ or (CH$_2$)$_z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

Preferred combinations of ($R^{51}$ and $R^{52}$), in particular in the case of formula
V-2a-1, are ($C_nH_{2n+1}$ and $C_mH_{2m+1}$), ($C_nH_{2n+1}$ and O—$C_mH_{2m+1}$), ($CH_2$=CH—$(CH_2)_Z$ and $C_mH_{2m+1}$), ($CH_2$=CH—$(CH_2)_Z$ and O—$C_mH_{2m+1}$) and ($C_nH_{2n+1}$ and $(CH_2)_Z$—CH=$CH_2$).

Preferred compounds of the formula V-2b are the compounds of the formula V-2b-1:

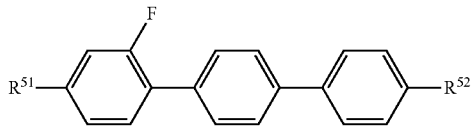

V-2b-1 in which
$R^{51}$ has the meaning indicated above and preferably denotes $C_nH_{2n+1}$ or $CH_2$=CH—$(CH_2)_Z$, and
$R^{52}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

Preferred compounds of the formula V-2c are the compounds of the formula V-2c-1:

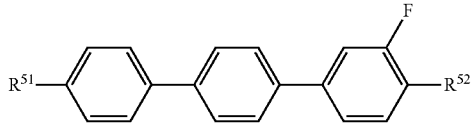

V-2c-1 in which
$R^{51}$ has the meaning indicated above and preferably denotes $C_nH_{2n+1}$ or $CH_2$=CH—$(CH_2)_Z$, and
$R^{52}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

Preferred compounds of the formula V-2d are the compounds of the formula V-2d-1:

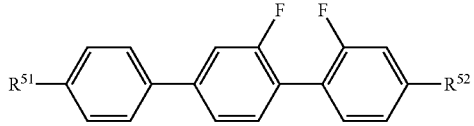

V-2d-1 in which
$R^{51}$ has the meaning indicated above and preferably denotes $C_nH_{2n+1}$ or $CH_2$=CH—$(CH_2)_Z$, and
$R^{52}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

Preferred compounds of the formula V-2e are the compounds of the formula V-2e-1:

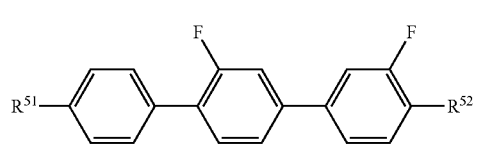

V-2e-1 in which
$R^{51}$ has the meaning indicated above and preferably denotes $C_nH_{2n+1}$ or $CH_2$=CH—$(CH_2)_Z$, and
$R^{52}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and O—$C_mH_{2m+1}$).

Preferred compounds of the formula V-2f are the compounds of the formula V-2f-1:

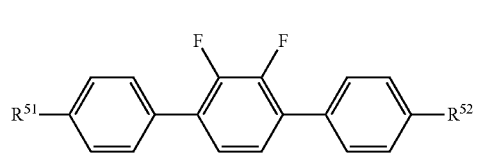

V-2f-1 in which
$R^{51}$ has the meaning indicated above and preferably denotes $C_nH_{2n+1}$ or $CH_2$=CH—$(CH_2)_Z$, and
$R^{52}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula V-2g are the compounds of the formula V-2g-1:

V-2g-1

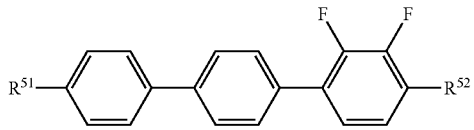

in which

R$^{51}$ has the meaning indicated above and preferably denotes C$_n$H$_{2n+1}$ or CH$_2$=CH—(CH$_2$)$_Z$, and R$^{52}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The compounds of the formula VI are preferably selected from the group of the compounds of the formulae VI-1 to VI-5:

VI-1

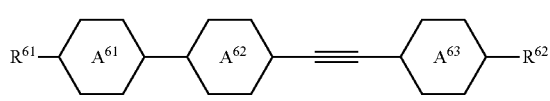

VI-2

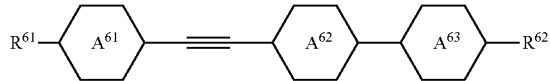

VI-3

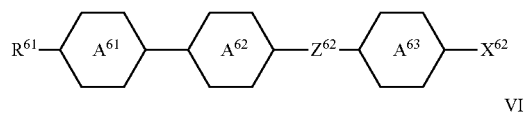

VI-4

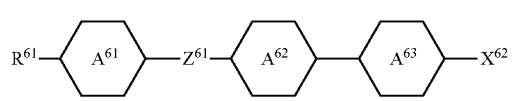

VI-5

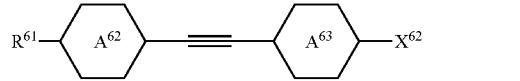

in which

Z$^{61}$ and Z$^{62}$ denote —C≡C—, trans-CH=CH— or trans-CF=CF—, preferably —C≡C—, trans-CH=CH—, and the other occurring groups and parameters have the meaning given above under formula VI, and preferably R$^{61}$ and R$^{62}$, independently of one another, denote H, unfluorinated alkyl or alkoxy having 1 to 7 C atoms or unfluorinated alkenyl having 2 to 7 C atoms, X$^{62}$ denotes F, Cl, —OCF$_3$ or —CN, The compounds of the formula VI-1 are preferably selected from the group of the compounds of the formulae VI-1a and VI-1b, more preferably selected from compounds of the formula VI-1a:

VI-1a

[structure]

VI-1b

[structure]

in which

R$^{61}$ has the meaning indicated above and preferably denotes C$_n$H$_{2n+1}$ or CH$_2$=CH—(CH$_2$)$_Z$, and R$^{62}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{61}$ and R$^{62}$) here are, in particular, (C$_n$H$_{2n+1}$ and C$_m$H$_{2m+1}$) and (C$_n$H$_{2n+1}$ and O—C$_m$H$_{2m+1}$), in the case of formula VI-1a particularly preferably (C$_n$H$_{2n+1}$ and C$_m$H$_{2m+1}$) and in the case of formula VI-1b particularly preferably (C$_n$H$_{2n+1}$ and O—C$_m$H$_{2m+1}$).

The compounds of the formula VI-3 are preferably selected from the compounds of the formula VI-3a to VI-3e:

VI-3a

[structure]

VI-3b

[structure]

VI-3c

[structure]

VI-3d

[structure]

VI-3e

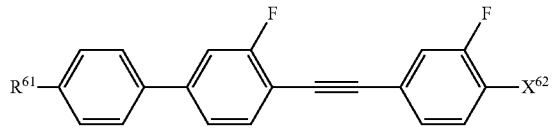

in which the parameters have the meaning given above under formula VI-3 and preferably
$R^{61}$ has the meaning indicated above and preferably denotes $C_nH_{2n+1}$, in which
n denotes an integer in the range from 0 to 7, preferably in the range from 1 to 5, and
$X^{62}$ denotes —F, —Cl, —OCF$_3$, or —CN.

The compounds of the formula VI-4 are preferably selected from compounds of the formulae VI-4a to VI-4e:

VI-4a

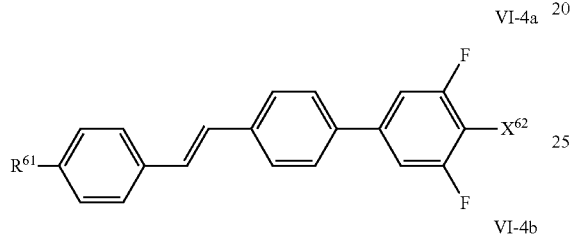

VI-4b

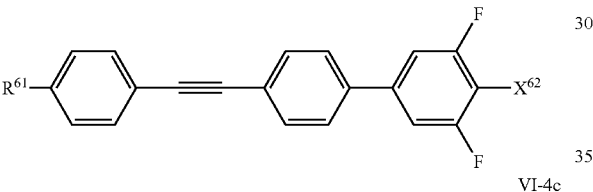

VI-4c

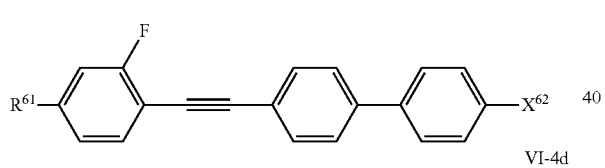

VI-4d

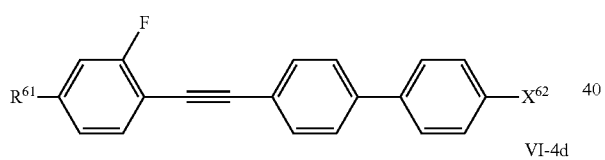

VI-4e

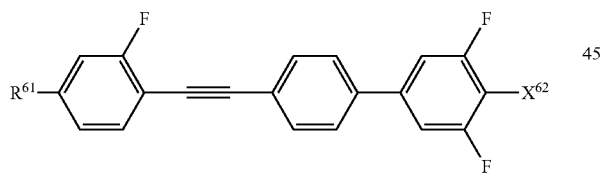

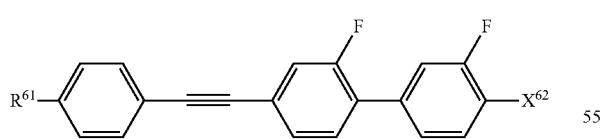

in which the parameters have the meaning given above under formula VI-4 and preferably
$R^{61}$ has the meaning indicated above and preferably denotes $C_nH_{2n+1}$, in which
n denotes an integer in the range from 0 to 7, preferably in the range from 1 to 5, and
$X^{62}$ denotes F, Cl, OCF$_3$, or —CN.

The compounds of the formula VI-5 are preferably selected from the compounds of the formulae VI-5a to VI-5d, preferably VI-5b:

VI-5a

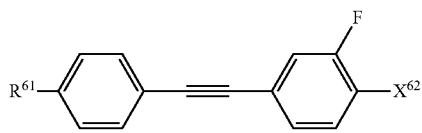

VI-5b

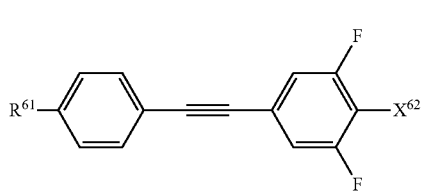

VI-5c

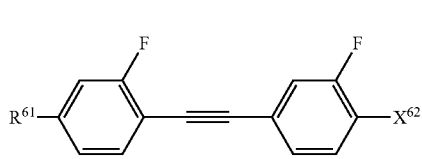

VI-5d

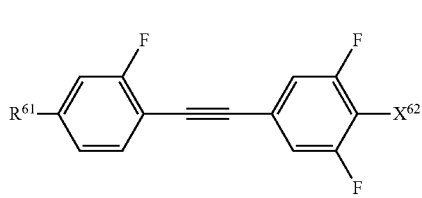

in which the parameters have the meaning given above under formula VI-5 and preferably
$R^{61}$ has the meaning indicated above and preferably denotes $C_nH_{2n+1}$, in which
n denotes an integer in the range from 0 to 7, preferably in the range from 1 to 5, and
$X^{62}$ denotes —F, —Cl, —OCF$_3$, or —CN, particularly preferably —OCF$_3$.

The compounds of the formula VII are preferably selected from the group of the compounds of the formulae VII-1 to VII-6:

VII-1

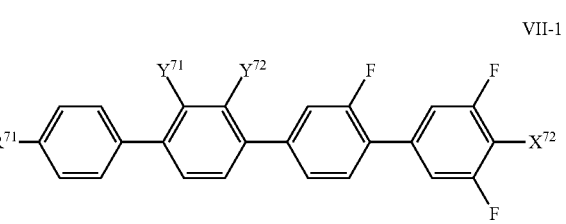

VII-2

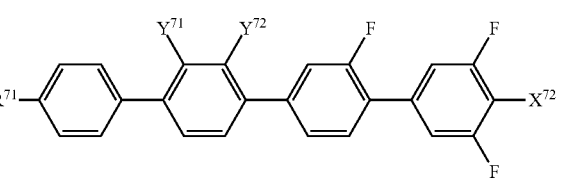

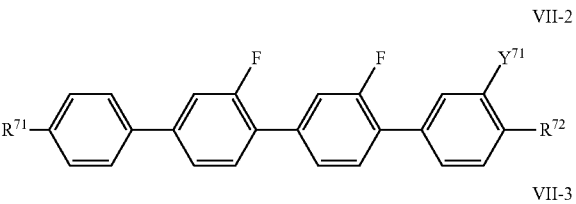

VII-3

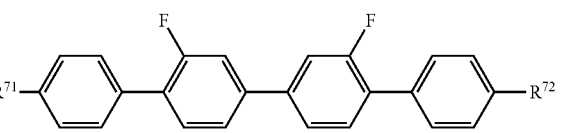

-continued

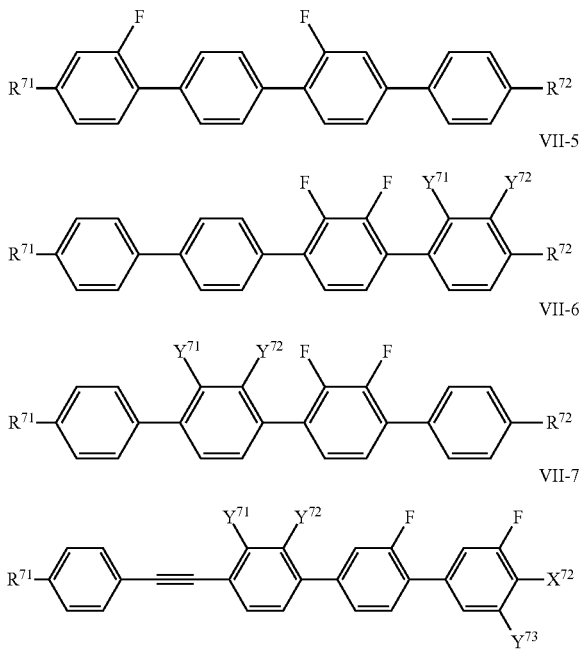

where the compounds of the formula VII-5 are excluded from the compounds of the formula VII-6, and in which the parameters have the respective meanings indicated above for formula VII, $Y^{71}$, $Y^{72}$, $Y^{73}$ independently from one another, denote H or F, and preferably $R^{71}$ denotes unfluorinated alkyl or alkoxy, each having 1 to 7 C atoms, or unfluorinated alkenyl having 2 to 7 C atoms, $R^{72}$ denotes unfluorinated alkyl or alkoxy, each having 1 to 7 C atoms, or unfluorinated alkenyl having 2 to 7 C atoms, $X^{72}$ denotes F, Cl; NCS or —$OCF_3$, preferably F or NCS, and particularly preferably $R^{71}$ has the meaning indicated above and preferably denotes $C_nH_{2n+1}$ or $CH_2=CH-(CH_2)_Z$, and $R^{72}$ has the meaning indicated above and preferably denotes $C_mH_{2m+1}$ or O—$C_mH_{2m+1}$ or $(CH_2)_Z$—$CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula VII-1 are preferably selected from the group of the compounds of the formulae VII-1a to VII-1d:

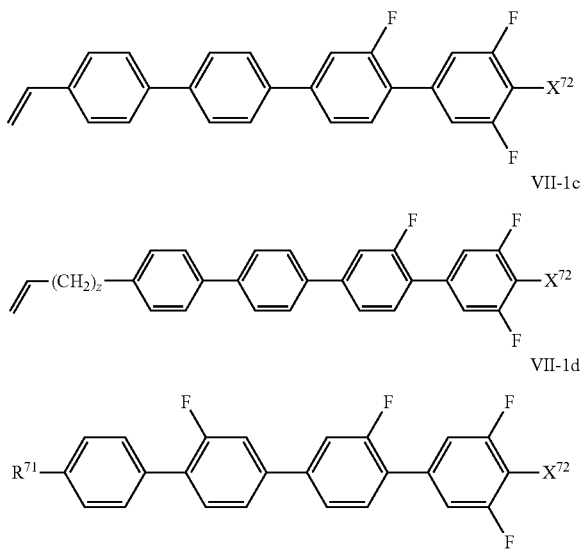

in which $X^{72}$ has the meaning given above for formula VII-2 and $R^{71}$ has the meaning indicated above and preferably denotes $C_nH_{2n+1}$, in which n denotes 1 to 7, preferably 2 to 6, particularly preferably 2, 3 or 5, and z denotes 0, 1, 2, 3 or 4, preferably 0 or 2, and $X^{72}$ preferably denotes F.

The compounds of the formula VII-2 are preferably selected from the group of the compounds of the formulae VII-2a and VII-2b, particularly preferably of the formula VII-2a:

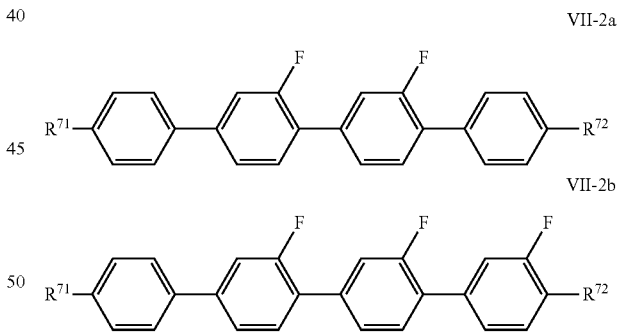

in which $R^{71}$ has the meaning indicated above and preferably denotes $C_nH_{2n+1}$ or $CH_2=CH-(CH_2)_Z$, and $R^{72}$ has the meaning indicated above and preferably denotes $C_mH_{2m+1}$ or O—$C_mH_{2m+1}$ or $(CH_2)_Z$—$CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

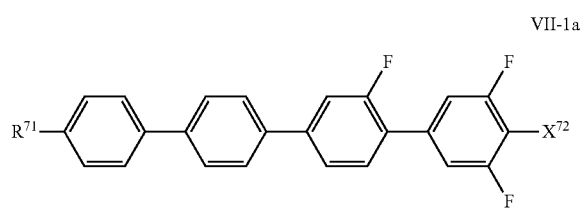

The compounds of the formula VII-3 are preferably compounds of the formula VII-3a:

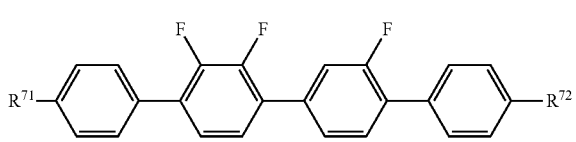

VII-3a in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-4 are preferably compounds of the formula VII-4a:

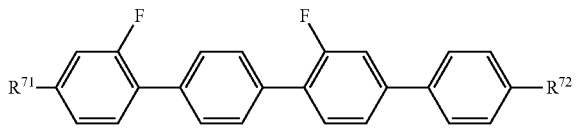

VII-4a in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-5 are preferably selected from the group of the compounds of the formulae VII-5a and VII-5b, more preferably of the formula VII-5a:

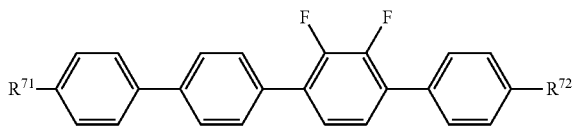

VII-5a

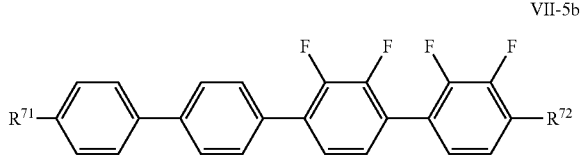

VII-5b in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-6 are preferably selected from the group of the compounds of the formulae VII-6a and VII-6b:

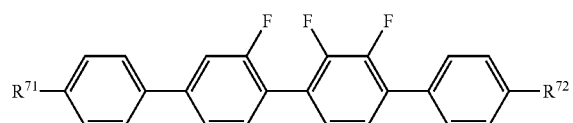

VII-6a

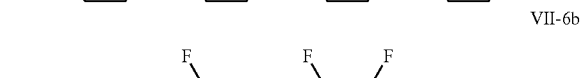

VII-6b in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-7 are preferably selected from the group of the compounds of the formulae VII-7a to VII-7d:

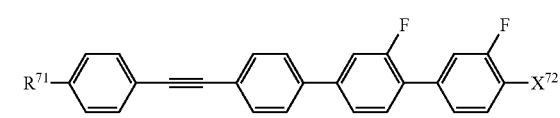

VII-7a

-continued

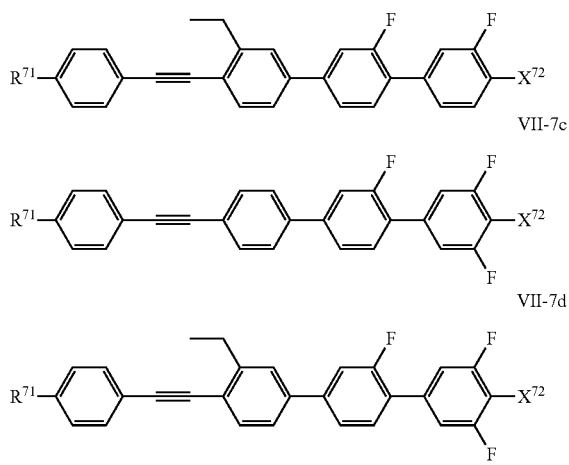

VII-7b

VII-7c

VII-7d in which
R$^{71}$ has the meaning indicated above and preferably denotes C$_n$H$_{2n+1}$ or CH$_2$=CH—(CH$_2$)$_z$,
X$^{72}$ denotes F, —OCF$_3$ or —NCS,
n denotes an integer in the range from 0 to 15, preferably in the range from 1 to 7 and particularly preferably 1 to 5, and
z denotes 0, 1, 2, 3 or 4, preferably 0 or 2.

The compounds of the formula VIII are preferably selected from the group of the compounds of the formulae VIII-1 to VIII-3, more preferably these compounds of the formula VIII predominantly consist, even more preferably essentially consist and very particularly preferably completely consist thereof:

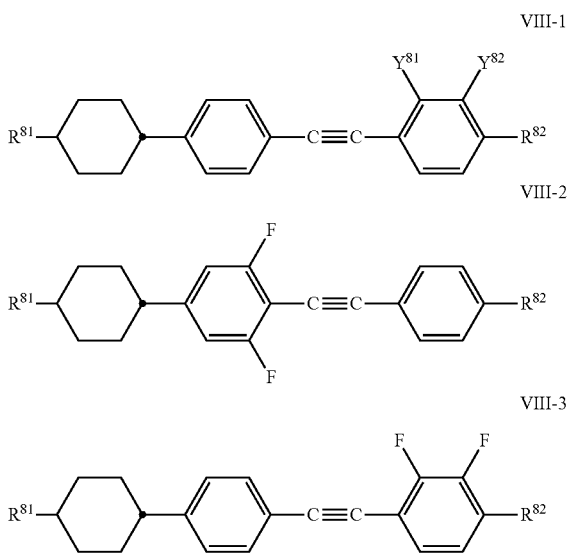

VIII-1

VIII-2

VIII-3 in which
one of
Y$^{81}$ and Y$^{82}$ denotes H and the other denotes H or F, and
R$^{81}$ has the meaning indicated above and preferably denotes C$_n$H$_{2n+1}$ or CH$_2$=CH—(CH$_2$)$_z$, and
R$^{82}$ has the meaning indicated above and preferably denotes C$_m$H$_{2m+1}$ or O—C$_m$H$_{2m+1}$ or (CH$_2$)$_z$—CH=CH$_2$, and in which n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{81}$ and R$^{82}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VIII-1 are preferably selected from the group of the compounds of the formulae VIII-1a to VIII-1c:

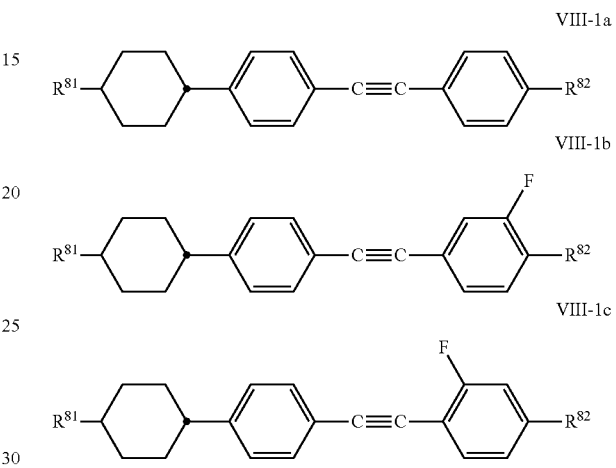

VIII-1a

VIII-1b

VIII-1c in which
R$^{81}$ has the meaning indicated above and preferably denotes C$_n$H$_{2n+1}$ or CH$_2$=CH—(CH$_2$)$_z$, and
R$^{82}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{81}$ and R$^{82}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VIII-2 are preferably compounds of the formula VIII-2a:

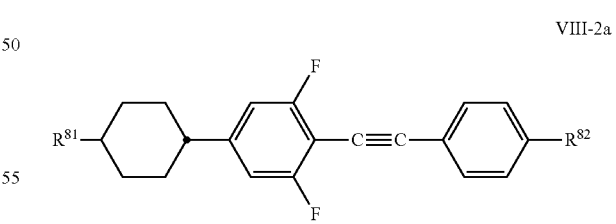

VIII-2a in which
R$^{81}$ has the meaning indicated above and preferably denotes C$_n$H$_{2n+1}$ or CH$_2$=CH—(CH$_2$)$_z$, and
R$^{82}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$), ($C_nH_{2n+1}$ and O—$C_mH_{2m-Fi}$) and ($CH_2$=CH—$(CH_2)_Z$ and $C_mH_{2m+1}$), particularly preferably ($C_nH_{2n+1}$ and $C_mH_{2m+1}$).

The compounds of the formula VIII-3 are preferably compounds of the formula VIII-3a:

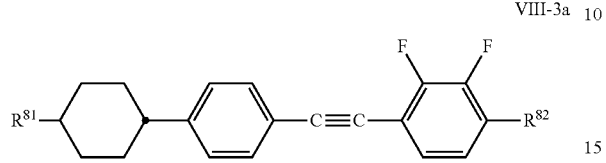

VIII-3a in which $R^{81}$ has the meaning indicated above and preferably denotes $C_nH_{2n+1}$ or $CH_2$=CH—$(CH_2)_Z$, and $R^{82}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and O—$C_mH_{2m+1}$).

The compounds of the formula IX are preferably selected from the group of the compounds of the formulae IX-1 to IX-3:

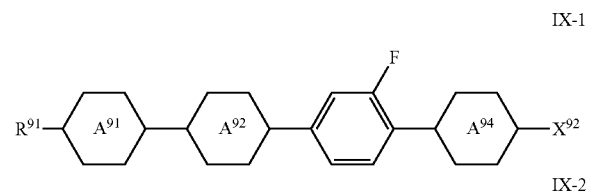

IX-1

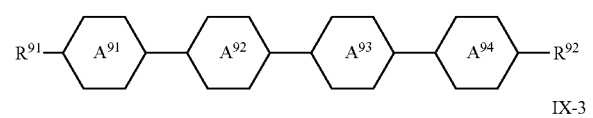

IX-2

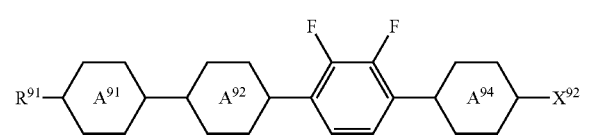

IX-3 in which the parameters have the respective meaning indicated above under formula IX and preferably one of

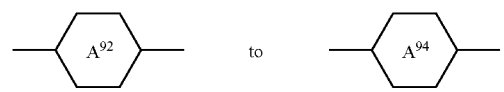

denotes

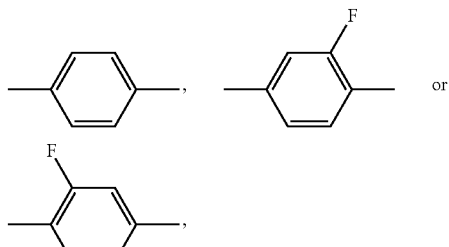

and in which $R^{91}$ has the meaning indicated above and preferably denotes $C_nH_{2n+1}$ or $CH_2$=CH—$(CH_2)_Z$, and $R^{92}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and O—$C_mH_{2m+1}$).

The compounds of the formula IX-1 are preferably selected from the group of the compounds of the formulae IX-1a to IX-1e:

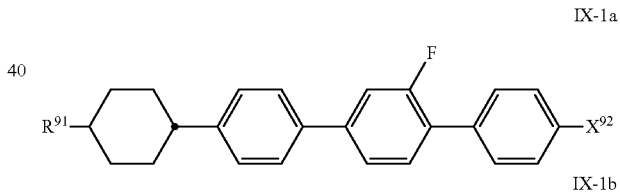

IX-1a

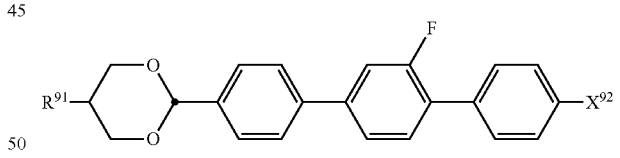

IX-1b

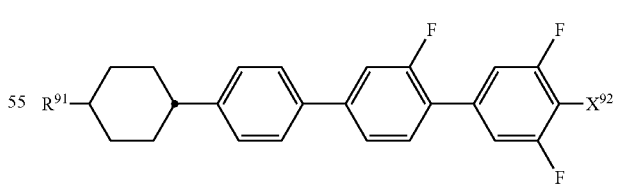

IX-1c

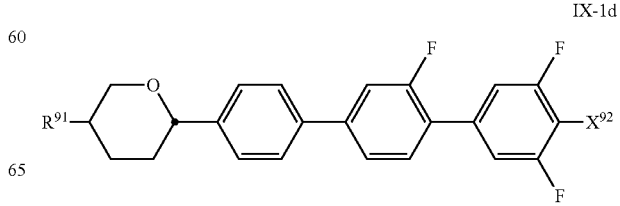

IX-1d

IX-1e

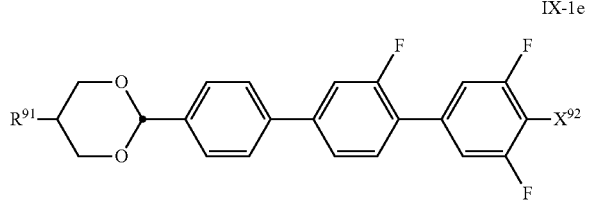

in which the parameters have the meaning given above and preferably
$R^{91}$ has the meaning indicated above and preferably denotes $C_nH_{2n+1}$, and
n denotes an integer in the range from 0 to 15, preferably in the range from 1 to 7 and particularly preferably 1 to 5, and
$X^{92}$ preferably denotes F or Cl.

The compounds of the formula IX-2 are preferably selected from the group of the compounds of the formulae IX-2a and IX-2b:

IX-2a

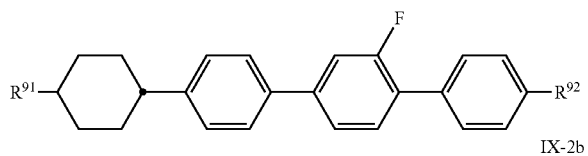

IX-2b

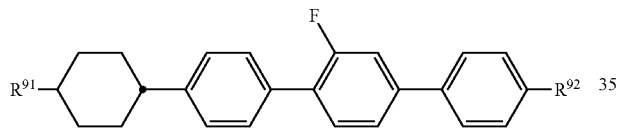

in which
$R^{91}$ has the meaning indicated above and preferably denotes $C_nH_{2n+1}$ or $CH_2=CH-(CH_2)_z$, and
$R^{92}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{91}$ and $R^{92}$) here is, in particular, ($C_nH_{2n+1}$ and $C_mH_{2m+1}$).

The compounds of the formula IX-3 are preferably compounds of the formulae IX-3a and IX-3b:

IX-3a

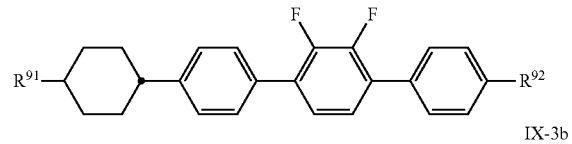

IX-3b

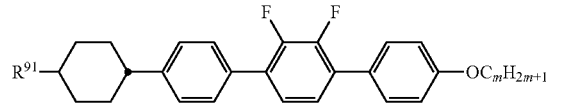

in which
$R^{91}$ has the meaning indicated above and preferably denotes $C_nH_{2n+1}$ or $CH_2=CH-(CH_2)_z$, and
$R^{92}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

In a preferred embodiment of the present invention the medium comprises one or more compounds of formula X

X

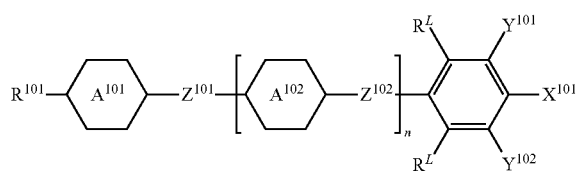

in which
$R^{101}$ denotes H, alkyl or alkoxy having 1 to 15, preferably 3 to 10, C atoms or unfluorinated alkenyl, unfluorinated alkenyloxy or unfluorinated alkoxyalkyl having 2 to 15, preferably 3 to 10, C atoms, preferably alkyl or alkenyl,
$X^{101}$ denotes H, F, Cl, —CN, $SF_5$, NCS, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F, Cl or NCS, particularly preferably NCS,
$Y^{101}$ denotes methyl, ethyl or Cl,
$Y^{102}$ denotes H, methyl, ethyl, F or Cl, preferably H or F,
$Z^{101}$, $Z^{102}$ identically or differently, denote a single bond, —CH=CH—, —CF=CF— or —C≡C—,

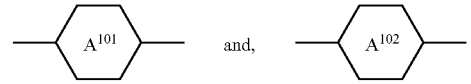

independently of one another, denote

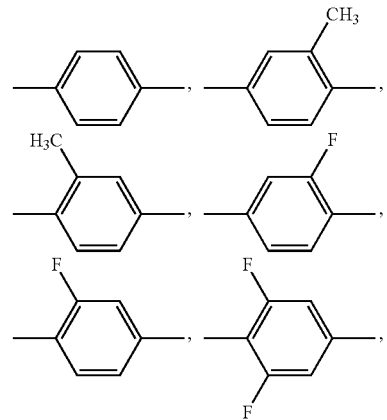

-continued

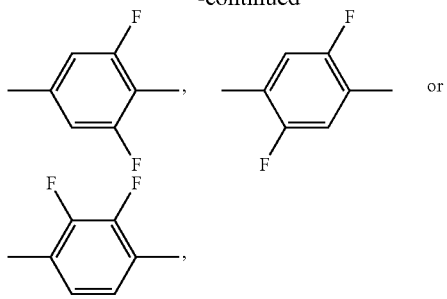

preferably

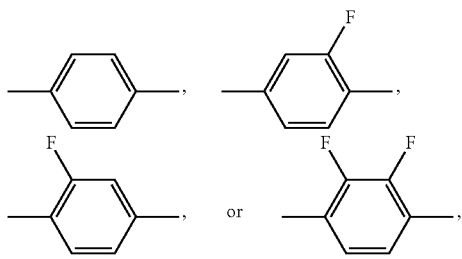

and where

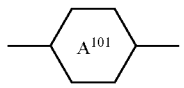

alternatively denotes

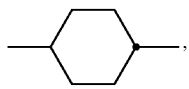

and
n is 0 or 1.

Preferably, the compounds of formula X are selected from the sub-formulae X-1 and X-2

X-1
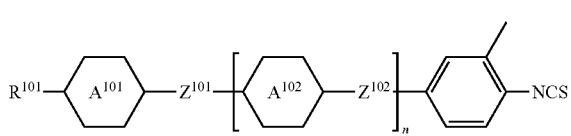

X-2
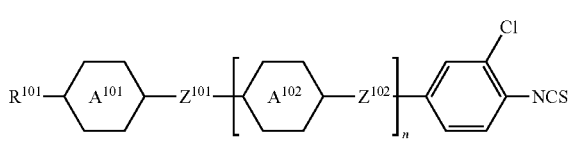

in which the occurring groups and parameters have the meanings given above for formula X.

Particularly preferably, the media according to the invention comprise one or more compounds selected from the group of compounds of the formulae X-1-1 to X-1-9

X-1-1
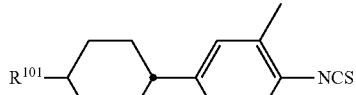

X-1-2
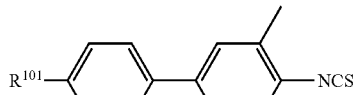

X-1-3
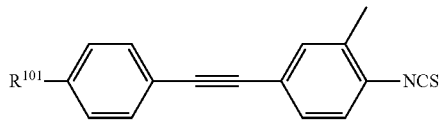

X-1-4
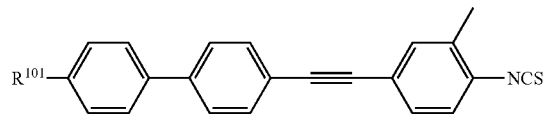

X-1-5
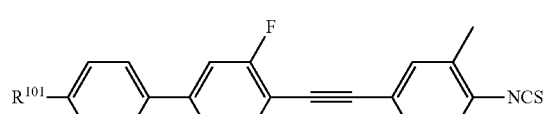

X-1-6
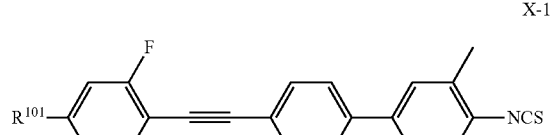

X-1-7
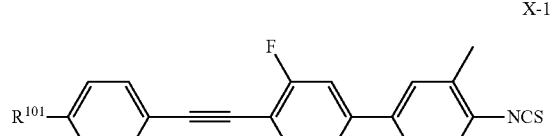

X-1-8
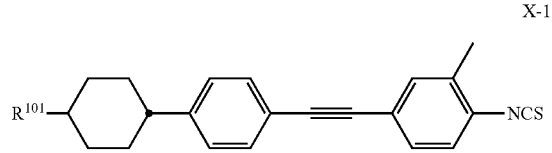

X-1-9
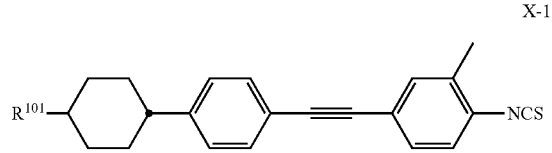

The media according to the present invention comprise one or more chiral dopants. Preferably these chiral dopants have an absolute value of the helical twisting power (HTP) in the range of from 1 µm$^{-1}$ to 150 µm$^{-1}$, preferably in the range of from 10 µm$^{-1}$ to 100 µm$^{-1}$. In case the media comprise two or more chiral dopants, these may have opposite signs of their HTP-values. This condition is preferred for some specific embodiments, as it allows to compensate the chirality of the respective compounds to some degree and, thus, may be used to compensate various temperature dependent properties of the resulting media in the devices. Generally, however, it is preferred that most, preferably all of the chiral compounds present in the media according to the present invention have the same sign of their HTP-values.

Preferably the chiral dopants present in the media according to the instant application are mesogenic compounds and most preferably they exhibit a mesophase on their own.

In a preferred embodiment of the present invention, the medium comprises two or more chiral compounds which all have the same algebraic sign of the HTP.

The temperature dependence of the HTP of the individual compounds may be high or low. The temperature dependence of the pitch of the medium can be compensated by mixing compounds having different temperature dependencies of the HTP in corresponding ratios.

For the optically active component, a multitude of chiral dopants, some of which are commercially available, is available to the person skilled in the art, such as, for example, cholesteryl nonanoate, R- and S-811, R- and S-1011, R- and S-2011, R- and S-3011, R- and S-4011, or CB15 (all Merck KGaA, Darmstadt).

Particularly suitable dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethane diols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

The media according to the present invention preferably comprise chiral dopants which are selected from the group of known chiral dopants. Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table F below.

Chiral compounds preferably used according to the present invention are selected from the group consisting of the formulae shown below.

Particular preference is given to chiral dopants selected from the group consisting of compounds of the following formulae A-I to A-III and Ch:

A-I

A-II

A-III

A-Ch in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by —C($R^Z$)=C($R^Z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$ $R^{a21}$ and $R^{a22}$, independently of one another, denote alkyl having 1 to 15 C atoms, in which, in addition, one or more non-adjacent $CH_2$ groups may each be replaced, independently of one another, by —C($R^Z$)=C($R^Z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, preferably both are alkyl, more preferably n-alkyl, $R^{a31}$, $R^{a31}$ and $R^{b32}$, independently of one another, denote straight-chain or branched alkyl having 1 to 15 C atoms, in which, in addition, one or more non-adjacent $CH_2$ groups may each be replaced, independently of one another, by —C($R^Z$)=C($R^Z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, preferably alkyl, more preferably n-alkyl, with the proviso that $R^{a32}$ is different from $R^{b32}$;

$R^Z$ denotes H, $CH_3$, F, Cl, or CN, preferably H or F, $R^8$ has one of the meanings of $R^{a11}$ given above, preferably alkyl, more preferably n-alkyl having 1 to 15 C atoms, $Z^8$ denotes —C(O)O—, $CH_2O$, $CF_2O$ or a single bond, preferably —C(O)O—, $A^{11}$ is defined as $A^{12}$ below, or alternatively denotes

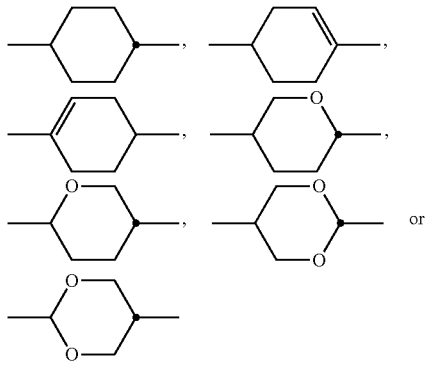

$A^{12}$ denotes

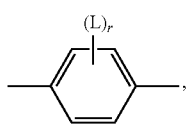

preferably

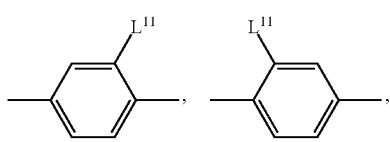

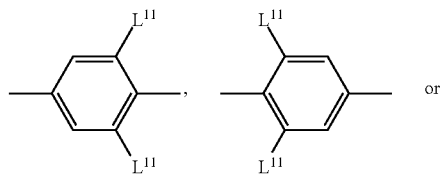

in which

L and $L^{11}$, on each occurrence, independently of one another, denotes halogen, CN, or alkyl, alkenyl, alkoxy or alkenyloxy having up to 12 C atoms and in which one or more H atoms are optionally replaced with halogen, preferably methyl, ethyl, Cl or F, particularly preferably F, $A^{21}$ denotes

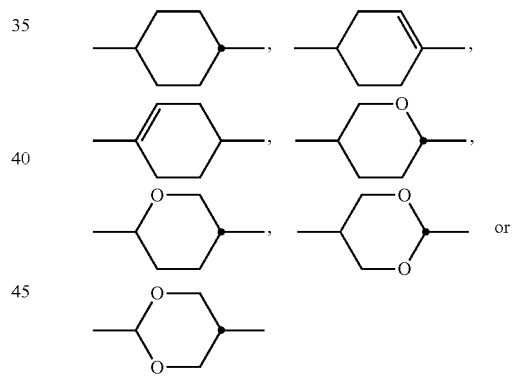

$A^{22}$ has the meanings given for $A^{12}$ $A^{31}$ has the meanings given for $A^{11}$, or alternatively denotes

$A^{32}$ has the meanings given for $A^{12}$.

n2 on each occurrence, identically or differently, is 0, 1 or 2, and n3 is 1, 2 or 3.

Particular preference is given to dopants selected from the group consisting of the compounds of the following formulae:

A-I-1

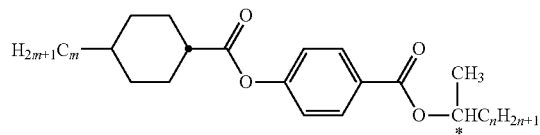

A-II-1

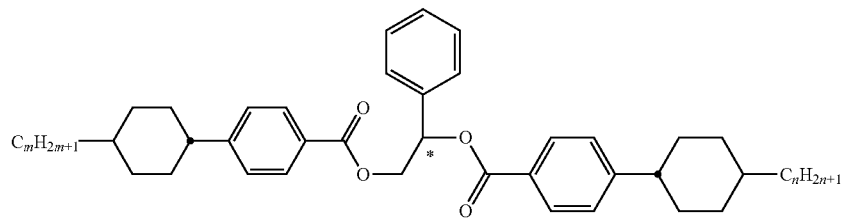

A-III-1     A-III-2

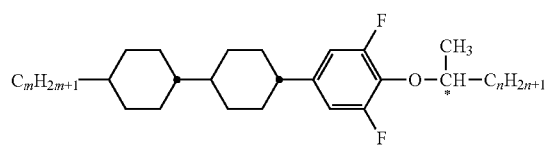 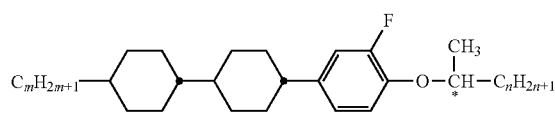

A-III-3     A-III-4

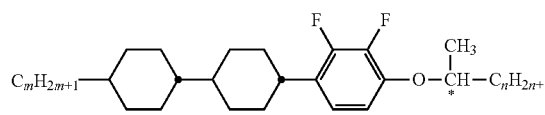 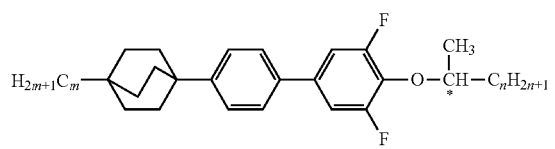

A-III-5     A-III-6

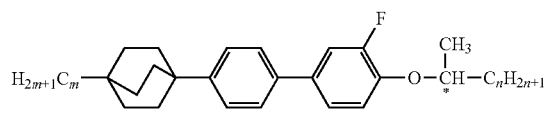 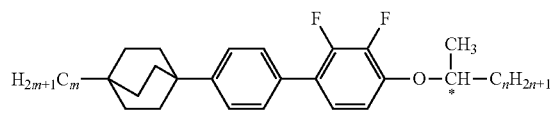

A-III-7     A-III-8

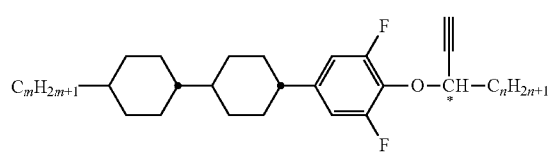

A-III-9

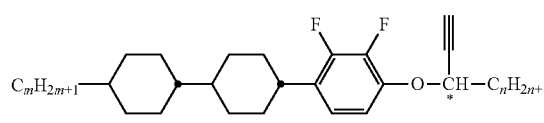

in which m is, on each occurrence, identically or differently, an integer from 1 to 9 and n is, on each occurrence, identically or differently, an integer from 2 to 9.

Particularly preferred compounds of formula A are compounds of formula A-III.

Further preferred dopants are derivatives of the isosorbide, isomannitol or isoiditol of the following formula A-IV:

A-IV

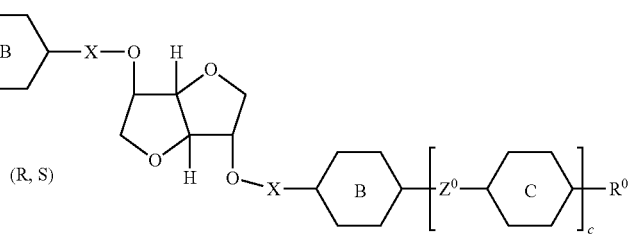

in which the group

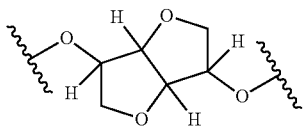 [SMILES: *OC1COC2C(O*)COC12]

is

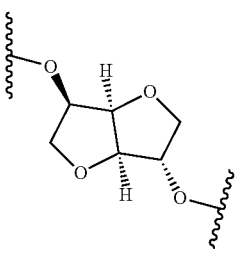 [SMILES: *O[C@H]1CO[C@H]2[C@@H]1OC[C@H]2O*]

(dianhydrosorbitol),

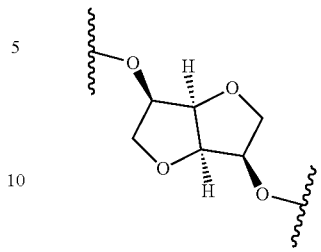

(dianhydromannitol), or

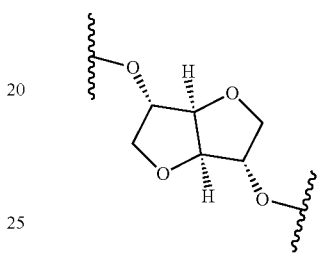

(dianhydroiditol),
preferably dianhydrosorbitol,
and chiral ethane diols, such as, for example, diphenylethanediol (hydrobenzoin), in particular mesogenic hydrobenzoin derivatives of the following formula A-V:

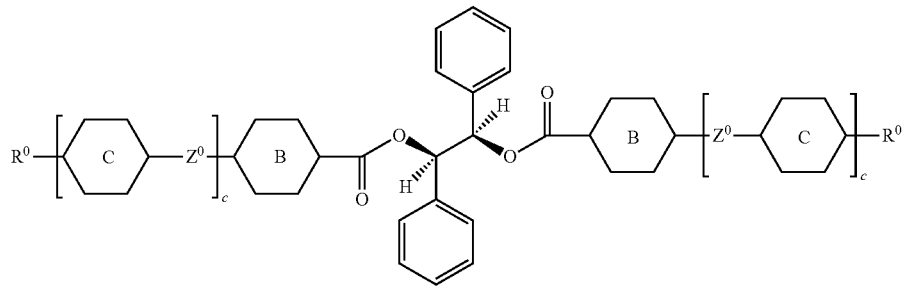

A-V including the (S,S) enantiomers, which are not shown,
in which

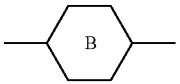 and 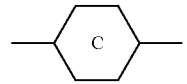

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, X is $CH_2$ or —C(O)—, $Z^0$ is —COO—, —$CH_2CH_2$— or a single bond, and $R^0$ is alkyl, alkoxy, alkylcarbonyl, alkoxycarbonyl or alkylcarbonyl-oxy having 1-12 carbon atoms.

Examples of compounds of formula IV are:
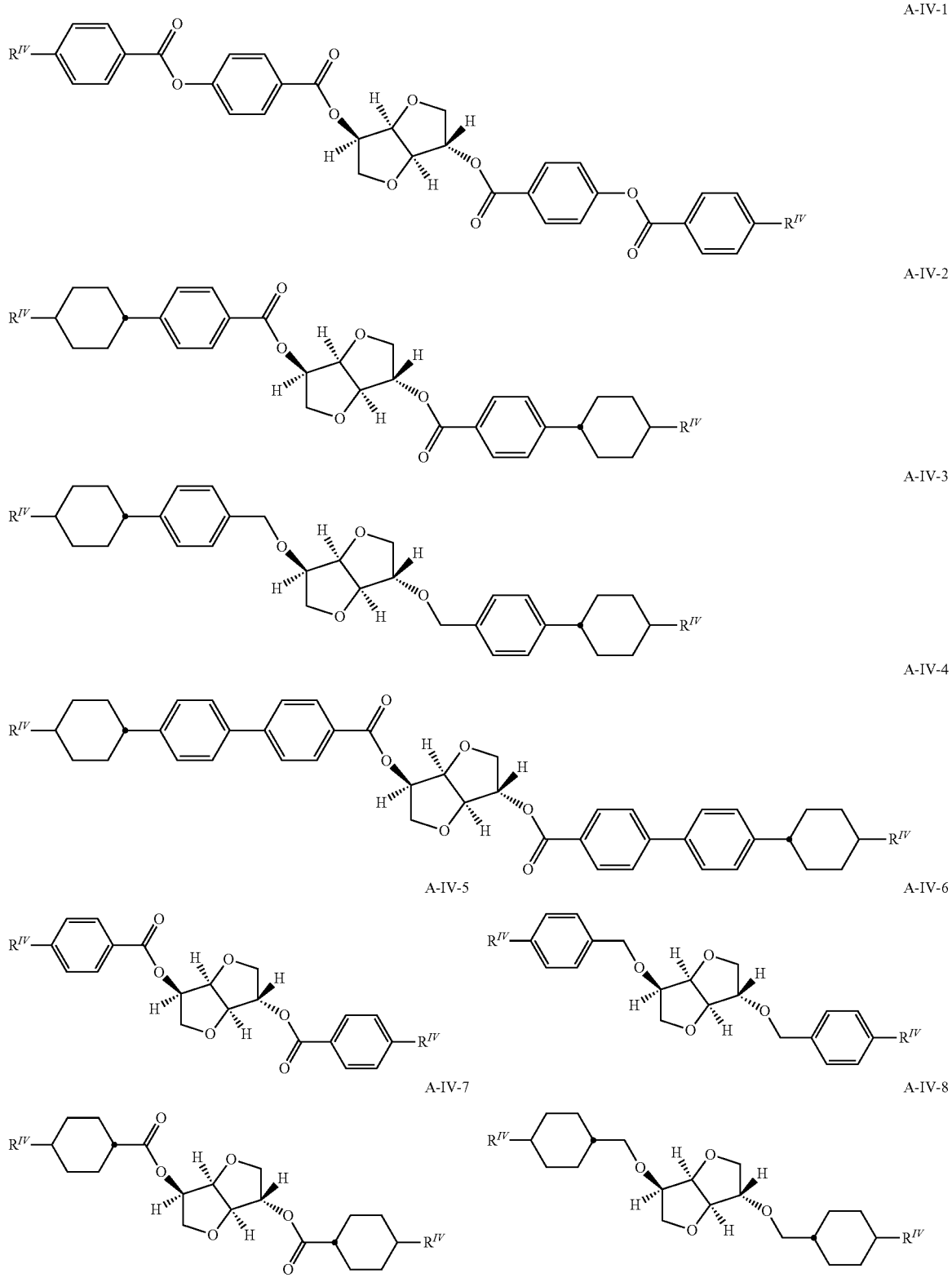
The compounds of the formula A-IV are described in WO 98/00428, which is incorporated herein by reference for its disclosure of the compounds of formula A-IV. The compounds of the formula A-V are described in GB-A-2,328, 207, which is incorporated herein by reference for its disclosure of the compounds of formula A-V.

Very particularly preferred dopants are chiral binaphthyl derivatives, as described in WO 02/94805, which is incorporated herein by reference for its disclosure of the chiral binaphthyl derivatives, chiral binaphthol acetal derivatives, as described in WO 02/34739, which is incorporated herein by reference for its disclosure of the chiral binaphthol acetal derivatives, chiral TADDOL derivatives, as described in WO 02/06265, which is incorporated herein by reference for its disclosure of the chiral TADDOL derivatives, and chiral dopants having at least one fluorinated bridging group and a terminal or central chiral group, as described in WO 02/06196 and WO 02/06195, which are incorporated herein by reference for their disclosures of the chiral dopants having at least one fluorinated bridging group and a terminal or central chiral group.

Particular preference is given to chiral compounds of the formula A-VI

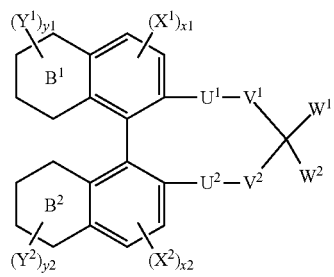

A-VI in which
X$^1$, X$^2$, Y$^1$ and Y$^2$ are each, independently of one another, F, Cl, Br, I, CN, SCN, SF$_5$, straight-chain or branched alkyl having from 1 to 25 carbon atoms, which is unsubstituted or monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH═CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group,
x$^1$ and x$^2$ are each, independently of one another, 0, 1 or 2,
y$^1$ and y$^2$ are each, independently of one another, 0, 1, 2, 3 or 4,
B$^1$ and B$^2$ are each, independently of one another, an aromatic or partially or fully saturated aliphatic six-membered ring in which one or more CH groups may each be replaced by N and one or more non-adjacent CH$_2$ groups may each be replaced by 0 or S,
W$^1$ and W$^2$ are each, independently of one another, —Z$^1$-A$^1$-(Z$^2$-A$^2$)$_m$-R, and one of the two is alternatively R$^1$ or A$^3$, but both are not simultaneously H, or

is

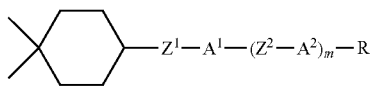

or

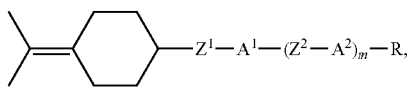

U$^1$ and U$^2$ are each, independently of one another, CH$_2$, O, S, CO or CS,
V$^1$ and V$^2$ are each, independently of one another, (CH$_2$)$_n$, in which from one to four non-adjacent CH$_2$ groups may each be replaced by O or S, and one of V$^1$ and V$^2$ and, in the case where

is

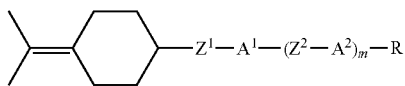

both are a single bond,
n is 1, 2 or 3
Z$^1$ and Z$^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH═N—, —N═CH—, —N═N—, —CH═CH—, —CF═CH—, —CH═CF—, —CF═CF—, —C≡C—, a combination of two of these groups, where no two O and/or S and/or N atoms are bonded directly to one another, preferably —CH═CH—COO—, or —COO—CH═CH—, or a single bond,
A$^1$, A$^2$ and A$^3$ are each, independently of one another, 1,4-phenylene, in which one or two non-adjacent CH groups may each be replaced by N, 1,4-cyclohexylene, in which one or two non-adjacent CH$_2$ groups may each be replaced by 0 or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydro-naphthalene-2,6-diyl, where each of these groups may be monosubstituted or polysubstituted by L, and in addition A$^1$ can be a single bond,
L is a halogen atom, preferably F, CN, NO$_2$, alkyl, alkoxy, alkylcarbonyl, alkoxycarbonyl or alkoxycarbonyloxy having 1-7 carbon atoms, in which one or more H atoms may each be replaced by F or Cl,
m is in each case, independently, 0, 1, 2 or 3, and
R and R$^1$ are each, independently of one another, H, F, Cl, Br, I, CN, SCN, SF$_5$, straight-chain or branched alkyl having from 1 or 3 to 25 carbon atoms respectively, which may optionally be monosubstituted or polysubstituted by F, Cl, Br, I or CN, and in which one or more non-adjacent $CH_2$ groups may each be replaced by —O—, —S—, —NH—, —$NR^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

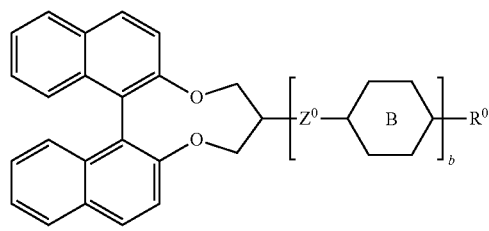

A-VI-1 in which ring B, $R^0$ and $Z^0$ are as defined for the formulae A-IV and A-V, and b is 0, 1, or 2, in particular those selected from the following formulae A-VI-1a to A-VI-1c:

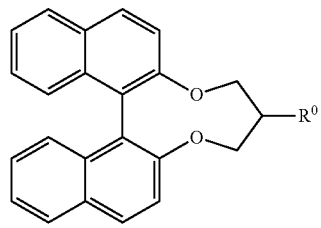

A-VI-1a

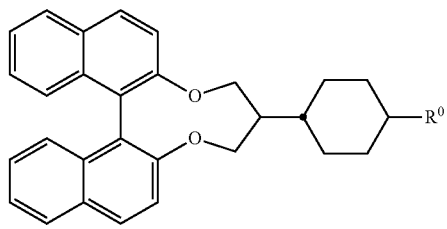

A-VI-1b

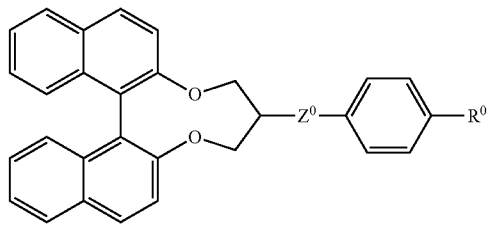

A-VI-1c in which ring B, $R^0$, and $Z^0$ are as defined for the formula A-VI-1, and $R^0$ as defined for formula A-IV or H or alkyl having from 1 to 4 carbon atoms, and b is 0, 1 or 2, and $Z^0$ is, in particular, —OC(O)— or a single bond.

The concentration of the one or more chiral dopant(s), in the LC medium is preferably in the range from 0.001% to 20%, preferably from 0.05% to 5%, more preferably from 0.1% to 2%, and, most preferably from 0.5% to 1.5%. These preferred concentration ranges apply in particular to the chiral dopant S-4011 or R-4011 (both from Merck KGaA) and for chiral dopants having the same or a similar HTP. For Chiral dopants having either a higher or a lower absolute value of the HTP compared to S-4011 these preferred concentrations have to be decreased, respectively increased proportionally according to the ratio of their HTP values relatively to that of S-4011.

The pitch p of the LC media or host mixtures according to the invention is preferably in the range of from 5 to 50 µm, more preferably from 8 to 30 µm and particularly preferably from 10 to 20 µm.

Preferably, the media according to the invention, comprise a stabiliser selected from the group of compounds of the formulae ST-1 to ST-18.

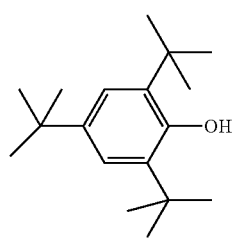

ST-1

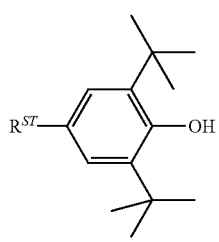

ST-2

ST-3
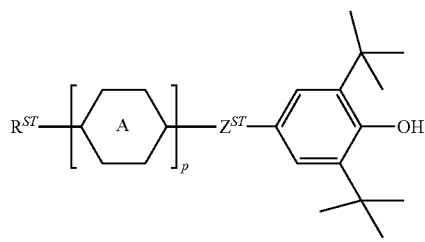
ST-4
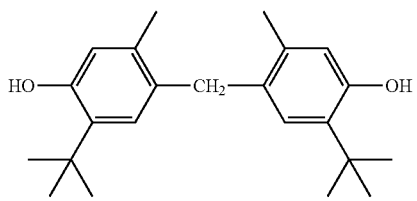
ST-5
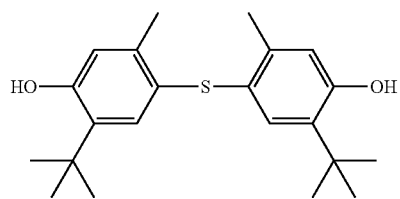
ST-6
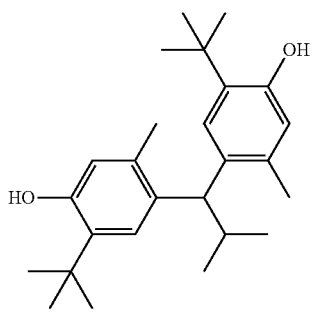
ST-7
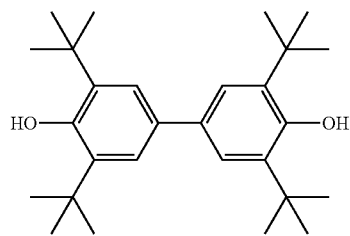
ST-8
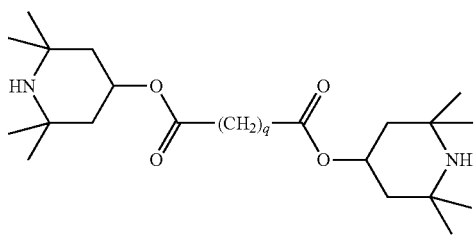
ST-9
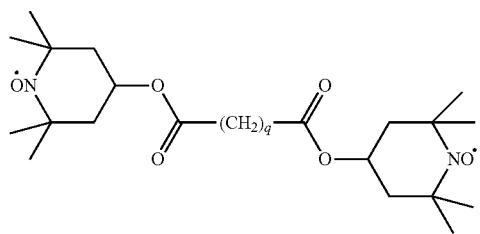
ST-10
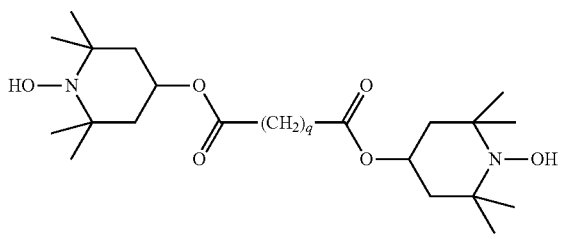
ST-11
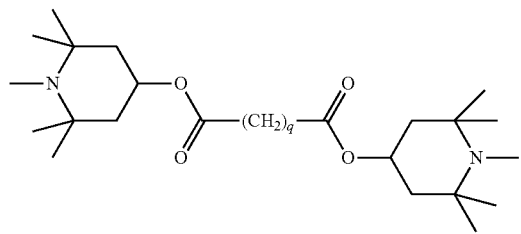
ST-12
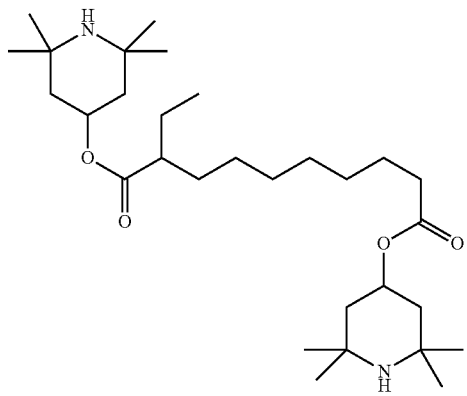

-continued
ST-13
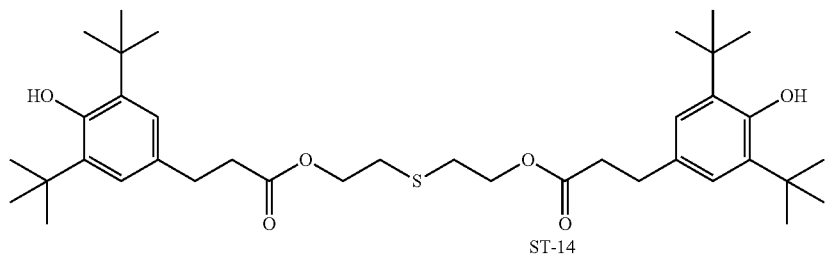
ST-14
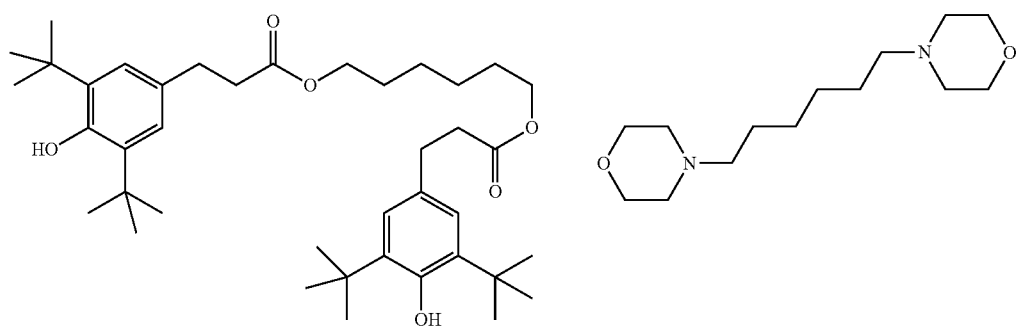
ST-15
ST-16
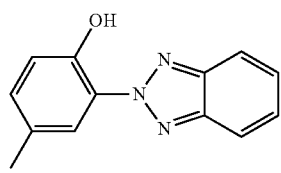
ST-17
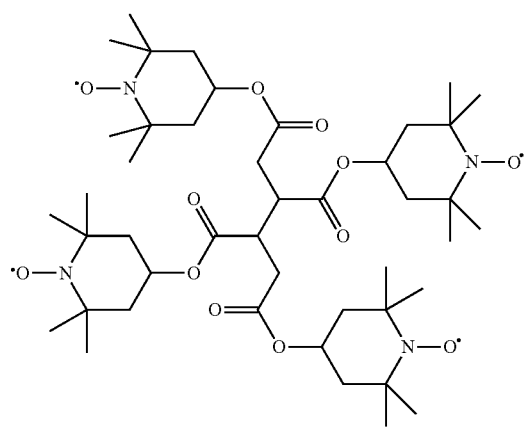
ST-18
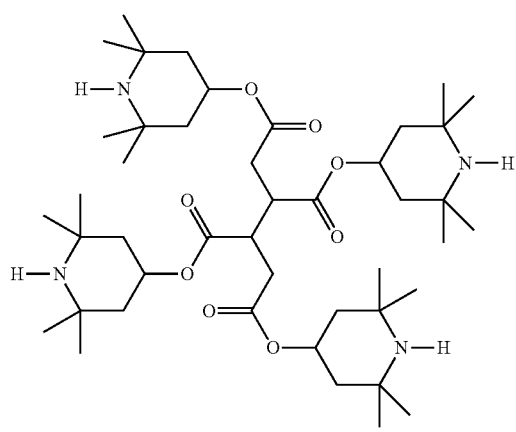

$R^{ST}$ denotes H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—, —CH=CH—,
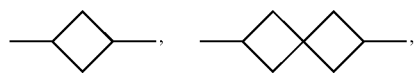
—O—, —CO—O—, —O—CO— in such a way that O atoms are not linked directly to one another, and in which, in addition, one or more H atoms may be replaced by halogen,
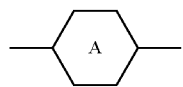
denotes
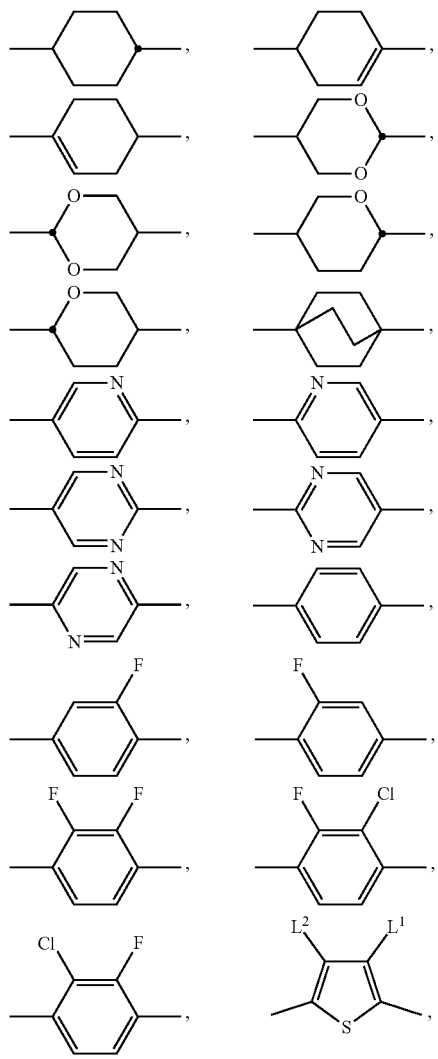
-continued
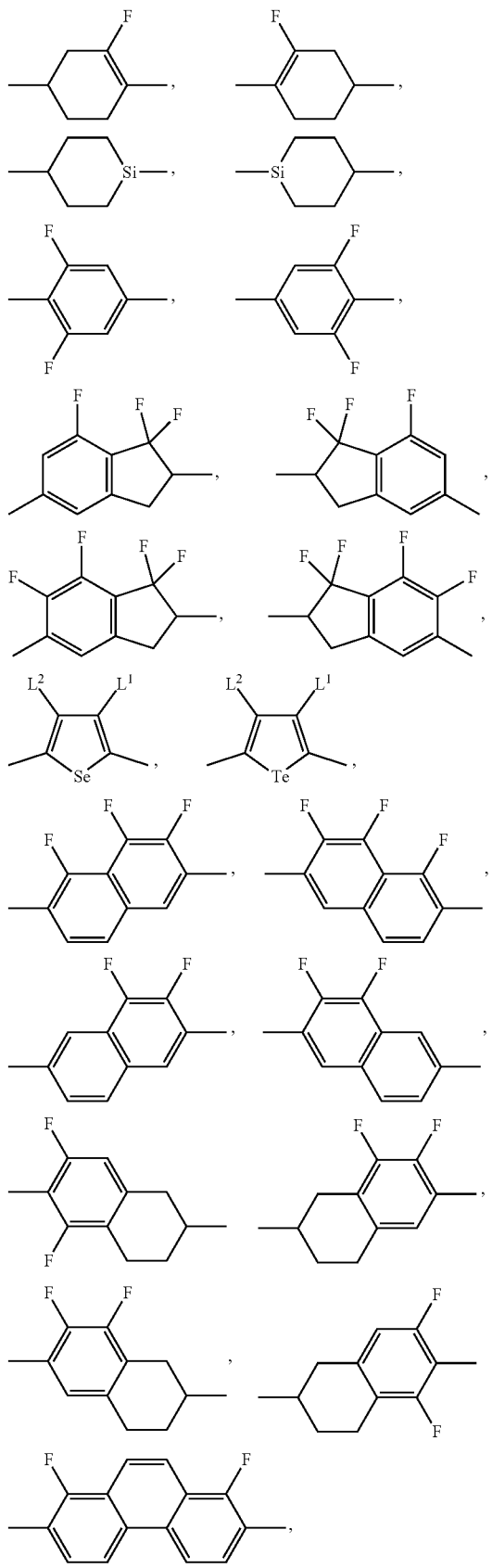

-continued

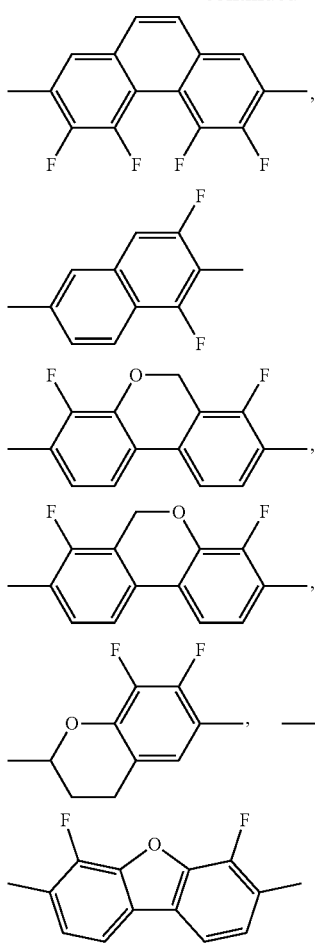

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, L$^1$ and L$^2$ each, independently of one another, denote F, Cl, CF$_3$ or CHF$_2$, p denotes 1 or 2, q denotes 1, 2, 3, 4, 5, 6, 7, 8, 9 or 10.

Of the compounds of the formula ST, special preference is given to the compounds of the formulae

ST-1

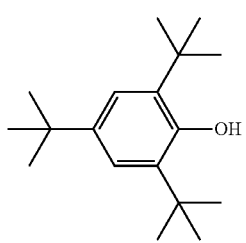

-continued

ST-2a

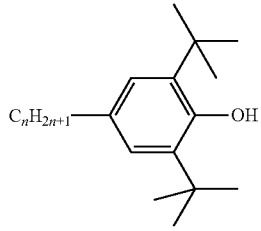

in which n=1, 2, 3, 4, 5, 6 or 7, preferably n=1 or 7

ST-3a

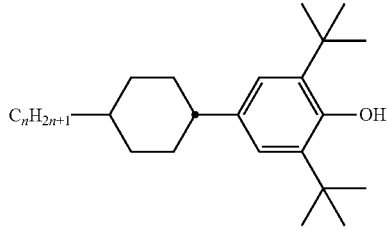

in which n=1, 2, 3, 4, 5, 6 or 7, preferably n=3

ST-3b

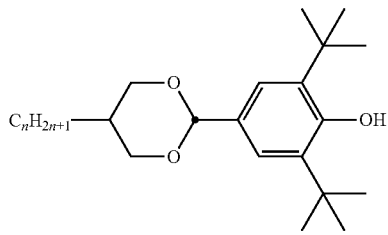

in which n=1, 2, 3, 4, 5, 6 or 7, preferably n=3

ST-8-1

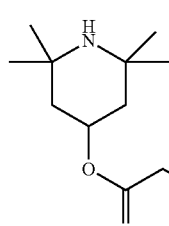
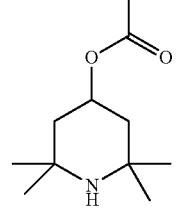

ST-9-1
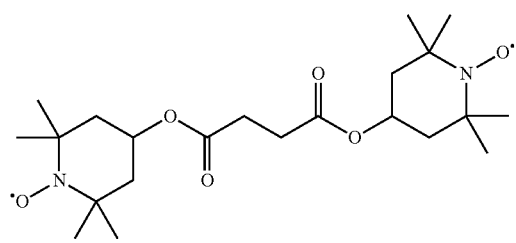
ST-12
ST-18
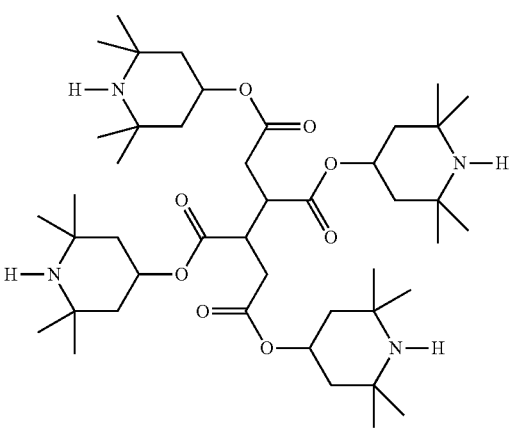
In the compounds of the formulae ST-3a and ST-3b, n preferably denotes 3. In the compounds of the formula ST-2a, n preferably denotes 7.
Very particularly preferred mixtures according to the invention comprise one or more stabilisers from the group of the compounds of the formulae ST-2a-1, ST-3a-1, ST-3b-1, ST-8-1, ST-9-1 and ST-12:
ST-2a-1
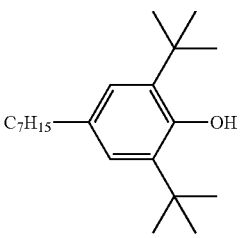
ST-16
ST-17
ST-3a-1
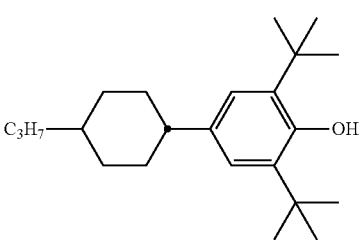
ST-3b-1
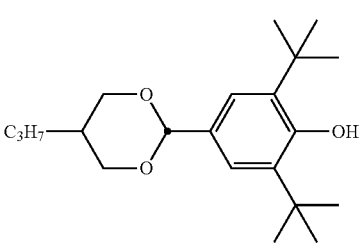

-continued

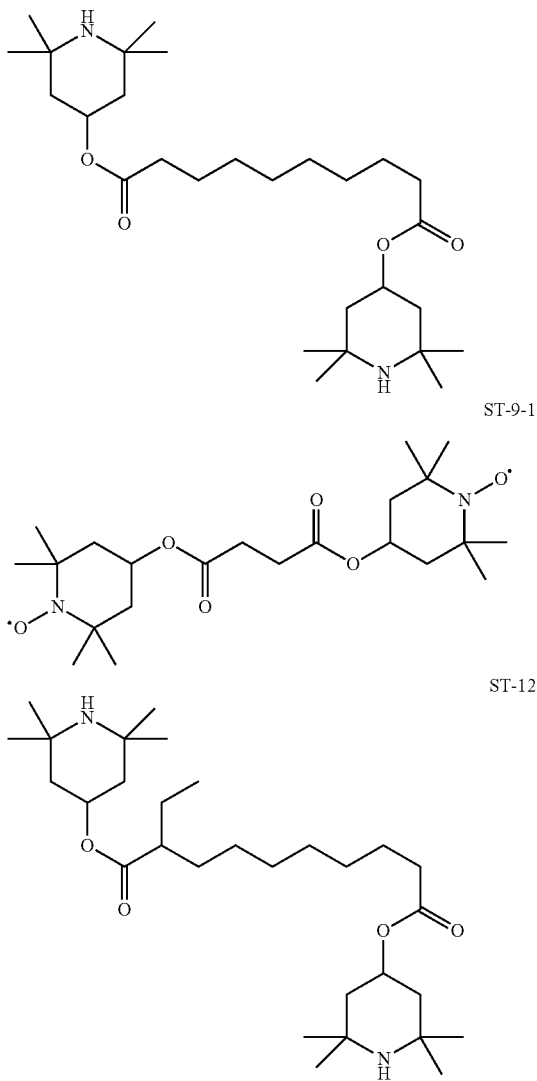

ST-8-1

ST-9-1

ST-12

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

The compounds according to the present invention can be synthesized by or in analogy to known methods described in the literature (for example in the standard works such as Houben-Weyl, Methoden der Organischen Chemie [Methods of Organic Chemistry], Georg-Thieme-Verlag, Stuttgart), under reaction conditions which are known and suitable for said reactions. Use may also be made here of variants which are known per se, but are not mentioned here. In particular, they can be prepared as described in or in analogy to the following reaction schemes. Further methods for preparing the inventive compounds can be taken from the examples.

Other mesogenic compounds which are not explicitly mentioned above can optionally and advantageously also be used in the media in accordance with the present invention. Such compounds are known to the person skilled in the art.

In a preferred embodiment of the present invention, the total concentration of compounds of formula T in the liquid-crystalline medium is 5% or more, preferably 10% or more, and particularly preferably 12% or more.

In a preferred embodiment of the present invention, the liquid-crystalline media preferably comprise in total 5% to 30%, preferably 8% to 20% and particularly preferably 10% to 18% of compounds of formula T.

In another preferred embodiment of the present invention, the liquid-crystalline media preferably comprise in total 3% to 25%, preferably 7% to 22% and particularly preferably 12% to 18% of compounds of formula T.

In a preferred embodiment of the present invention, the liquid-crystalline medium comprises in total 30% or more, preferably 40% or more and particularly preferably 50% or more compounds of formula I.

In a preferred embodiment of the present invention, the liquid-crystalline medium comprises in total 30% or more, preferably 40% or more and particularly preferably 50% or more compounds of formula I, preferably selected from the group of compounds of the I-1, I-2 and I-3, particularly preferably selected from the compounds of the formulae I-2 and I-3.

In a preferred embodiment, the medium comprises one or more compounds of formula I-2 in a total concentration in the range of from 5% to 30%, more preferably from 10% to 25%, and particularly preferably from 15% to 20%.

In a preferred embodiment, the total concentration of the compounds of formula I-3 in the media according to the present invention is in the range of from 10% to 70%, more preferably from 20% to 60%, and particularly preferably from 25% to 55%.

In a preferred embodiment, the total concentration of the compounds of formula I-3 in the media according to the present invention is 20% or more, more preferably 25% or more and particularly preferably 30% or more.

In a preferred embodiment of the present invention the medium comprises one or more compounds of formula II in a total concentration of 5% to 35%, more preferably 10% to 30%, particularly preferably 15% to 25%.

In a preferred embodiment of the present invention the medium comprises one or more compounds of formula II-1 in a total concentration of 5% to 25%, more preferably 7% to 20%, particularly preferably 10% to 15%.

In a preferred embodiment of the present invention the medium comprises one or more compounds of formula II-1 in an total concentration of 25% or less, more preferably 20% or less, particularly preferably 15% or less, very particularly preferably 10% or less.

In a preferred embodiment of the present invention the medium comprises one or more compounds of formula III, preferably III-1, in a total concentration of 2% to 25%, more preferably 5% to 20%, particularly preferably 8% to 16%.

Further preferred embodiments of the present invention, taken alone or in combination with one another, are as follows, wherein some compounds are abbreviated using the acronyms given in Table C:

The medium comprises one or more compounds of formula T-1;

The medium comprises one or more compounds of formula T-2;

The medium comprises one or more compounds of formula T-1 and T-2;

The medium comprises one or more compounds of formula T-1 and/or

T-2 and one or more compounds of formula I and or II and or III;

The medium comprises one or more compounds of formula III-1;

The medium comprises the compound CP-V2-T;

The medium comprises the compound PTU-V2-OT, preferably in a concentration in the range of from 2% to 10%;

The medium comprises two or more compounds of formula T-1;

The medium comprises two or more compounds of formula T-2;

The medium comprises the compound PPU-TO-S;

The medium comprises one or more compounds of formula T and one or more compounds of formula II-1, preferably in a total concentration in the range of from 20 to 60%, more preferably from 25 to 50%, particularly preferably from 30 to 45%;

The medium comprises one or more compounds of formula I-3b, preferably the compounds CPU-2-S and/or CPU-4-S;

The medium comprises one or more compounds of formula I-3b and formula II-1b, preferably the compounds CPU-2-S and/or CPU-4-S and PTU-3-S and/or PTU-4-S and/or PTU-5-S;

The medium comprises one or more compounds of formula PPTU-n-S in an total concentration in the range of from 10 to 20%;

The medium comprises one or more compounds of formula PPTU-n-S and PGTU-n-S in an total concentration in the range of from 15 to 25%;

The medium comprises one or more compounds of formula ST-3, preferably ST-3a and/or ST-3b, particularly preferably ST-3b-1, in a total concentration in the range of from 0.01 to 1%, preferably from 0.05 to 0.5%, particularly from 0.10 to 0.15%.

The liquid-crystal media in accordance with the present invention preferably have a clearing point of 90° C. or more, more preferably 100° C. or more, more preferably 110° C. or more, more preferably 120° C. or more, more preferably 130° C. or more, particularly preferably 140° C. or more and very particularly preferably 150° C. or more.

The liquid-crystal media in accordance with the present invention preferably have a clearing point of 160° C. or less, more preferably 140° C. or less, particularly preferably 120° C. or less, and very particularly preferably 100° C. or less.

The nematic phase of the media according to the invention preferably extends at least from 0° C. or less to 90° C. or more. It is advantageous for the media according to the invention to exhibit even broader nematic phase ranges, preferably at least from −10° C. or less to 120° C. or more, very preferably at least from −20° C. or less to 140° C. or more and in particular at least from −30° C. or less to 150° C. or more, very particularly preferably at least from −40° C. or less to 170° C. or more.

The $\Delta\varepsilon$ of the liquid-crystal medium according to the present invention, at 1 kHz and 20° C., is preferably 1 or more, more preferably 2 or more and very preferably 3 or more.

The $\Delta n$ of the liquid-crystal media according to the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a preferred embodiment of the present application, the $\Delta n$ of the liquid-crystal media in accordance with the present invention is preferably 0.50 or more, more preferably 0.55 or more.

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

The compounds of the formulae I, II and III are preferably dielectrically positive.

In the present application, the expression dielectrically positive describes compounds or components where $\Delta\varepsilon>3.0$, dielectrically neutral describes those where $-1.5 \Delta\varepsilon 3.0$ and dielectrically negative describes those where $\Delta\varepsilon<-1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$$\Delta\varepsilon \text{ is defined as } (\varepsilon_\parallel - \varepsilon_\perp), \text{ while } \varepsilon_{ave.} \text{ is } (\varepsilon_\parallel + 2\varepsilon_\perp)/3.$$

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 µm. The electrode is a circular ITO electrode having an area of 1.13 cm$^2$ and a guard ring. The orientation layers are SE-1211 from Nissan Chemicals, Japan, for homeotropic orientation ($\varepsilon_{r,\parallel}$) and polyimide AL-1054 from Japan Synthetic Rubber, Japan, for homogeneous orientation ($\varepsilon_{r,\perp}$). The capacitances are determined using a Solatron 1260 frequency response analyser using a sine wave with a voltage of 0.3 V$_{rms}$. The light used in the electro-optical measurements is white light. A set-up using a commercially available DMS instrument from Autronic-Melchers, Germany, is used here. The characteristic voltages have been determined under perpendicular observation. The threshold (V$_{10}$), mid-grey (V$_{50}$) and saturation (V$_{90}$) voltages have been determined for 10%, 50% and 90% relative contrast, respectively.

The liquid-crystalline media are investigated with respect to their properties in the microwave frequency range as described in A. Penirschke et al. "Cavity Perturbation Method for Characterization of Liquid Crystals up to 35 GHz", 34$^{th}$ European Microwave Conference—Amsterdam, pp. 545-548. Compare in this respect also A. Gaebler et al. "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or quartz capillary. The capillary has an inner diameter of 0.5 mm and an outer diameter of 0.78 mm. The effective length is 2.0 cm. The filled capillary is introduced into the centre of the cylindrical cavity with a resonance frequency of 19 GHz. This cavity has a length of 11.5 mm and a radius of 6 mm. The input signal (source) is then applied, and the frequency depending response of the cavity is recorded using a commercial vector network analyser (N5227A PNA Microwave Network Analyzer, Keysight Technologies Inc. USA. For other frequencies, the dimensions of the cavity are adapted correspondingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in the above-mentioned publication A. Penirschke et al., 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases in preferred ranges given above. The expression have a nematic phase here means on the one hand that no smectic phase and no crystallisation are observed at low temperatures at the corresponding temperature and on the other hand that no clearing occurs on heating from the nematic phase. At high temperatures, the clearing point is measured in capillaries by conventional methods. The investigation at low temperatures is carried out in a flow viscometer at the corresponding temperature and checked by storage of bulk samples: The storage stability in the bulk (LTS) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallisation. For every material and at each temperature two bottles are stored. If crystallisation or the appearance of a smectic phase is observed in at least one of the two correspondent bottles the test is terminated and the time of the last inspection before the one at which the occurrence of a higher ordered phase is observed is recorded as the respective storage stability. The test is finally terminated after 1000 h, i.e an LTS value of 1000 h means that the mixture is stable at the given temperature for at least 1000 h.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterised by high anisotropy values in the microwave range. The birefringence at about 19 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The dielectric anisotropy in the microwave range is defined as $$\Delta\varepsilon_r = (\varepsilon_{r,\parallel} - \varepsilon_{r,\perp}).$$

The tunability (τ) is defined as $$\tau = (\Delta\varepsilon_r / \varepsilon_{r,\parallel}).$$

The material quality (η) is defined as $$\eta \equiv (\tau / \tan \delta_{\varepsilon r,max}), \text{ where}$$

the maximum dielectric loss is $$\tan \delta_{\varepsilon r,max} \equiv \max.\{\tan \delta_{\varepsilon r,\perp}; \tan \delta_{\varepsilon r,\parallel}\}.$$

The material quality (η) of the preferred liquid-crystal materials is 6 or more, preferably 8 or more, preferably 10 or more, preferably 15 or more, preferably 17 or more, preferably 20 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, high-frequency technology means applications of electromagnetic radiation having frequencies in the range of from 1 MHz to 1 THz, preferably from 1 GHz to 500 GHz, more preferably 2 GHz to 300 GHz, particularly preferably from about 5 GHz to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.05% to 15%, more preferably from 1% to 10% and most preferably from 2% to 6%.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electro-optical response, from 0% to 90% ($t_{90}$–$t_0$), i.e. including the delay time ($t_{10}$–$t_0$), as decay time ($\tau_{off}$) for the time for the change of the relative tuning, respectively of the relative contrast for the electro-optical response, from 100% back to 10% ($t_{100}$–$t_{10}$) and as the total response time ($\tau_{total}=\tau_{on}+\tau_{off}$), respectively.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to D below. All groups $C_nH_{2n+1}$, $C_mH_{2m+1}$ and $C_nH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

| Ring elements | |
|---|---|
| 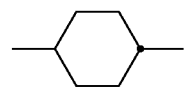 | C |
| 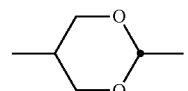 | D |
| 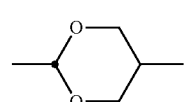 | D1 |
| 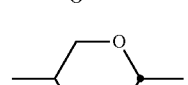 | A |
| 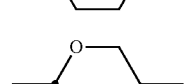 | A1 |
| 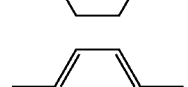 | P |

TABLE A-continued

| Ring elements | |
|---|---|
| (structure: benzene with $C_nH_{2n+1}$ and $C_mH_{2m+1}$ substituents) | P(n,m) |
| (structure: fluorobenzene) | G |
| (structure: fluorobenzene isomer) | Gl |
| (structure: difluorobenzene) | U |
| (structure: difluorobenzene isomer) | Ul |
| (structure: difluorobenzene) | Y |
| (structure: pyrimidine) | M |
| (structure: pyrimidine isomer) | Ml |
| (structure: pyridine) | N |
| (structure: pyridine isomer) | Nl |
| (structure: naphthalene) | Np |
| (structure: trifluoronaphthalene) | N3f |
| (structure: trifluoronaphthalene isomer) | N3fl |
| (structure: tetrahydronaphthalene) | tH |
| (structure: tetrahydronaphthalene isomer) | tHl |
| (structure: difluoro-tetrahydronaphthalene) | tH2f |
| (structure: difluoro-tetrahydronaphthalene isomer) | tH2fl |
| (structure: decahydronaphthalene) | dH |
| (structure: trifluoroindane) | K |
| (structure: trifluoroindane isomer) | Kl |
| (structure: cyclohexene) | L |

TABLE A-continued
| Ring elements | |
|---|---|
|  | Ll |
| 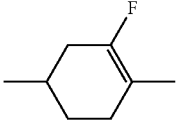 | F |
| 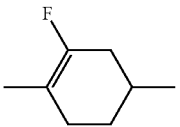 | Fl |
| 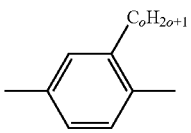 | P(o) |
| 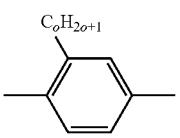 | Pl(o) |
| 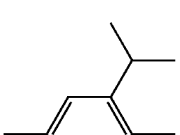 | P(i3) |
| 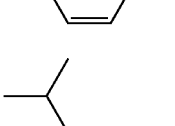 | Pl(ic3) |
| 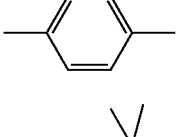 | P(t4) |
| 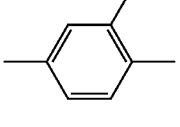 | Pl(t4) |
| 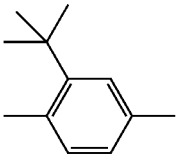 | P(c3) |
| 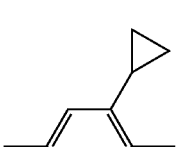 | Pl(c3) |
| 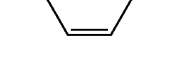 | P(c4) |
| 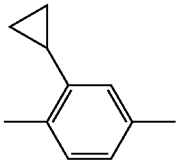 | Pl(c4) |
| 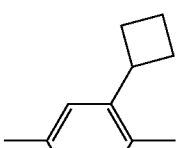 | P(c5) |
| 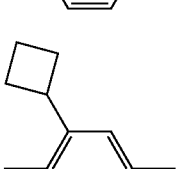 | Pl(c5) |
| 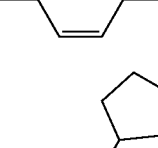 | P(e5) |
| 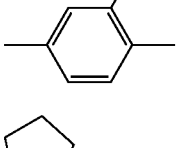 | Pl(e5) |
| 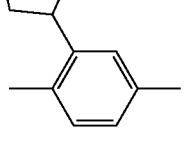 | P(c6) |

TABLE A-continued
| Ring elements | |
|---|---|
| 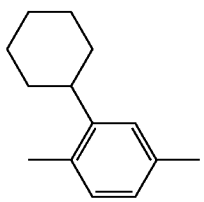 | Pl(c6) |
| 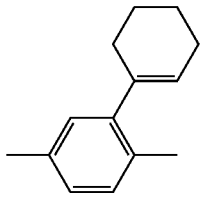 | P(e6) |
| 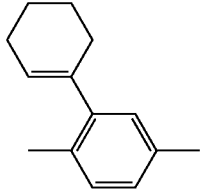 | Pl(e6) |
| 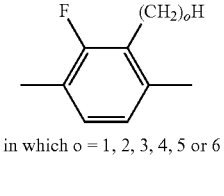<br>in which o = 1, 2, 3, 4, 5 or 6 | Gl(o) |
| 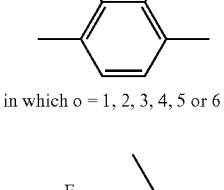<br>in which o = 1, 2, 3, 4, 5 or 6 | G(o) |
| 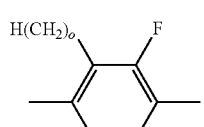 | Gl(i3) |
| 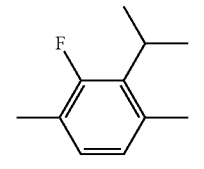 | G(i3) |
| 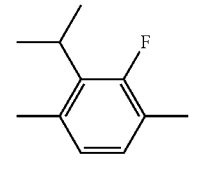 | Gl(t4) |
TABLE A-continued
| Ring elements | |
|---|---|
| 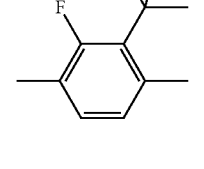 | G(t4) |
| 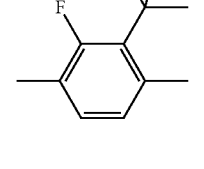 | Gl(c3) |
| 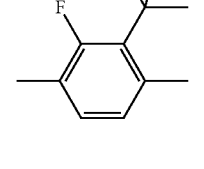 | G(c3) |
| 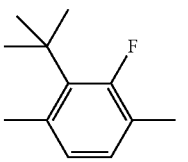 | Gl(c4) |
| 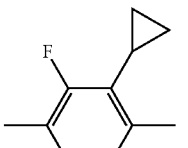 | G(c4) |
| 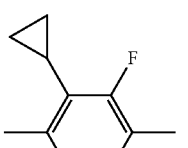 | Gl(c5) |
| 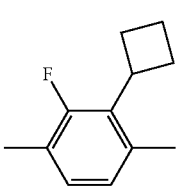 | G(c5) |
| 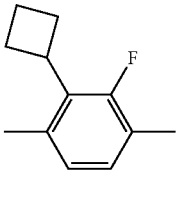 | Gl(e5) |

TABLE A-continued

Ring elements

G(e5)

G1(c6)

G(c6)

G1(e6)

G(e6)

Np(1,4)

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE B

End groups

| Left-hand side | | Right-hand side | |
|---|---|---|---|
| Used alone | | | |
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Used in combination with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |

TABLE B-continued

| End groups | | | |
|---|---|---|---|
| Left-hand side | | Right-hand side | |
| -...K...- | —CO— | -...K... | —CO— |
| -...W...- | —CF=CF— | -...W... | —CF=CF— | in which n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which are preferably used.

TABLE C

Illustrative structures

The following illustrative structures are compounds, which are preferably additionally used in the media:

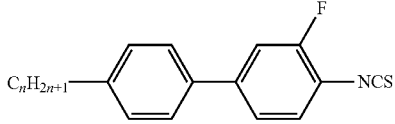
PG-n-S

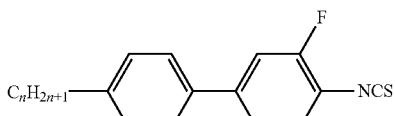
PU-n-S

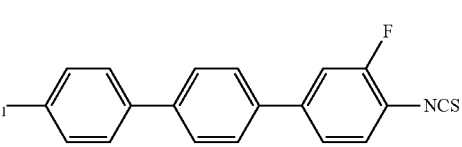
PPG-n-S

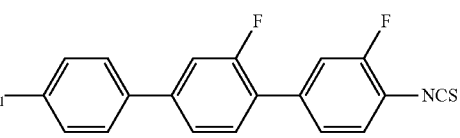
PGG-n-S

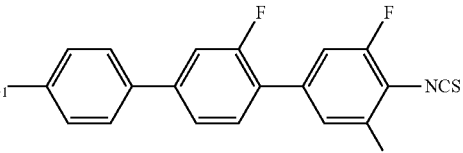
PPU-n-S

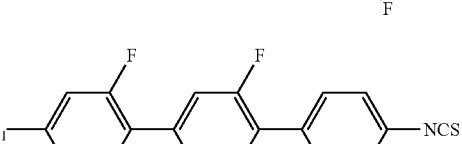
GGP-n-S

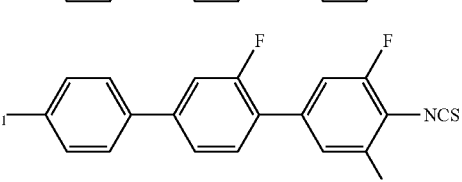
PGU-n-S

TABLE C-continued
Illustrative structures
The following illustrative structures are compounds, which are preferably additionally used in the media:
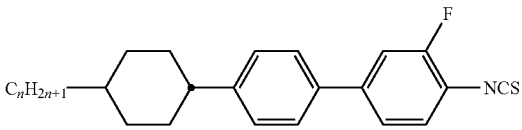 CPG-n-S
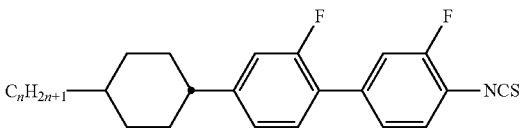 CGG-n-S
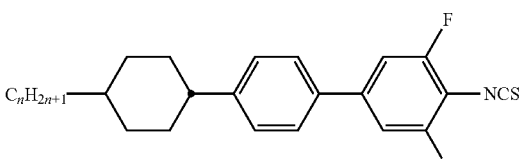 CPU-n-S
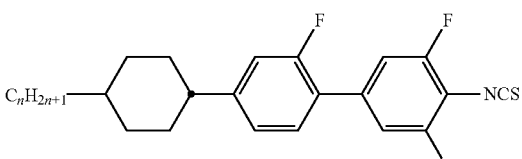 CGU-n-S
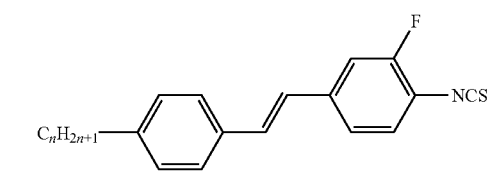 PVG-n-S
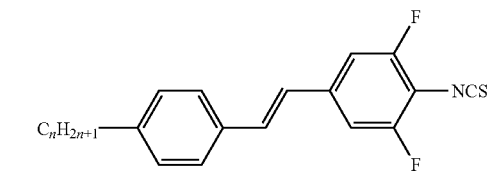 PVU-n-S
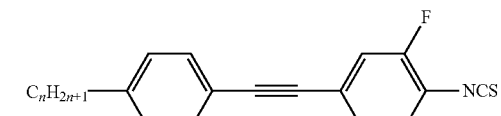 PTG-n-S
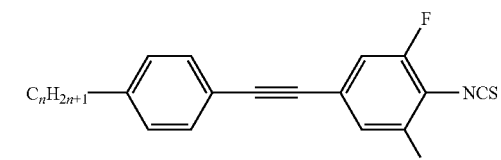 PTU-n-S
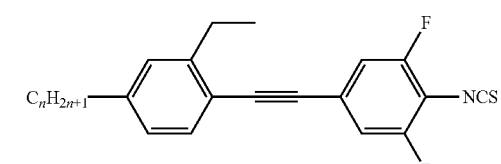 P(2)TU-n-S TABLE C-continued
Illustrative structures
The following illustrative structures are compounds, which are preferably additionally used in the media:
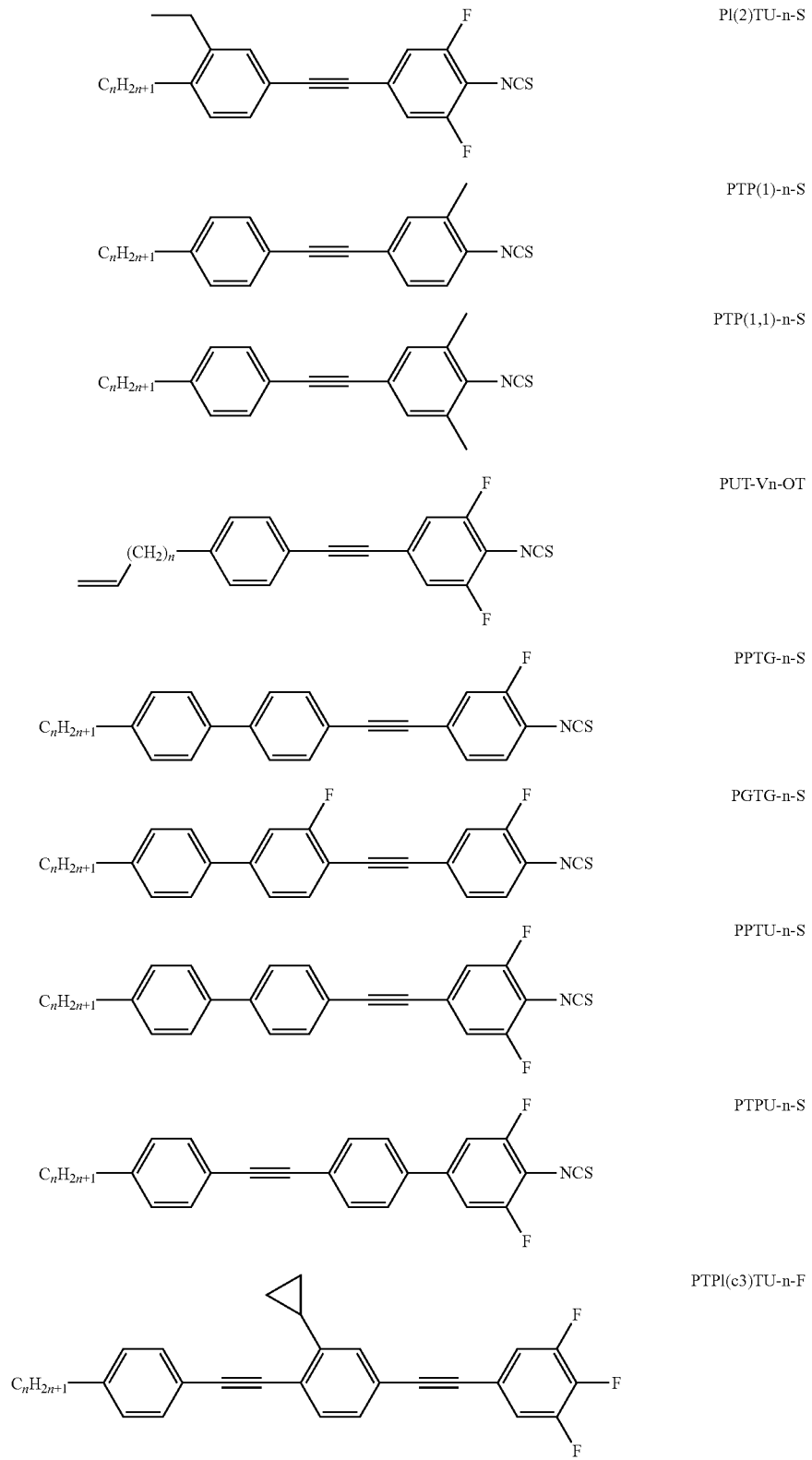

TABLE C-continued
Illustrative structures
The following illustrative structures are compounds, which are preferably additionally used in the media:
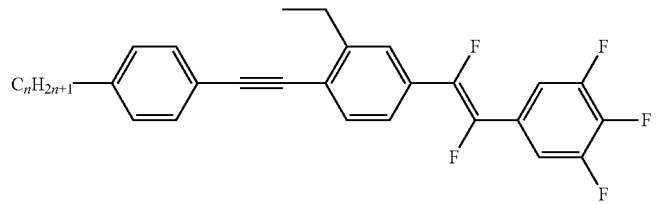 PTPl(2)WU-n-F
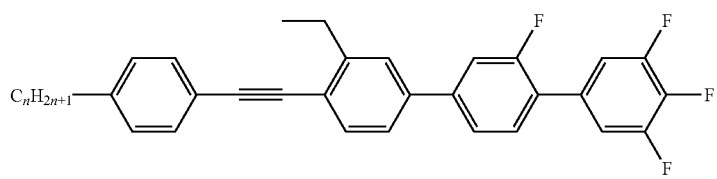 PTPl(2)GU-n-F
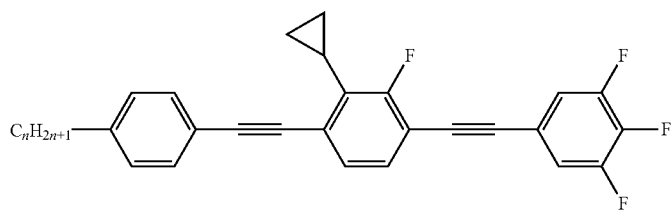 PTG(c3)TU-n-F
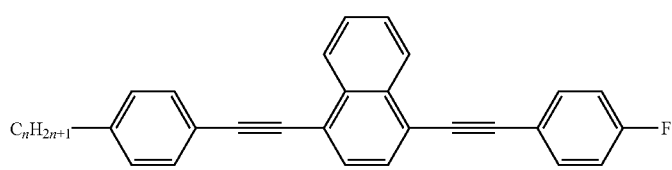 PTN(1,4)TP-n-F
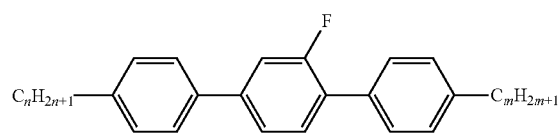 PGP-n-m
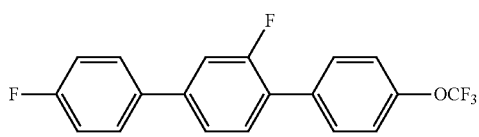 [SMILES: Fc1ccc(-c2ccc(-c3ccc(OC(F)(F)F)cc3)c(F)c2)cc1] PGP-F-OT
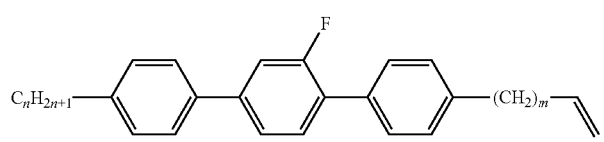 PGP-n-mV
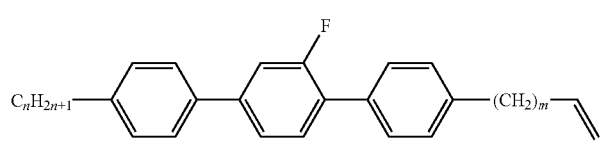 PGP-n-mVl
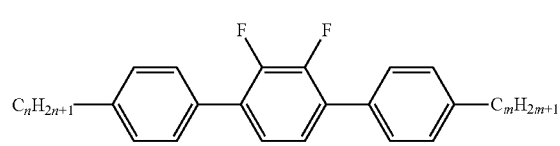 PYP-n-m TABLE C-continued
Illustrative structures
The following illustrative structures are compounds, which are preferably additionally used in the media:
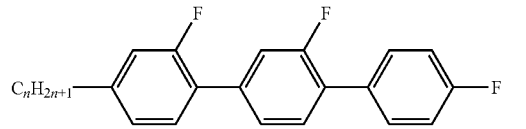
GGP-n-F
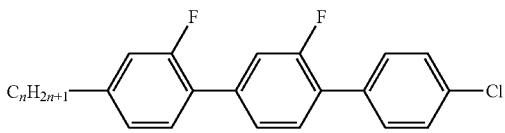
GGP-n-CL
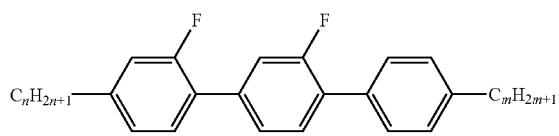
GGP-n-m
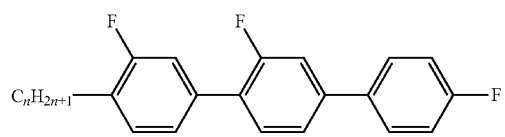
PGlGl-n-F
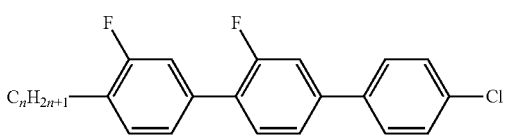
PGlGl-n-CL
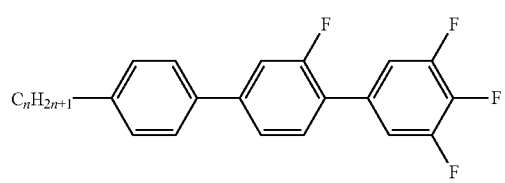
PGU-n-F
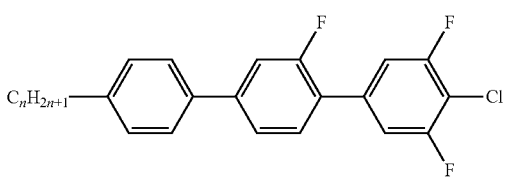
PGU-n-CL
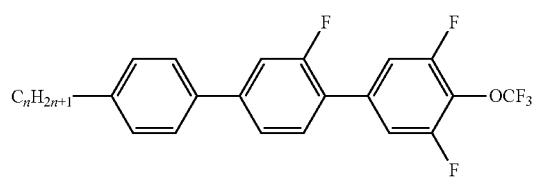
PGU-n-OT
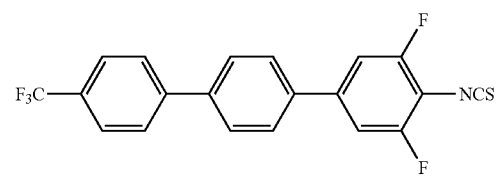
PPU-T-S TABLE C-continued
Illustrative structures
The following illustrative structures are compounds, which are preferably additionally used in the media:
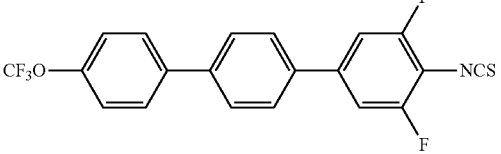 PPU-TO-S
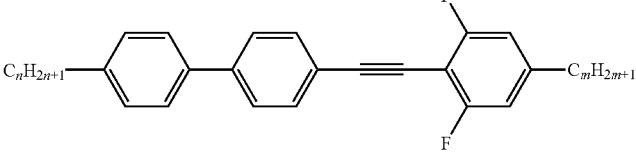 PPTUl-n-m
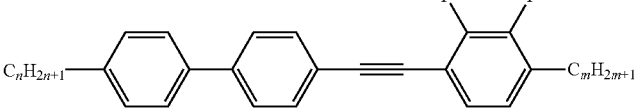 PPTY-n-m
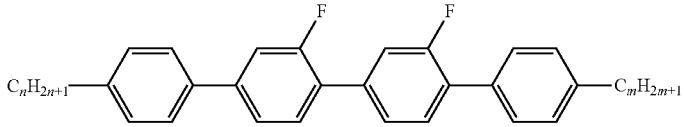 PGGP-n-m
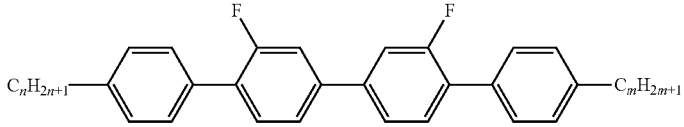 PGIGP-n-m
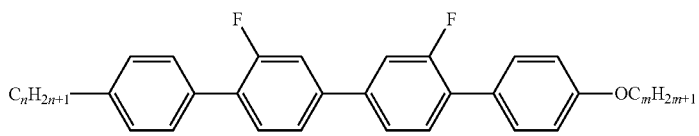 PGIGP-n-Om
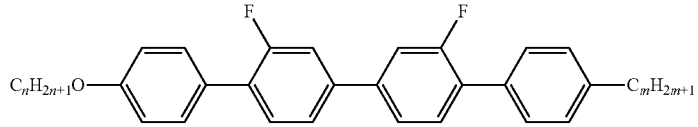 PGIGP-nO-m
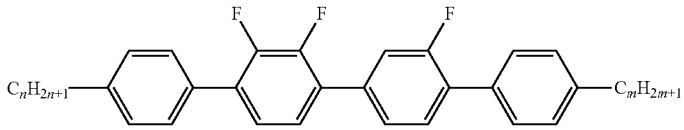 PYGP-n-m
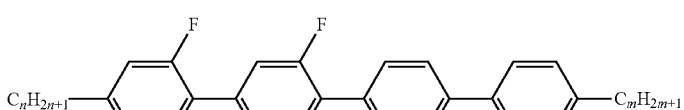 GGPP-n-m
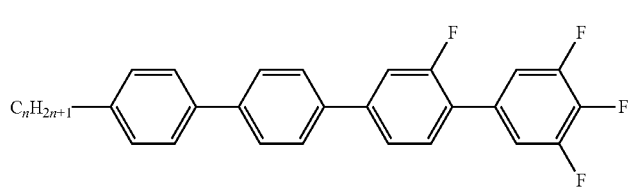 PPGU-n-F TABLE C-continued
Illustrative structures
The following illustrative structures are compounds, which are preferably additionally used in the media:
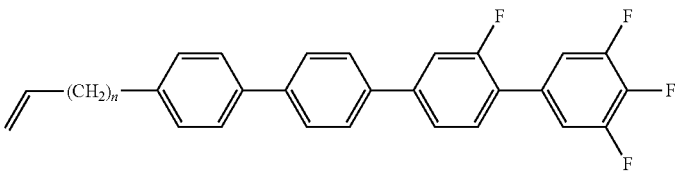 PPGU-Vn-F
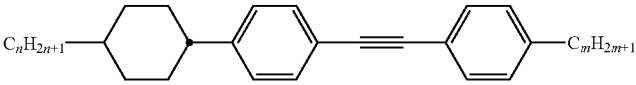 CPTP-n-m
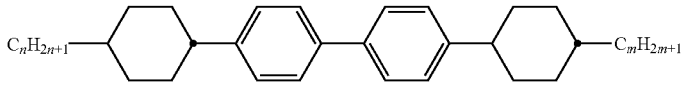 CPPC-n-m
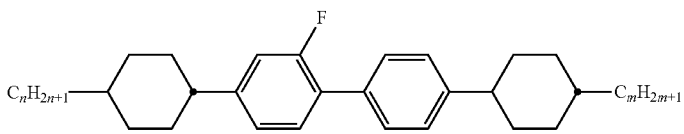 CGPC-n-m
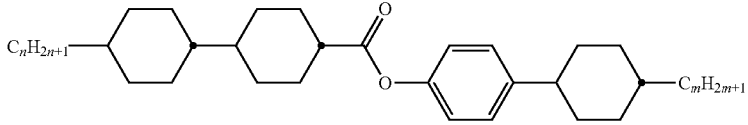 CCZPC-n-m
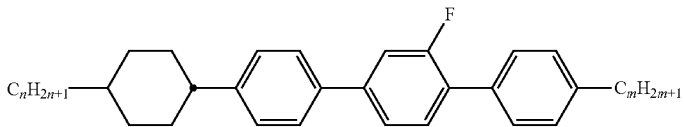 CPGP-n-m
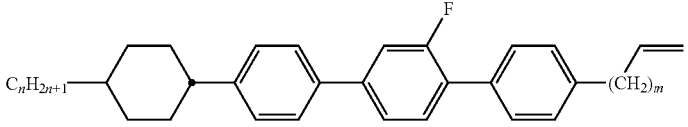 CPGP-n-mV
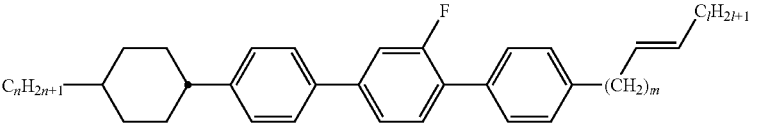 CPGP-n-mVl
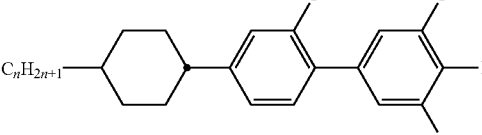 CGU-n-F
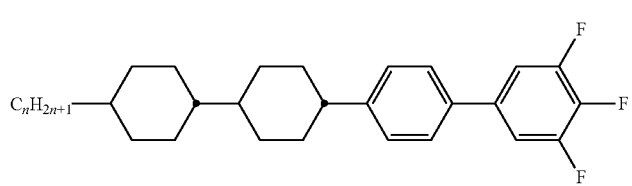 CCPU-n-F TABLE C-continued
Illustrative structures
The following illustrative structures are compounds, which are preferably additionally used in the media:
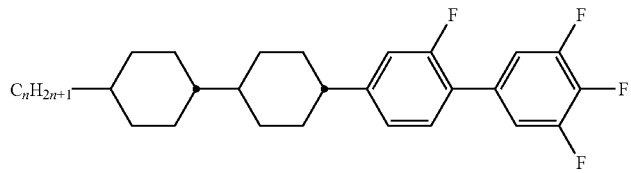 CCGU-n-F
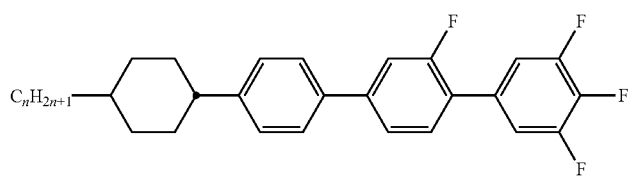 CPGU-n-F
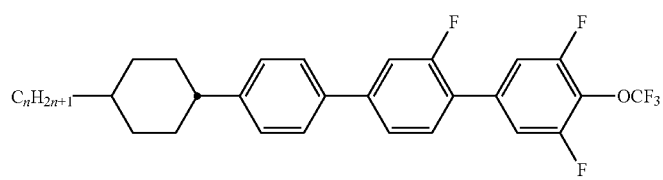 CPGU-n-OT
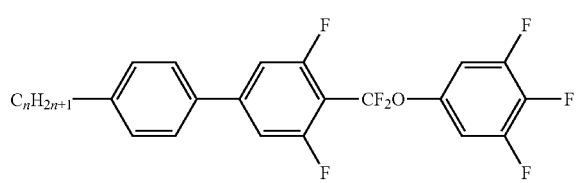 PUQU-n-F
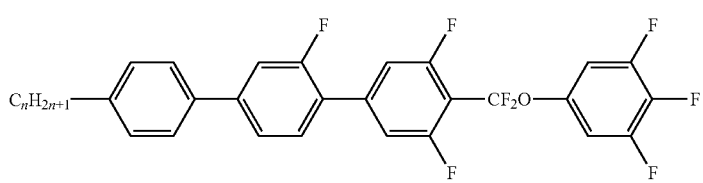 PGUQU-n-F
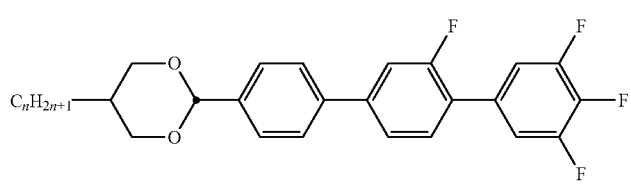 DPGU-n-F
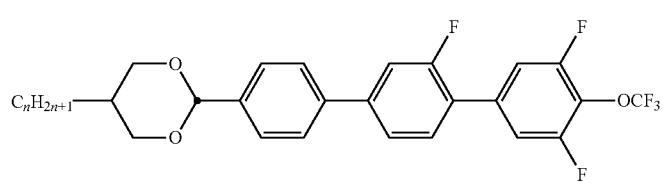 DPGU-n-OT
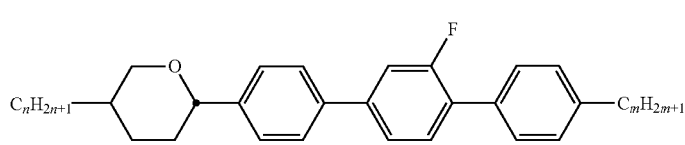 APGP-n-m The following table, Table E, shows illustrative compounds which can be used as stabiliser in the mesogenic media in accordance with the present invention. The total concentration of these and similar compounds in the media is preferably 5% or less.
TABLE E
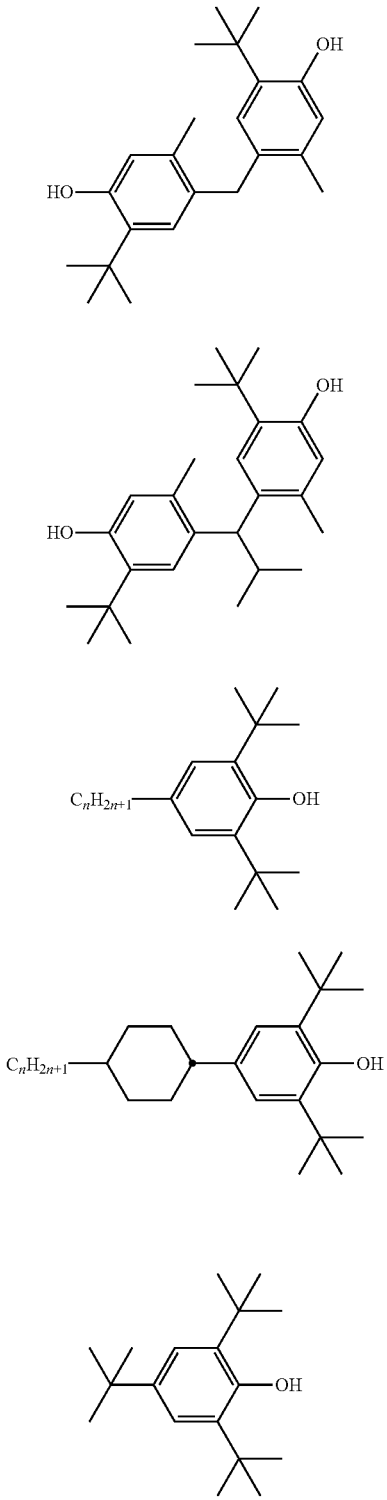
TABLE E-continued
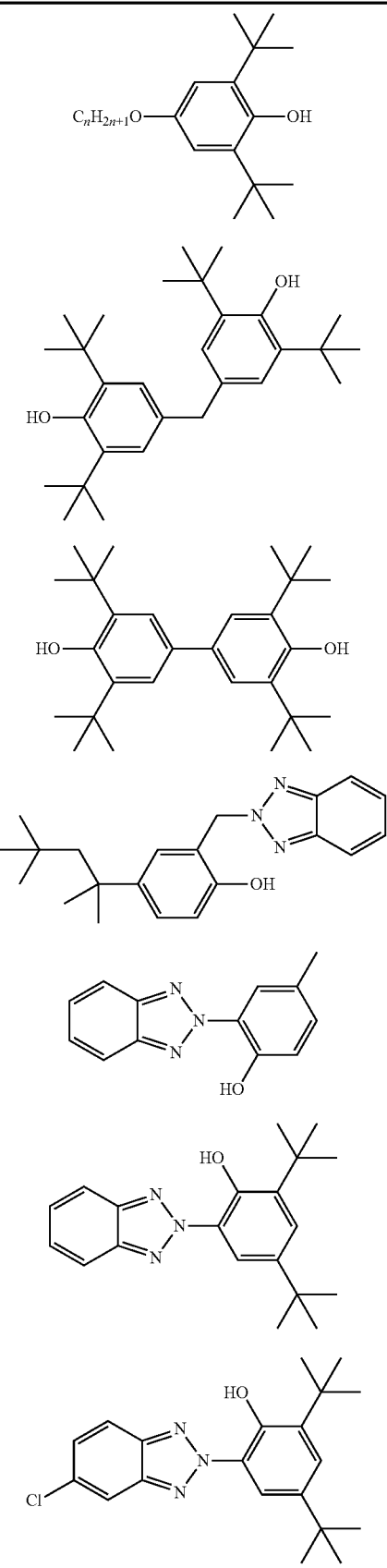

TABLE E-continued
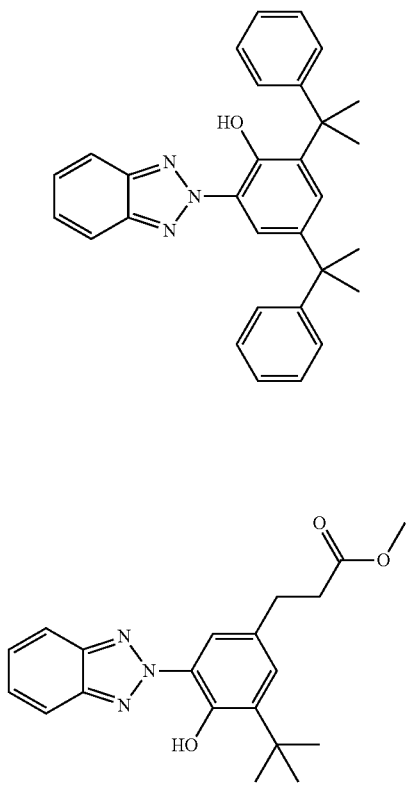
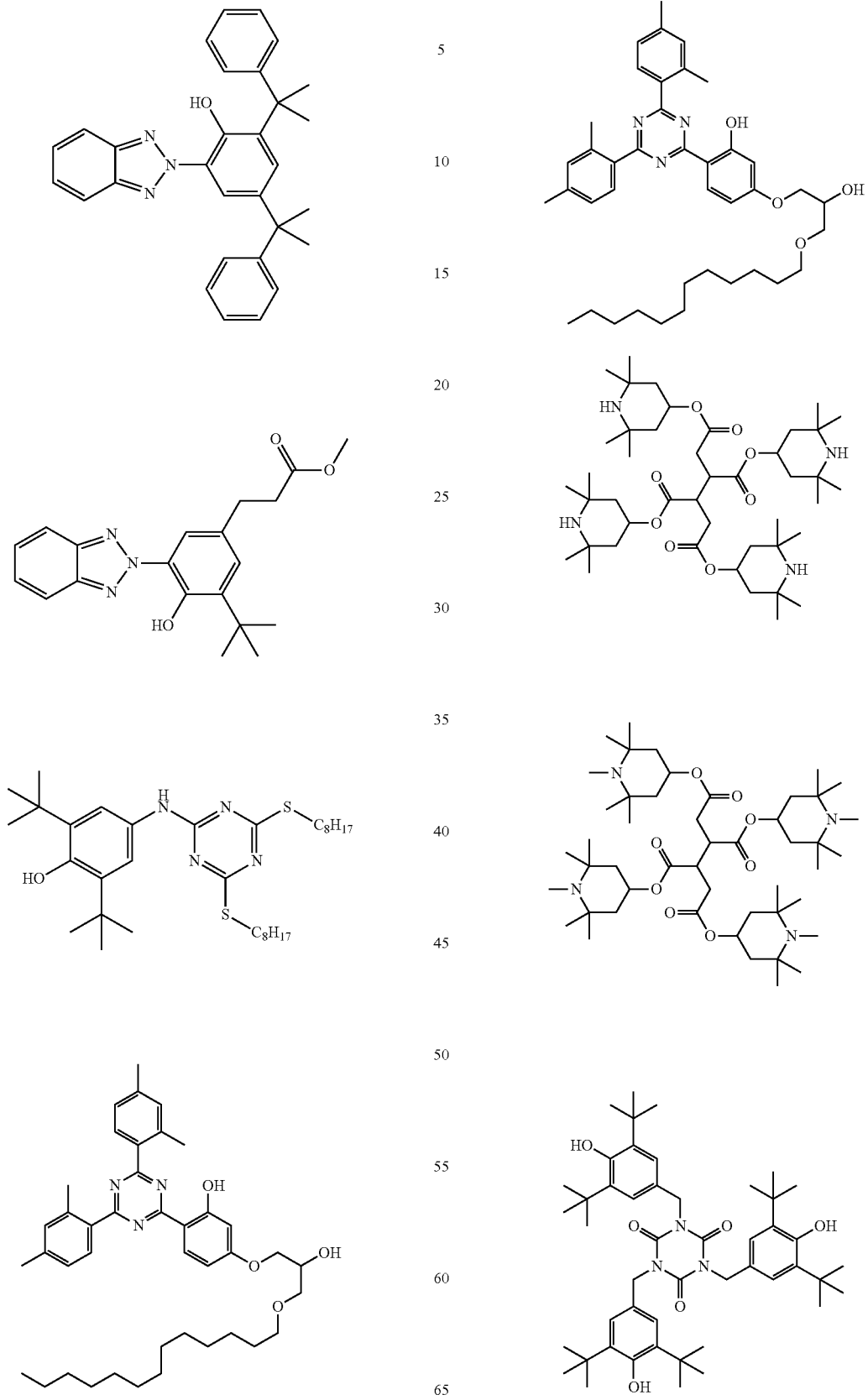

TABLE E-continued

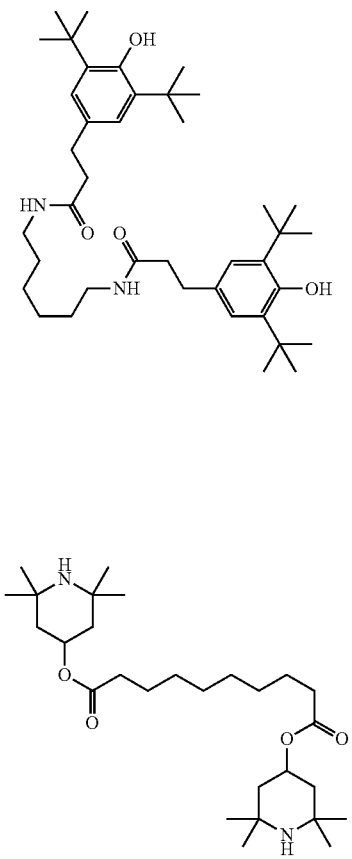

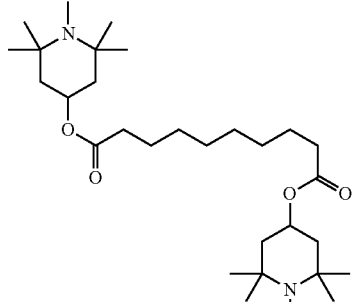

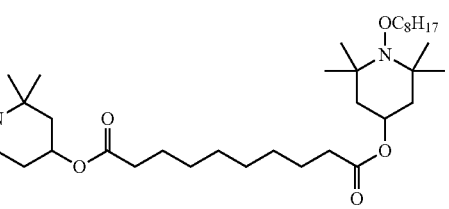

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

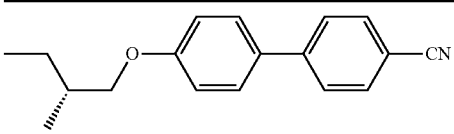

C 15

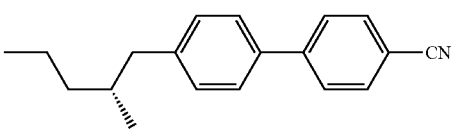

CB 15

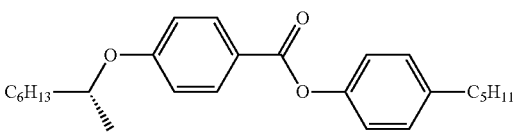

CM 21

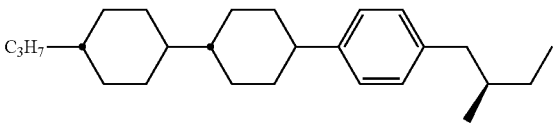

CM 44

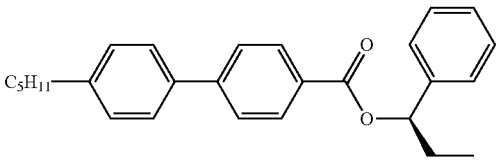

CM 45

TABLE F-continued
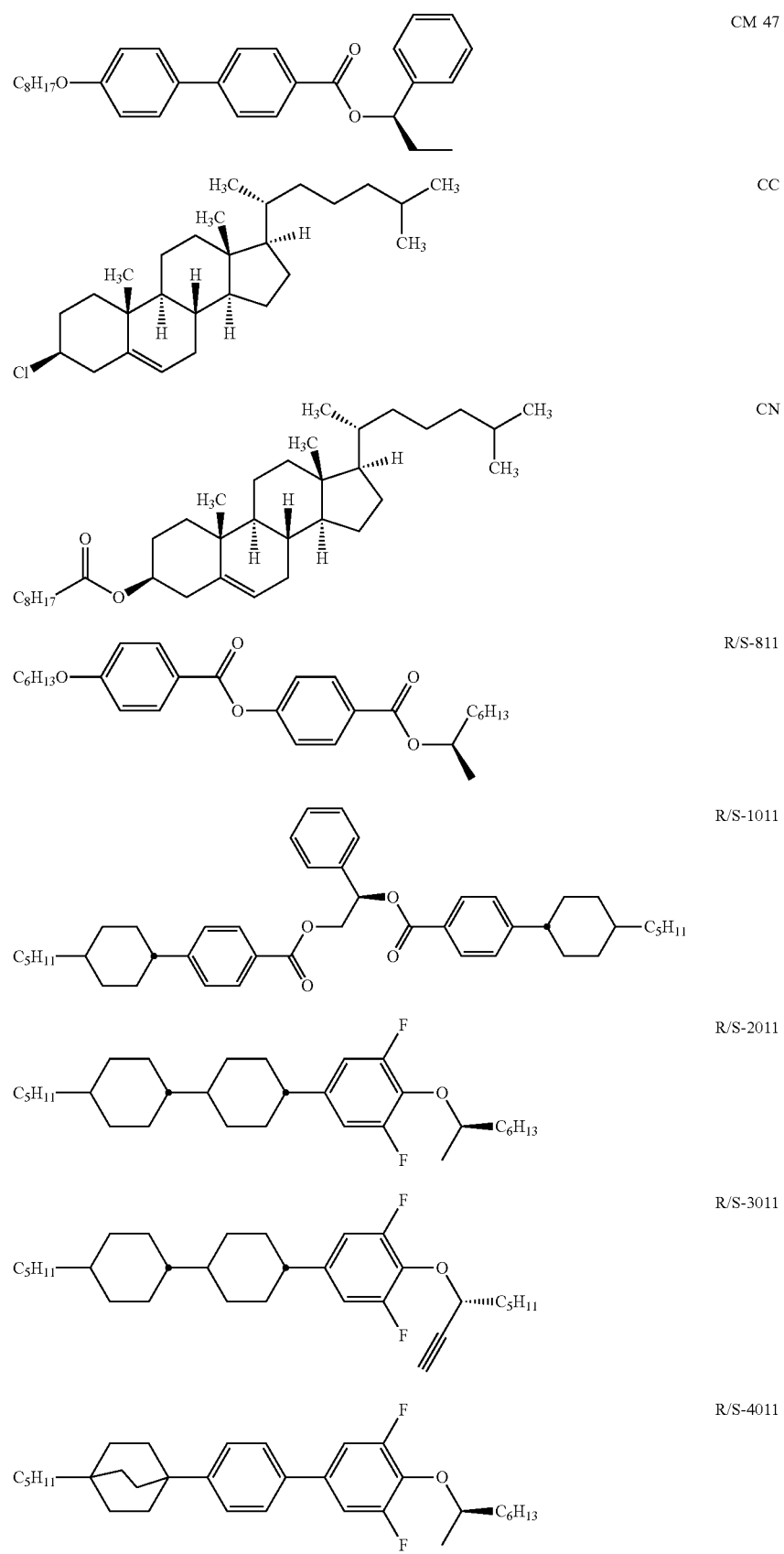

TABLE F-continued

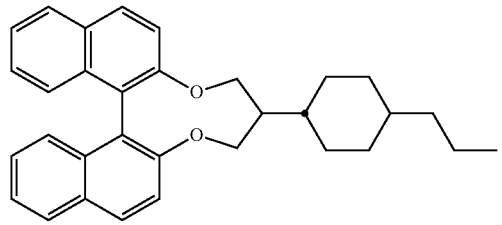

R/S-5011

In a preferred embodiment of the present invention, the mesogenic media comprise one or more compounds selected from the group of the compounds of Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

EXAMPLES

The following examples illustrate the present invention without limiting it in any way.

However, it is clear to the person skilled in the art from the physical properties what properties can be achieved and in what ranges they can be modified. In particular, the combination of the various properties which can preferably be achieved is thus well defined for the person skilled in the art.

Mixture Examples

Liquid-crystal mixtures N1 to N14 having the compositions and properties as indicated in the following tables are prepared and characterized with respect to their general physical properties and their applicability in microwave components at 19 GHz and 20° C. These data are given in the tables below the composition tables for the individual mixture examples.

| Mixture N1 | | | |
|---|---|---|---|
| PTU-3-S | 7.0% | $T_{(N,I)}$ [° C.]: | 162.5 |
| PTU-5-S | 7.0% | Δε (1 kHz, 20° C.): | 17.8 |
| PPTU-4-S | 7.0% | $ε_∥$ (1 kHz, 20° C.): | 21.7 |
| PPTU-5-S | 7.0% | $ε_⊥$ (1 kHz, 20° C.): | 3.9 |
| CPU-2-S | 18.0% | $γ_1$ [mPa · s], (20° C.): | 408 |
| CPU-3-S | 13.0% | $K_1$ [pN], (20° C.): | 15.1 |
| CPU-4-S | 13.0% | $K_3$ [pN], (20° C.): | 14.6 |
| CPU-5-S | 13.0% | τ (20° C., 19 GHz): | 0.310 |
| PPU-TO-S | 15.0% | $ε_{r,∥}$ (20° C., 19 GHz): | 3.5380 |
| Σ | 100.0% | $ε_{r,⊥}$ (20° C., 19 GHz): | 2.4420 |
| | | tan $δ_{ε\,r,∥}$ (20° C., 19 GHz): | 0.0057 |
| | | tan $δ_{ε\,r,⊥}$ (20° C., 19 GHz): | 0.0097 |
| | | η (20° C., 19 GHz): | 32 |

| Mixture N2 | |
|---|---|
| PPTU-4-S | 5.0% |
| PPTU-5-S | 7.0% |

-continued

| | |
|---|---|
| PGTU-4-S | 4.0% |
| CPU-2-S | 20.0% |
| CPU-4-S | 20.0% |
| P(2)TU-5-S | 14.0% |
| PTU-3V-S | 16.0% |
| PPU-TO-S | 14.0% |
| Σ | 100.0% |

| Mixture N3 | | | |
|---|---|---|---|
| PPTU-4-S | 7.0% | $T_{(N,I)}$ [° C.]: | 130.0 |
| PPTU-5-S | 8.0% | τ (20° C., 19 GHz): | 0.316 |
| CPU-2-S | 20.0% | $ε_{r,∥}$ (20° C., 19 GHz): | 3.5803 |
| CPU-4-S | 17.0% | $ε_{r,⊥}$ (20° C., 19 GHz): | 2.4488 |
| P(2)TU-5-S | 14.0% | tan $δ_{ε\,r,∥}$ (20° C., 19 GHz): | 0.0059 |
| PTU-3V-S | 20.0% | tan $δ_{ε\,r,⊥}$ (20° C., 19 GHz): | 0.0096 |
| PPU-TO-S | 14.0% | η (20° C., 19 GHz): | 32.9 |
| Σ | 100.0% | | |

| Mixture N4 | | | |
|---|---|---|---|
| PTU-3-S | 10.0% | $T_{(N,I)}$ [° C.]: | 139.0 |
| PTU-5-S | 15.0% | Δε (1 kHz, 20° C.): | 18.0 |
| PPTU-4-S | 7.0% | $ε_∥$ (1 kHz, 20° C.): | 22.4 |
| PPTU-5-S | 7.0% | $ε_⊥$ (1 kHz, 20° C.): | 4.3 |
| CPU-2-S | 22.0% | $γ_1$ [mPa · s], (20° C.): | 331 |
| CPU-3-S | 10.0% | $K_1$ [pN], (20° C.): | 14.2 |
| CPU-4-S | 14.0% | $K_3$ [pN], (20° C.): | 24.2 |
| PPU-TO-S | 15.0% | τ (20° C., 19 GHz): | 0.306 |
| Σ | 100.0% | $ε_{r,∥}$ (20° C., 19 GHz): | 3.5802 |
| | | $ε_{r,⊥}$ (20° C., 19 GHz): | 2.4841 |
| | | tan $δ_{ε\,r,∥}$ (20° C., 19 GHz): | 0.0062 |
| | | tan $δ_{ε\,r,⊥}$ (20° C., 19 GHz): | 0.0107 |
| | | η (20° C., 19 GHz): | 28.6 |

| Mixture N5 | |
|---|---|
| PTU-3-S | 10.0% |
| PTU-5-S | 10.0% |
| PGU-3-S | 10.0% |
| PGU-5-S | 10.0% |
| PPTU-4-S | 6.0% |
| PPTU-5-S | 8.0% |
| PGTU-4-S | 6.0% |
| CPU-2-S | 18.0% |
| CPU-4-S | 8.0% |
| PPU-TO-S | 14.0% |
| Σ | 100.0% |

| Mixture N6 | | | |
|---|---|---|---|
| PTU-3-S | 10.0% | $T_{(N,I)}$ [° C.]: | 145.5 |
| PTU-5-S | 10.0% | Δε (1 kHz, 20° C.): | 20.9 |
| PGU-3-S | 15.0% | $ε_∥$ (1 kHz, 20° C.): | 25.4 |
| PPTU-4-S | 6.0% | $ε_⊥$ (1 kHz, 20° C.): | 4.5 |
| PPTU-5-S | 9.0% | $γ_1$ [mPa · s], (20° C.): | 377 |
| PGTU-4-S | 6.0% | $K_1$ [pN], (20° C.): | 16.0 |
| CPU-2-S | 20.0% | $K_3$ [pN], (20° C.): | 22.8 |

| | | | |
|---|---|---|---|
| CPU-4-S | 10.0% | $\tau$ (20° C., 19 GHz): | 0.321 |
| PPU-TO-S | 14.0% | $\varepsilon_{r,\parallel}$ (20° C., 19 GHz): | 3.6582 |
| $\Sigma$ | 100.0% | $\varepsilon_{r,\perp}$ (20° C., 19 GHz): | 2.4853 |
| | | $\tan \delta_{\varepsilon\,r,\parallel}$ (20° C., 19 GHz): | 0.0062 |
| | | $\tan \delta_{\varepsilon\,r,\perp}$ (20° C., 19 GHz): | 0.0115 |
| | | $\eta$ (20° C., 19 GHz): | 27.9 |

Mixture N7

| | | | |
|---|---|---|---|
| PTU-3-S | 10.0% | $T_{(N,I)}$ [° C.]: | 137.0 |
| PTU-5-S | 15.0% | $\Delta\varepsilon$ (1 kHz, 20° C.): | 17.7 |
| PPTU-4-S | 7.0% | $\varepsilon_\parallel$ (1 kHz, 20° C.): | 21.9 |
| PPTU-5-S | 7.0% | $\varepsilon_\perp$ (1 kHz, 20° C.): | 4.2 |
| CPU-2-S | 26.0% | $\gamma_1$ [mPa·s], (20° C.): | 305 |
| CPU-4-S | 20.0% | LTS (bulk, −30° C.) [h] | ≥1000 |
| PPU-TO-S | 15.0% | $\tau$ (20° C., 19 GHz): | 0.310 |
| $\Sigma$ | 100.0% | $\varepsilon_{r,\parallel}$ (20° C., 19 GHz): | 3.5398 |
| | | $\varepsilon_{r,\perp}$ (20° C., 19 GHz): | 2.4428 |
| | | $\tan \delta_{\varepsilon\,r,\parallel}$ (20° C., 19 GHz): | 0.0062 |
| | | $\tan \delta_{\varepsilon\,r,\perp}$ (20° C., 19 GHz): | 0.0107 |
| | | $\eta$ (20° C., 19 GHz): | 29.0 |

Mixture N8

| | | | |
|---|---|---|---|
| PTU-3-S | 13.0% | $T_{(N,I)}$ [° C.]: | 137.0 |
| PTU-5-S | 12.0% | $\Delta\varepsilon$ (1 kHz, 20° C.): | 17.4 |
| PPTU-4-S | 6.0% | $\varepsilon_\parallel$ (1 kHz, 20° C.): | 21.4 |
| PPTU-5-S | 8.0% | $\varepsilon_\perp$ (1 kHz, 20° C.): | 4.0 |
| CPU-2-S | 26.0% | $\gamma_1$ [mPa·s], (20° C.): | 286 |
| CPU-4-S | 20.0% | LTS (bulk, −30° C.) [h] | ≥1000 |
| PPU-TO-S | 15.0% | $\tau$ (20° C., 19 GHz): | 0.308 |
| $\Sigma$ | 100.0% | $\varepsilon_{r,\parallel}$ (20° C., 19 GHz): | 3.5669 |
| | | $\varepsilon_{r,\perp}$ (20° C., 19 GHz): | 2.4672 |
| | | $\tan \delta_{\varepsilon\,r,\parallel}$ (20° C., 19 GHz): | 0.0063 |
| | | $\tan \delta_{\varepsilon\,r,\perp}$ (20° C., 19 GHz): | 0.0107 |
| | | $\eta$ (20° C., 19 GHz): | 28.8 |

Mixture N9

| | | | |
|---|---|---|---|
| PTU-3-S | 11.0% | $T_{(N,I)}$ [° C.]: | 142.5 |
| PTU-5-S | 11.0% | $\Delta\varepsilon$ (1 kHz, 20° C.): | 16.9 |
| PPTU-4-S | 6.0% | $\varepsilon_\parallel$ (1 kHz, 20° C.): | 20.9 |
| PPTU-5-S | 8.0% | $\varepsilon_\perp$ (1 kHz, 20° C.): | 4.0 |
| CPU-2-S | 26.0% | $\gamma_1$ [mPa·s], (20° C.): | 302 |
| CPU-4-S | 20.0% | LTS (bulk, −30° C.) [h] | ≥1000 |
| PPU-TO-S | 18.0% | $\tau$ (20° C., 19 GHz): | 0.310 |
| $\Sigma$ | 100.0% | $\varepsilon_{r,\parallel}$ (20° C., 19 GHz): | 3.5467 |
| | | $\varepsilon_{r,\perp}$ (20° C., 19 GHz): | 2.4456 |
| | | $\tan \delta_{\varepsilon\,r,\parallel}$ (20° C., 19 GHz): | 0.0062 |
| | | $\tan \delta_{\varepsilon\,r,\perp}$ (20° C., 19 GHz): | 0.0105 |
| | | $\eta$ (20° C., 19 GHz): | 29.5 |

Mixture N10

| | | | |
|---|---|---|---|
| PTU-3-S | 6.0% | $T_{(N,I)}$ [° C.]: | 154.0 |
| PTU-5-S | 10.0% | $\Delta\varepsilon$ (1 kHz, 20° C.): | 16.2 |
| PPTU-4-S | 6.0% | $\varepsilon_\parallel$ (1 kHz, 20° C.): | 20.0 |
| PPTU-5-S | 10.0% | $\varepsilon_\perp$ (1 kHz, 20° C.): | 3.8 |
| CPU-2-S | 26.0% | $\gamma_1$ [mPa·s], (20° C.): | 338 |
| CPU-4-S | 20.0% | LTS (bulk, −30° C.) [h] | ≥1000 |
| PPU-TO-S | 22.0% | $\tau$ (20° C., 19 GHz): | 0.311 |
| $\Sigma$ | 100.0% | $\varepsilon_{r,\parallel}$ (20° C., 19 GHz): | 3.5709 |
| | | $\varepsilon_{r,\perp}$ (20° C., 19 GHz): | 2.4609 |
| | | $\tan \delta_{\varepsilon\,r,\parallel}$ (20° C., 19 GHz): | 0.0060 |
| | | $\tan \delta_{\varepsilon\,r,\perp}$ (20° C., 19 GHz): | 0.0101 |
| | | $\eta$ (20° C., 19 GHz): | 30.8 |

Mixture N11

| | | | |
|---|---|---|---|
| PTU-3-S | 9.0% | $T_{(N,I)}$ [° C.]: | 150.5 |
| PTU-5-S | 9.0% | $\Delta\varepsilon$ (1 kHz, 20° C.): | 17.4 |
| PPTU-4-S | 6.0% | $\varepsilon_\parallel$ (1 kHz, 20° C.): | 21.5 |
| PPTU-5-S | 10.0% | $\varepsilon_\perp$ (1 kHz, 20° C.): | 4.1 |
| CPU-2-S | 26.0% | $\gamma_1$ [mPa·s], (20° C.): | 326 |
| CPU-4-S | 20.0% | LTS (bulk, −30° C.) [h] | ≥1000 |
| PPU-TO-S | 20.0% | $\tau$ (20° C., 19 GHz): | 0.307 |
| $\Sigma$ | 100.0% | $\varepsilon_{r,\parallel}$ (20° C., 19 GHz): | 3.5792 |
| | | $\varepsilon_{r,\perp}$ (20° C., 19 GHz): | 2.4794 |
| | | $\tan \delta_{\varepsilon\,r,\parallel}$ (20° C., 19 GHz): | 0.0061 |
| | | $\tan \delta_{\varepsilon\,r,\perp}$ (20° C., 19 GHz): | 0.0103 |
| | | $\eta$ (20° C., 19 GHz): | 29.8 |

Mixture N12

| | | | |
|---|---|---|---|
| PTU-5-S | 10.0% | $T_{(N,I)}$ [° C.]: | 165.0 |
| PPTU-4-S | 6.0% | $\Delta\varepsilon$ (1 kHz, 20° C.): | 14.8 |
| PPTU-5-S | 10.0% | $\varepsilon_\parallel$ (1 kHz, 20° C.): | 18.6 |
| CPU-2-S | 26.0% | $\varepsilon_\perp$ (1 kHz, 20° C.): | 3.9 |
| CPU-4-S | 20.0% | $\gamma_1$ [mPa·s], (20° C.): | 426 |
| PPU-TO-S | 28.0% | LTS (bulk, −30° C.) [h] | ≥1000 |
| $\Sigma$ | 100.0% | $\tau$ (20° C., 19 GHz): | 0.307 |
| | | $\varepsilon_{r,\parallel}$ (20° C., 19 GHz): | 3.5417 |
| | | $\varepsilon_{r,\perp}$ (20° C., 19 GHz): | 2.4552 |
| | | $\tan \delta_{\varepsilon\,r,\parallel}$ (20° C., 19 GHz): | 0.0058 |
| | | $\tan \delta_{\varepsilon\,r,\perp}$ (20° C., 19 GHz): | 0.0091 |
| | | $\eta$ (20° C., 19 GHz): | 33.7 |

Mixture N13

| | | | |
|---|---|---|---|
| PTU-3-S | 10.0% | $T_{(N,I)}$ [° C.]: | 149.5 |
| PTU-5-S | 8.0% | $\Delta\varepsilon$ (1 kHz, 20° C.): | 21.2 |
| PGU-3-S | 16.0% | $\varepsilon_\parallel$ (1 kHz, 20° C.): | 25.6 |
| PPTU-4-S | 6.0% | $\varepsilon_\perp$ (1 kHz, 20° C.): | 4.4 |
| PPTU-5-S | 8.0% | $\gamma_1$ [mPa·s], (20° C.): | 400 |
| PGTU-4-S | 5.0% | $K_1$ [pN], (20° C.): | 16.2 |
| CPU-2-S | 19.0% | $K_3$ [pN], (20° C.): | 23.3 |
| CPU-4-S | 16.0% | LTS (bulk, −20° C.) [h] | ≥1000 |
| PPU-TO-S | 12.0% | LTS (bulk, −30° C.) [h] | 552 |
| $\Sigma$ | 100.0% | LTS (bulk, −40° C.) [h] | 360 |
| | | $\tau$ (20° C., 19 GHz): | 0.306 |
| | | $\varepsilon_{r,\parallel}$ (20° C., 19 GHz): | 3.6258 |
| | | $\varepsilon_{r,\perp}$ (20° C., 19 GHz): | 2.5147 |
| | | $\tan \delta_{\varepsilon\,r,\parallel}$ (20° C., 19 GHz): | 0.0061 |
| | | $\tan \delta_{\varepsilon\,r,\perp}$ (20° C., 19 GHz): | 0.0115 |
| | | $\eta$ (20° C., 19 GHz): | 26.6 |

Mixture N14

| | | | |
|---|---|---|---|
| PGU-3-S | 10.0% | $T_{(N,I)}$ [° C.]: | 155.0 |
| PGU-4-S | 6.0% | $\Delta\varepsilon$ (1 kHz, 20° C.): | 23.2 |
| PGU-5-S | 6.0% | $\varepsilon_\parallel$ (1 kHz, 20° C.): | 27.6 |
| PPTU-4-S | 6.0% | $\varepsilon_\perp$ (1 kHz, 20° C.): | 4.4 |
| PPTU-5-S | 8.0% | $\gamma_1$ [mPa·s], (20° C.): | 745 |
| PGTU-4-S | 5.0% | $K_1$ [pN], (20° C.): | 16.6 |
| CPU-2-S | 20.0% | $K_3$ [pN], (20° C.): | 21.4 |
| CPU-4-S | 16.0% | LTS (bulk, −30° C.) [h] | ≥1000 |
| PPU-TO-S | 15.0% | LTS (bulk, −40° C.) [h] | ≥1000 |
| PI(2)TU-5-S | 8.0% | $\tau$ (20° C., 19 GHz): | 0.315 |
| $\Sigma$ | 100.0% | $\varepsilon_{r,\parallel}$ (20° C., 19 GHz): | 3.5614 |
| | | $\varepsilon_{r,\perp}$ (20° C., 19 GHz): | 2.4397 |
| | | $\tan \delta_{\varepsilon\,r,\parallel}$ (20° C., 19 GHz): | 0.0056 |
| | | $\tan \delta_{\varepsilon\,r,\perp}$ (20° C., 19 GHz): | 0.0103 |
| | | $\eta$ (20° C., 19 GHz): | 30.6 |

The liquid-crystalline media according to the invention exhibit high clearing temperatures in combination with very good LTS and excellent microwave-application relevant properties.

The following Table 1 shows a comparison of the properties of Example Mixtures N8, N9 and N10:

It can be seen that the increase of the proportion of the compound PPU-TO-S in the medium results in an increase of the clearing temperature of the medium. Unexpectedly, despite this increase, all mixtures show LTS values of at least 1000 h at −30° C. At the same time, the figure-of-merit of the media becomes better with an increased proportion of PPU-TO-S due to higher tunability t and lower dielectric loss tan $\delta_{\epsilon r,\parallel}$.

It is noteworthy that the compound PPU-TO-S has a comparatively low dielectric anisotropy of $\Delta\epsilon=3.8$, whereas for example the compound PPU-3-S has a high dielectric anisotropy of $\Delta\epsilon=20.7$ (both values extrapolated from 10% solution in ZLI-4792).

Nevertheless, the presence of PPU-TO-S in the polar liquid-crystalline media according to the invention has no negative influence on the tunability compared to liquid-crystalline media from the state of the art.

TABLE 1

| Mixture Example | PPU-TO-S [% by weight] | τ | tan $\delta_{\epsilon r,\parallel}$ | η | $T_{(N,I)}$ [° C.] | LTS (bulk, −30° C.) [h] |
|---|---|---|---|---|---|---|
| N8 | 15 | 3.08 | 0.0107 | 28.8 | 137 | ≥1000 |
| N9 | 18 | 3.10 | 0.0105 | 29.5 | 143 | ≥1000 |
| N10 | 22 | 3.11 | 0.0101 | 30.8 | 154 | ≥1000 |

As mentioned above, in a preferred embodiment the media according to the present invention comprise a stabiliser.

The following Mixtures N15 to N28 are obtained from the mixtures N1 to N14 using the stabiliser ST-3b-1 in the amounts given in Table 2.

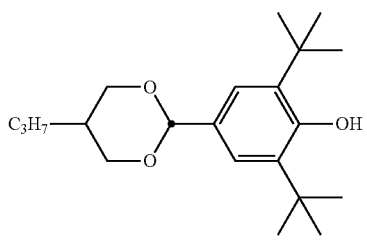

ST-3b-1

TABLE 2

| Mixture Example | Host Mixture | c(ST-3b-1) [%] |
|---|---|---|
| N15 | N1 | 0.12 |
| N16 | N2 | 0.90 |
| N17 | N3 | 0.10 |
| N18 | N4 | 0.11 |
| N19 | N5 | 0.12 |
| N20 | N6 | 0.13 |
| N21 | N7 | 0.12 |
| N22 | N8 | 0.12 |
| N23 | N9 | 0.12 |
| N24 | N10 | 0.12 |
| N25 | N11 | 0.13 |
| N26 | N12 | 0.14 |
| N27 | N13 | 0.15 |
| N28 | N14 | 0.17 |

The following Mixtures N29 to N42 are obtained from the mixtures N1 to N14 using the stabiliser ST-3a-1 in the amounts given in Table 3.

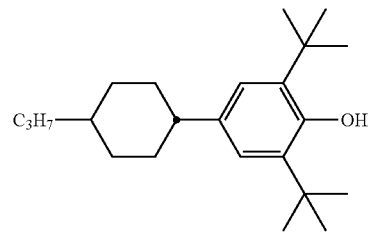

ST-3a-1

TABLE 3

| Mixture Example | Host Mixture | c(ST-3b-1) [%] |
|---|---|---|
| N29 | N1 | 0.12 |
| N30 | N2 | 0.90 |
| N31 | N3 | 0.10 |
| N32 | N4 | 0.11 |
| N33 | N5 | 0.12 |
| N34 | N6 | 0.13 |
| N35 | N7 | 0.12 |
| N36 | N8 | 0.12 |
| N37 | N9 | 0.12 |
| N38 | N10 | 0.12 |
| N39 | N11 | 0.13 |
| N40 | N12 | 0.14 |
| N41 | N13 | 0.15 |
| N42 | N14 | 0.17 |

Further examples according to the invention are mixtures N43 to N55:

| Mixture N43 | | | |
|---|---|---|---|
| U-200 | 0.12 | $T_{(N,I)}$ [° C.]: | 162.5 |
| PPTU-4-S | 5.99 | $\Delta\epsilon$ (1 kHz, 20° C.): | 14.9 |
| PPTU-5-S | 11.99 | $\epsilon_\parallel$ (1 kHz, 20° C.): | 18.7 |
| CPU-2-S | 25.97 | $\epsilon_\perp$ (1 kHz, 20° C.): | 3.8 |
| CPU-4-S | 19.98 | $\gamma_1$ [mPa s], (20° C.): | 477 |
| PPU-TO-S | 27.96 | $K_1$ [pN], (20° C.): | 14.9 |
| P(2)TU-5-S | 7.99 | $K_3$ [pN], (20° C.): | 24.7 |
| Σ | 100.0 | $K_3/K_1$ [pN], (20° C.): | 1.66 |
| | | $V_0$ [V], (20° C.): | 1.06 |
| | | LTS bulk [h], −30° C.): | 1000 |
| | | LTS bulk [h], −40° C.): | 1000 |
| | | τ (20° C., 19 GHz): | 0.313 |
| | | $\epsilon_{r,\parallel}$ (20° C., 19 GHz): | 3.5893 |
| | | $\epsilon_{r,\perp}$ (20° C., 19 GHz): | 2.4643 |
| | | tan $\delta_{\epsilon r,\parallel}$ (20° C., 19 GHz): | 0.0060 |
| | | tan $\delta_{\epsilon r,\perp}$ (20° C., 19 GHz): | 0.0095 |
| | | η (20° C., 19 GHz): | 32.9 |

| Mixture N44 | | | |
|---|---|---|---|
| U-200 | 0.12 | $T_{(N,I)}$ [° C.]: | 153.5 |
| PTU-3-S | 5.99 | $\Delta n$ [589 nm, 20° C.): | 0.3716 |
| PTU-5-S | 9.99 | $n_e$ [589 nm, 20° C.): | 1.9062 |
| PPTU-4-S | 5.99 | $n_o$ [589 nm, 20° C.): | 1.5346 |
| PPTU-5-S | 9.99 | $\Delta\epsilon$ (1 kHz, 20° C.): | 16.2 |
| CPU-2-S | 25.97 | $\epsilon_\parallel$ (1 kHz, 20° C.): | 20.0 |
| CPU-4-S | 19.98 | $\epsilon_\perp$ (1 kHz, 20° C.): | 3.8 |
| PPU-TO-S | 21.97 | $\gamma_1$ [mPa s], (20° C.): | 338 |
| Σ | 100.0 | $K_1$ [pN], (20° C.): | 14.1 |
| | | $K_3$ [pN], (20° C.): | 23.1 |
| | | $K_3/K_1$ [pN], (20° C.): | 1.64 |
| | | $V_0$ [V], (20° C.): | 1.00 |
| | | LTS bulk [h], −30° C.): | 1000 |
| | | τ (20° C., 19 GHz): | 0.311 |
| | | $\epsilon_{r,\parallel}$ (20° C., 19 GHz): | 3.5709 |
| | | $\epsilon_{r,\perp}$ (20° C., 19 GHz): | 2.4609 |
| | | tan $\delta_{\epsilon r,\parallel}$ (20° C., 19 GHz): | 0.0060 |

-continued

|  |  |  |
|---|---|---|
|  | tan δ$_{ε\ r,\perp}$ (20° C., 19 GHz): | 0.0101 |
|  | η (20° C., 19 GHz): | 30.8 |

Mixture N45

| | | | |
|---|---|---|---|
| PTU-3-S | 14.0 | T$_{(N,D)}$ [° C.]: | 154.5 |
| PGU-3-S | 14.0 | Δε (1 kHz, 20° C.): | 20.2 |
| PPTU-5-S | 20.0 | ε$_\parallel$ (1 kHz, 20° C.): | 24.4 |
| CPU-2-S | 35.0 | ε$_\perp$ (1 kHz, 20° C.): | 4.2 |
| PPU-TO-S | 17.0 | γ$_1$ [mPa s], (20° C.): | 401 |
| Σ | 100.0 | K$_1$ [pN], (20° C.): | 15.8 |
| | | K$_3$ [pN], (20° C.): | 25.4 |
| | | K$_3$/K$_1$ [pN], (20° C.): | 1.61 |
| | | V$_0$ [V], (20° C.): | 0.93 |
| | | LTS bulk [h], −30° C.): | 96 |
| | | τ (20° C., 19 GHz): | 0.327 |
| | | ε$_{r,\parallel}$ (20° C., 19 GHz): | 3.6248 |
| | | ε$_{r,\perp}$ (20° C., 19 GHz): | 2.4381 |
| | | tan δ$_{ε\ r,\parallel}$ (20° C., 19 GHz): | 0.0061 |
| | | tan δ$_{ε\ r,\perp}$ (20° C., 19 GHz): | 0.0107 |
| | | η (20° C., 19 GHz): | 30.6 |

Mixture N46

| | | | |
|---|---|---|---|
| PTU-3-S | 15.0 | T$_{(N,D)}$ [° C.]: | 154.5 |
| PGU-3-S | 15.0 | Δε (1 kHz, 20° C.): | 19.1 |
| PPTU-5-S | 20.0 | ε$_\parallel$ (1 kHz, 20° C.): | 23.3 |
| CPU-2-S | 25.0 | ε$_\perp$ (1 kHz, 20° C.): | 4.1 |
| PPU-TO-S | 25.0 | γ$_1$ [mPa s], (20° C.): | 406 |
| Σ | 100.0 | K$_1$ [pN], (20° C.): | 16.1 |
| | | K$_3$ [pN], (20° C.): | 25.5 |
| | | K$_3$/K$_1$ [pN], (20° C.): | 1.59 |
| | | V$_0$ [V], (20° C.): | 0.96 |
| | | LTS bulk [h], −30° C.): | 96 |
| | | τ (20° C., 19 GHz): | 0.335 |
| | | ε$_{r,\parallel}$ (20° C., 19 GHz): | 3.6775 |
| | | ε$_{r,\perp}$ (20° C., 19 GHz): | 2.4451 |
| | | tan δ$_{ε\ r,\parallel}$ (20° C., 19 GHz): | 0.0063 |
| | | tan δ$_{ε\ r,\perp}$ (20° C., 19 GHz): | 0.0111 |
| | | η (20° C., 19 GHz): | 30.2 |

Mixture N47

| | | | |
|---|---|---|---|
| PTU-3-S | 15.0 | T$_{(N,D)}$ [° C.]: | 153.5 |
| PPTU-5-S | 20.0 | Δε (1 kHz, 20° C.): | 17.2 |
| CPU-2-S | 40.0 | ε$_\parallel$ (1 kHz, 20° C.): | 21.2 |
| PPU-TO-S | 25.0 | ε$_\perp$ (1 kHz, 20° C.): | 4.0 |
| Σ | 100.0 | γ$_1$ [mPa s], (20° C.): | 382 |
| | | K$_1$ [pN], (20° C.): | 15.5 |
| | | K$_3$ [pN], (20° C.): | 25.1 |
| | | K$_3$/K$_1$ [pN], (20° C.): | 1.62 |
| | | V$_0$ [V], (20° C.): | 1.00 |
| | | LTS bulk [h], −30° C.): | 240 |
| | | τ (20° C., 19 GHz): | 0.328 |
| | | ε$_{r,\parallel}$ (20° C., 19 GHz): | 3.6143 |
| | | ε$_{r,\perp}$ (20° C., 19 GHz): | 2.4271 |
| | | tan δ$_{ε\ r,\parallel}$ (20° C., 19 GHz): | 0.0062 |
| | | tan δ$_{ε\ r,\perp}$ (20° C., 19 GHz): | 0.0102 |
| | | η (20° C., 19 GHz): | 32.2 |

Mixture N48

| | | | |
|---|---|---|---|
| PTU-3-S | 15.0 | T$_{(N,D)}$ [° C.]: | 155 |
| PPTU-5-S | 20.0 | Δε (1 kHz, 20° C.): | 16.4 |
| CPU-2-S | 35.0 | ε$_\parallel$ (1 kHz, 20° C.): | 20.3 |
| PPU-TO-S | 30.0 | ε$_\perp$ (1 kHz, 20° C.): | 3.9 |
| Σ | 100.0 | γ$_1$ [mPa s], (20° C.): | 389 |
| | | K$_1$ [pN], (20° C.): | 15.9 |
| | | K$_3$ [pN], (20° C.): | 25.2 |
| | | K$_3$/K$_1$ [pN], (20° C.): | 1.58 |
| | | V$_0$ [V], (20° C.): | 1.04 |
| | | LTS bulk [h], −30° C.): | 72 |
| | | τ (20° C., 19 GHz): | 0.327 |
| | | ε$_{r,\parallel}$ (20° C., 19 GHz): | 3.6422 |
| | | ε$_{r,\perp}$ (20° C., 19 GHz): | 2.4517 |

-continued

|  |  |  |
|---|---|---|
|  | tan δ$_{ε\ r,\parallel}$ (20° C., 19 GHz): | 0.0063 |
|  | tan δ$_{ε\ r,\perp}$ (20° C., 19 GHz): | 0.0103 |
|  | η (20° C., 19 GHz): | 31.7 |

Mixture N49

| | | | |
|---|---|---|---|
| PTU-3-S | 6.0 | T$_{(N,D)}$ [° C.]: | 157 |
| PTU-5-S | 10.0 | Δε (1 kHz, 20° C.): | 17.0 |
| PPTU-4-S | 6.0 | ε$_\parallel$ (1 kHz, 20° C.): | 21.0 |
| PPTU-5-S | 10.0 | ε$_\perp$ (1 kHz, 20° C.): | 3.9 |
| CPU-2-S | 30.0 | γ$_1$ [mPa s], (20° C.): | 411 |
| PPU-TO-S | 22.0 | K$_1$ [pN], (20° C.): | 15.8 |
| LPTU-4-S | 16.0 | K$_3$ [pN], (20° C.): | 23.7 |
| Σ | 100.0 | K$_3$/K$_1$ [pN], (20° C.): | 1.51 |
| | | V$_0$ [V], (20° C.): | 1.02 |
| | | τ (20° C., 19 GHz): | 0.329 |
| | | ε$_{r,\parallel}$ (20° C., 19 GHz): | 3.6089 |
| | | ε$_{r,\perp}$ (20° C., 19 GHz): | 2.4200 |
| | | tan δ$_{ε\ r,\parallel}$ (20° C., 19 GHz): | 0.0058 |
| | | tan δ$_{ε\ r,\perp}$ (20° C., 19 GHz): | 0.0095 |
| | | η (20° C., 19 GHz): | 34.6 |

Mixture N50

| | | | |
|---|---|---|---|
| CPU-2-S | 30.0 | T$_{(N,D)}$ [° C.]: | 189.5 |
| PPTU-4-S | 10.0 | τ (20° C., 19 GHz): | 0.343 |
| PPTU-5-S | 20.0 | ε$_{r,\parallel}$ (20° C., 19 GHz): | 3.7043 |
| PPU-TO-S | 20.0 | ε$_{r,\perp}$ (20° C., 19 GHz): | 2.4334 |
| LPTU-4-S | 20.0 | tan δ$_{ε\ r,\parallel}$ (20° C., 19 GHz): | 0.0051 |
| Σ | 100.0 | tan δ$_{ε\ r,\perp}$ (20° C., 19 GHz): | 0.0083 |
| | | η (20° C., 19 GHz): | 41.3 |

Mixture N51

| | | | |
|---|---|---|---|
| CPU-2-S | 30.0 | T$_{(N,D)}$ [° C.]: | 182.5 |
| PPTU-4-S | 10.0 | τ (20° C., 19 GHz): | 0.341 |
| PPTU-5-S | 20.0 | ε$_{r,\parallel}$ (20° C., 19 GHz): | 3.6820 |
| PPU-TO-S | 20.0 | ε$_{r,\perp}$ (20° C., 19 GHz): | 2.4268 |
| PGU-3-S | 20.0 | tan δ$_{ε\ r,\parallel}$ (20° C., 19 GHz): | 0.0056 |
| Σ | 100.0 | tan δ$_{ε\ r,\perp}$ (20° C., 19 GHz): | 0.0100 |
| | | η (20° C., 19 GHz): | 34.1 |

Mixture N52

| | | | |
|---|---|---|---|
| PTU-5-S | 10.0 | T$_{(N,D)}$ [° C.]: | 164.5 |
| PGU-3-S | 10.0 | Δε (1 kHz, 20° C.): | 16.8 |
| PPTU-4-S | 6.0 | ε$_\parallel$ (1 kHz, 20° C.): | 20.8 |
| PPTU-5-S | 12.0 | ε$_\perp$ (1 kHz, 20° C.): | 3.9 |
| CPU-2-S | 22.0 | γ$_1$ [mPa s], (20° C.): | 450 |
| CPU-4-S | 12.0 | K$_1$ [pN], (20° C.): | 16.1 |
| PPU-TO-S | 28.0 | K$_3$ [pN], (20° C.): | 25.5 |
| Σ | 100.0 | K$_3$/K$_1$ [pN], (20° C.): | 1.58 |
| | | V$_0$ [V], (20° C.): | 1.03 |
| | | τ (20° C., 19 GHz): | 0.324 |
| | | ε$_{r,\parallel}$ (20° C., 19 GHz): | 3.6247 |
| | | ε$_{r,\perp}$ (20° C., 19 GHz): | 2.4506 |
| | | tan δ$_{ε\ r,\parallel}$ (20° C., 19 GHz): | 0.0058 |
| | | tan δ$_{ε\ r,\perp}$ (20° C., 19 GHz): | 0.0105 |
| | | η (20° C., 19 GHz): | 30.9 |

Mixture N53

| | | | |
|---|---|---|---|
| PGU-3-S | 16.0 | T$_{(N,D)}$ [° C.]: | 161.5 |
| PPTU-4-S | 6.0 | Δε (1 kHz, 20° C.): | 16.9 |
| PPTU-5-S | 12.0 | ε$_\parallel$ (1 kHz, 20° C.): | 20.9 |
| CPU-2-S | 20.0 | ε$_\perp$ (1 kHz, 20° C.): | 4.0 |
| CPU-4-S | 10.0 | γ$_1$ [mPa s], (20° C.): | 508 |
| PPU-TO-S | 28.0 | K$_1$ [pN], (20° C.): | 15.9 |
| P(2)TU-5-S | 8.0 | K$_3$ [pN], (20° C.): | 25.4 |
| Σ | 100.0 | K$_3$/K$_1$ [pN], (20° C.): | 1.60 |
| | | V$_0$ [V], (20° C.): | 1.02 |
| | | τ (20° C., 19 GHz): | 0.325 |
| | | ε$_{r,\parallel}$ (20° C., 19 GHz): | 3.6255 |
| | | ε$_{r,\perp}$ (20° C., 19 GHz): | 2.4462 |

-continued

|  |  |  |  |
|---|---|---|---|
|  | tan δ_{ε r, ∥} (20° C., 19 GHz): | 0.0060 |  |
|  | tan δ_{ε r, ⊥} (20° C., 19 GHz): | 0.0103 |  |
|  | η (20° C., 19 GHz): | 31.6 |  |

Mixture N54

| PPTU-4-S | 6.0 | T_{(N, D)} [° C.]: | 163.5 |
|---|---|---|---|
| PPTU-5-S | 12.0 | Δε (1 kHz, 20° C.): | 14.9 |
| CPU-2-S | 26.0 | ε_∥ (1 kHz, 20° C.): | 18.7 |
| CPU-4-S | 20.0 | ε_⊥ (1 kHz, 20° C.): | 3.8 |
| PPU-TO-S | 28.0 | γ_1 [mPa s], (20° C.): | 477 |
| P(2)TU-5-S | 8.0 | K_1 [pN], (20° C.): | 14.9 |
| Σ | 100.0 | K_3 [pN], (20° C.): | 24.7 |
|  |  | K_3/K_1 [pN], (20° C.): | 1.66 |
|  |  | V_0 [V], (20° C.): | 1.06 |
|  |  | LTS bulk [h], −30° C.): | 1000 |
|  |  | LTS bulk [h], −40° C.): | 1000 |
|  |  | τ (20° C., 19 GHz): | 0.312 |
|  |  | ε_{r, ∥} (20° C., 19 GHz): | 3.5741 |
|  |  | ε_{r, ⊥} (20° C., 19 GHz): | 2.4594 |
|  |  | tan δ_{ε r, ∥} (20° C., 19 GHz): | 0.0058 |
|  |  | tan δ_{ε r, ⊥} (20° C., 19 GHz): | 0.0095 |
|  |  | η (20° C., 19 GHz): | 32.8 |

Mixture N55

| U-200 | 0.12 | T_{(N, D)} [° C.]: | 162.5 |
|---|---|---|---|
| PPTU-4-S | 5.99 | Δε (1 kHz, 20° C.): | 14.9 |
| PPTU-5-S | 11.99 | ε_∥ (1 kHz, 20° C.): | 18.7 |
| CPU-2-S | 25.97 | ε_⊥ (1 kHz, 20° C.): | 3.8 |
| CPU-4-S | 19.98 | γ_1 [mPa s], (20° C.): | 477 |
| PPU-TO-S | 27.96 | K_1 [pN], (20° C.): | 14.9 |
| P(2)TU-5-S | 7.99 | K_3 [pN], (20° C.): | 24.7 |
| Σ | 100.0 | K_3/K_1 [pN], (20° C.): | 1.66 |
|  |  | V_0 [V], (20° C.): | 1.06 |
|  |  | LTS bulk [h], −30° C.): | 1000 |
|  |  | LTS bulk [h], −40° C.): | 1000 |
|  |  | τ (20° C., 19 GHz): | 0.313 |
|  |  | ε_{r, ∥} (20° C., 19 GHz): | 3.5893 |
|  |  | ε_{r, ⊥} (20° C., 19 GHz): | 2.4643 |
|  |  | tan δ_{ε r, ∥} (20° C., 19 GHz): | 0.0060 |
|  |  | tan δ_{ε r, ⊥} (20° C., 19 GHz): | 0.0095 |
|  |  | η (20° C., 19 GHz): | 32.9 |

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosure[s] of all applications, patents and publications, cited herein and of corresponding European application No. EP 18163715.8, filed Mar. 23, 2018, are incorporated by reference herein.

The invention claimed is:

1. A liquid-crystal medium, comprising
one or more compounds of formula T in a total amount of 5 to 30% by weight based on the weight of the liquid-crystal medium

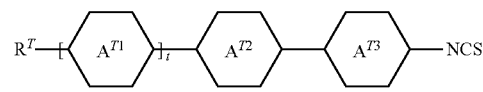

in which
$R^T$ denotes halogen, CN, NCS, $R^F$, $R^F$—O— or $R^F$—S—,
$R^F$ denotes fluorinated alkyl having 1 to 12 C atoms or fluorinated alkenyl having 2 to 12 C atoms,

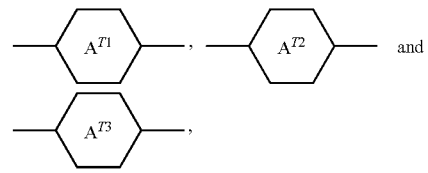

on each occurrence, independently of one another, denote

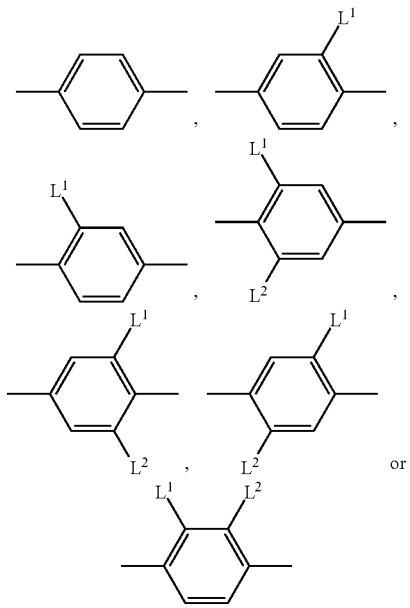

$L^1$ and $L^2$ identically or differently, denote F, Cl or methyl, and
t is 0, 1 or 2;
and
one or more compounds of formula III-1b in a total amount of 10% to 20% by weight based on the weight of the liquid-crystal medium, III-1b

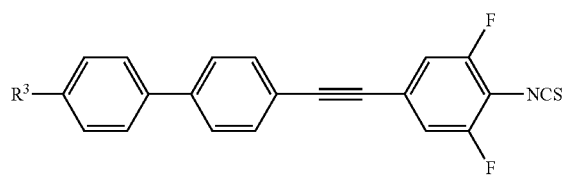

in which $R^3$ denotes $C_nH_{2n+1}$, n denotes an integer in the range from 0 to 15, and one or more compounds of formula I in a total amount of 30% or more by weight based on the weight of the liquid-crystal medium,

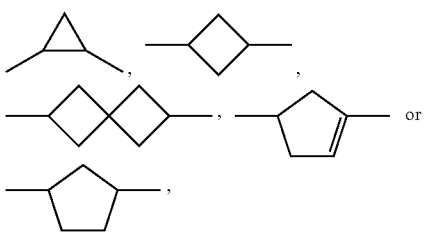

I in which $R^1$ denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more $CH_2$-groups are optionally replaced by

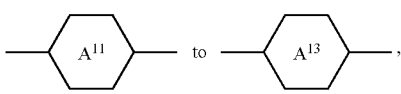

m is 0, 1 or 2,

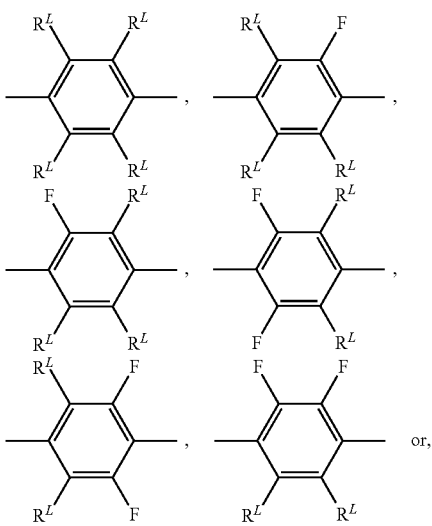

on each occurrence, independently of one another, denote

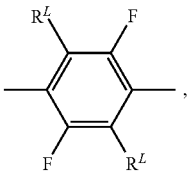

denotes

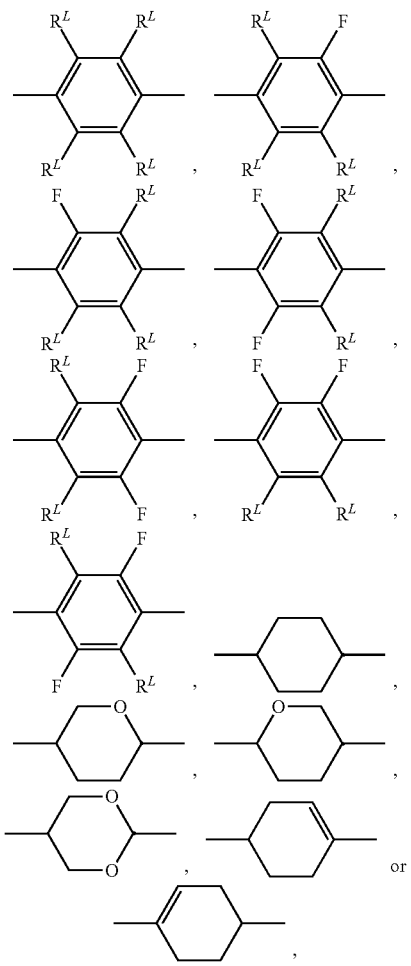

and one or more compounds of formula II,

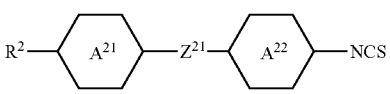

II in which

R² denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more CH₂-groups are optionally replaced by

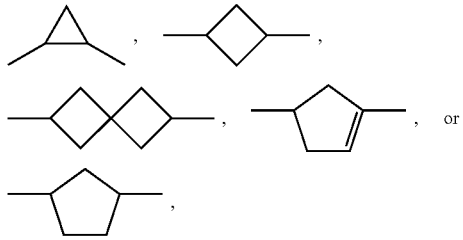

$Z^{21}$ denotes trans-CF=CF— or —C≡C—, and

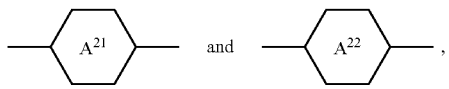

independently of one another, denote

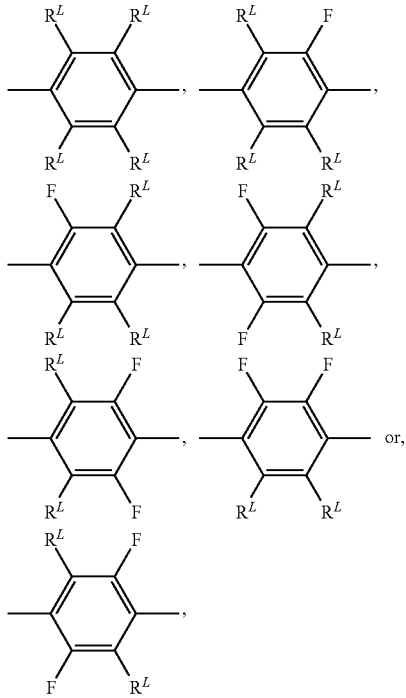

$R^L$ on each occurrence identically or differently, denotes H or alkyl having 1 to 6 C atoms;

wherein the liquid-crystal medium has a clearing temperature of 140° C. or more.

2. The liquid-crystal medium according to claim 1, wherein the one or more compounds of formula T are represented by one or more compounds of formula T-1

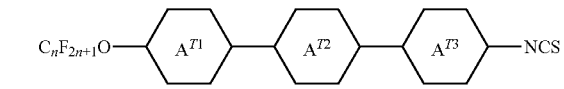

n is 1, 2, 3, 4, 5, 6, or 7, and

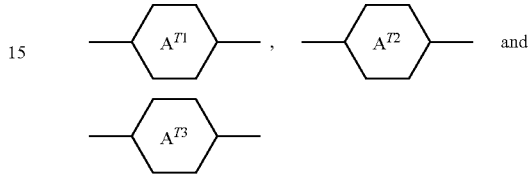

are as defined for the compound of formula T.

3. The liquid-crystal medium according to claim 2, wherein the one or more compounds of formula T are represented by one or more compounds of formula T-1 in which n is 1.

4. The liquid-crystal medium according to claim 1, wherein the one or more compounds of formula I are represented by one or more compounds of formulae I-1 to I-5

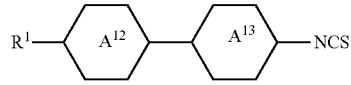

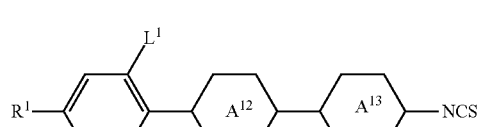

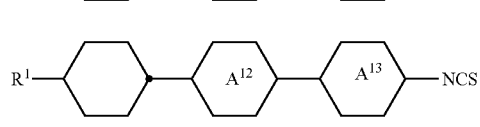

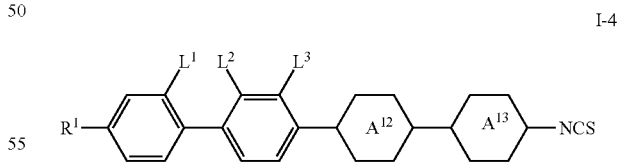

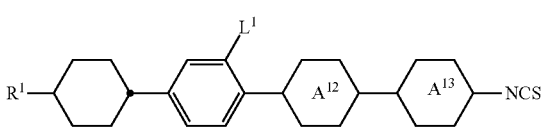

in which $L^1$, $L^2$ and $L^3$ on each occurrence, identically or differently, denote H or F, and $R^1$,

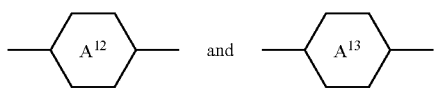 and have the meanings given in formula I.

5. The liquid-crystal medium according to claim 1, wherein the one or more compounds of formula II are represented by one or more compounds of formulae II-1 or II-3

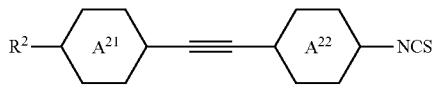  II-1

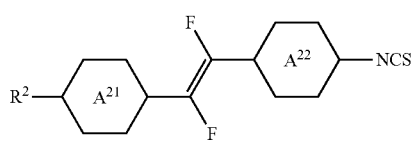  II-3 in which
$R^2$,

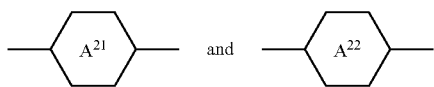 and have the meanings given in formula II.

6. The liquid-crystal medium according to claim 5, wherein the one or more compounds of formula II are represented by one or more compounds of formula II-1, and wherein the one or more compounds of formula II-1 are present in the liquid-crystal medium in a total concentration of 25% or less.

7. The liquid-crystal medium according to claim 1, which further comprises one or more compounds of formulae III-1 to III-6, in addition to the one or more compounds of formula III-1b,

III-1

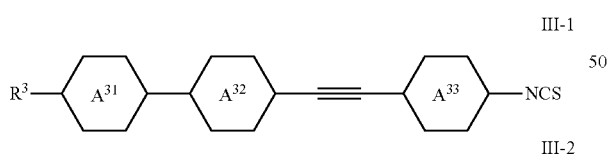

III-2

III-3

III-4

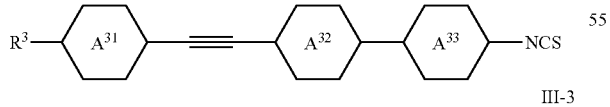
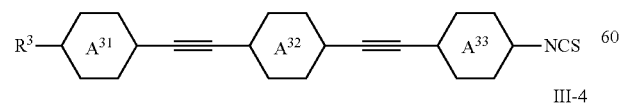
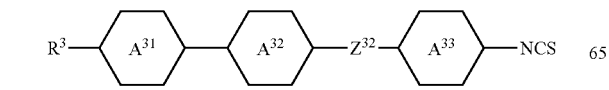

III-5

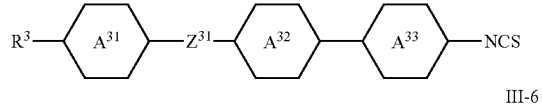

III-6

in which
$R^3$ denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more $CH_2$-groups are optionally replaced by

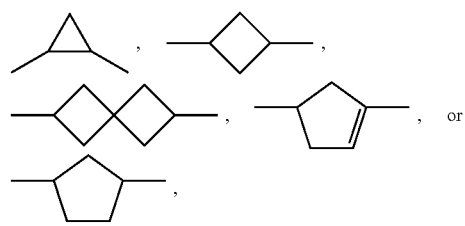

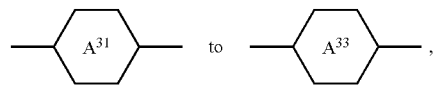

independently of one another, denote

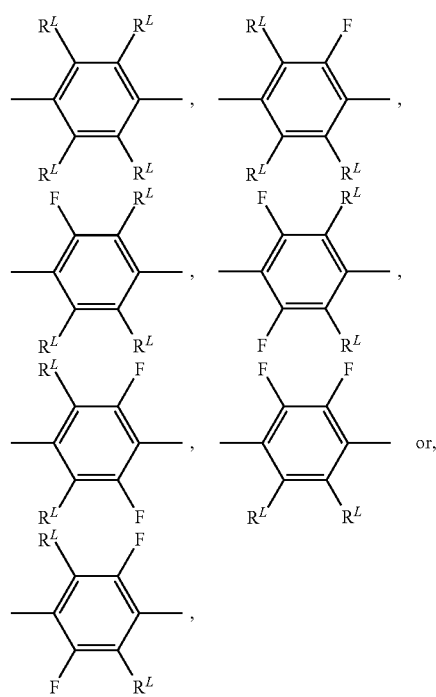

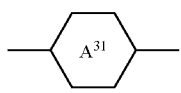

denotes

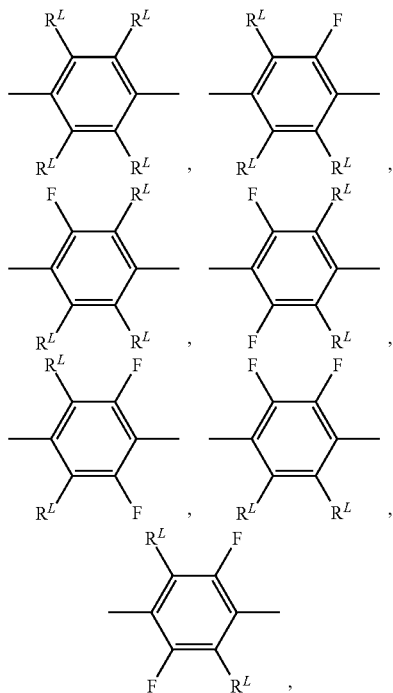

$Z^{31}$ and $Z^{32}$ independently of one another, denote trans-CH=CH— or trans-CF=CF—, and in formula III-6 alternatively one of $Z^{31}$ and $Z^{32}$ may denote —C≡C—.

8. The liquid-crystal medium according to claim 1, wherein the one or more compounds of formula T are represented by one or more compounds of formula T-1 and/or T-2, and wherein the one or more compounds of formula T-1 and/or T-2 are present in the liquid-crystal medium in a total concentration of 5% to 30%

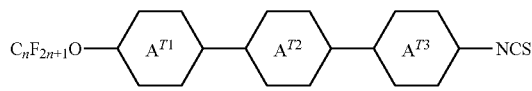
T-1

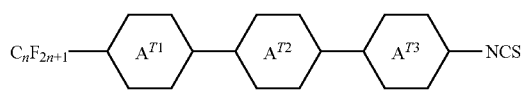
T-2 in which

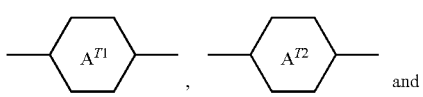

-continued

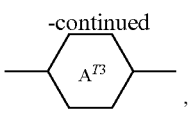

on each occurrence, independently of one another, denote

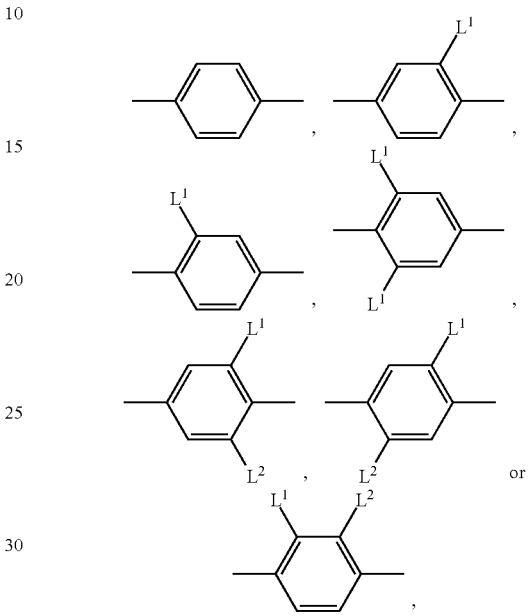

$L^1$ and $L^2$ identically or differently, denote F, Cl or methyl, and n is 1, 2, 3, 4, 5, 6, or 7.

9. The liquid-crystal medium according to claim 8, wherein the one or more compounds of formula T are represented by one or more compounds of formula T-1, and wherein the one or more compounds of formula T-1 are present in the liquid-crystal medium in a total concentration of 5% to 30%.

10. The liquid-crystal medium according to claim 1, which additionally comprises one or more chiral compounds.

11. The liquid-crystal medium according to claim 1, which comprises compound PPU-TO-S

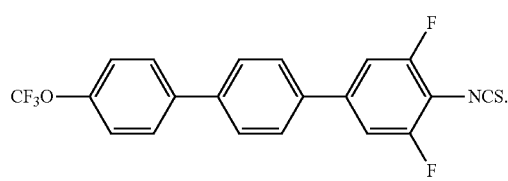
PPU-TO-S

12. A component for high-frequency technology, comprising the liquid crystal medium according to claim 1 in said component for high-frequency technology.

13. A component for high-frequency technology, comprising the liquid crystal medium according to claim 1 in said component for high-frequency technology, which component for high-frequency technology is suitable for operation in the microwave range.

14. A component for high-frequency technology, comprising the liquid crystal medium according to claim 1 in said component for high-frequency technology, which A component for high-frequency technology, comprising the liquid crystal medium according to claim 1 in said component for high-frequency technology is a liquid-crystal based antenna element, a phase shifter, a tunable filter, a tunable metamaterial structure, a matching network or a varactor.

15. A microwave antenna array, comprising one or more components according to claim 12 in said microwave antenna array.

16. A process for the preparation of the liquid-crystal medium according to claim 1, comprising mixing one or more compounds of formula T with one or more compounds of formula I, II and III-1b, and optionally with one or more additional mesogenic or chiral compounds.

17. The liquid-crystal medium according to claim 1, wherein in a compound of formula I or II, at least one group $R^L$ is alkyl having 1 to 6 C atoms.

18. The liquid-crystal medium according to claim 8, wherein the one or more compounds of formula T are represented by one or more compounds of formula T-2.

19. The liquid-crystal medium according to claim 1, further comprising a stabilizer

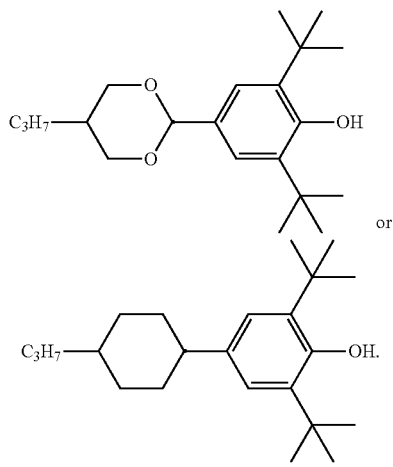

20. A component for high-frequency technology, comprising a liquid crystal medium, which medium comprises in said component for high-frequency technology one or more compounds of formula T

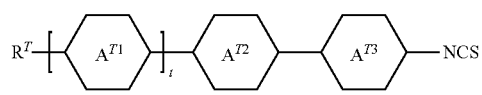
T in which
$R^T$ denotes halogen, CN, NCS, $R^F$, $R^F$—O— or $R^F$—S—,
$R^F$ denotes fluorinated alkyl having 1 to 12 C atoms or fluorinated alkenyl having 2 to 12 C atoms,

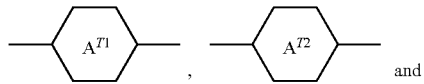

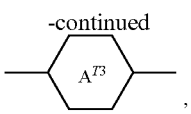

on each occurrence, independently of one another, denote

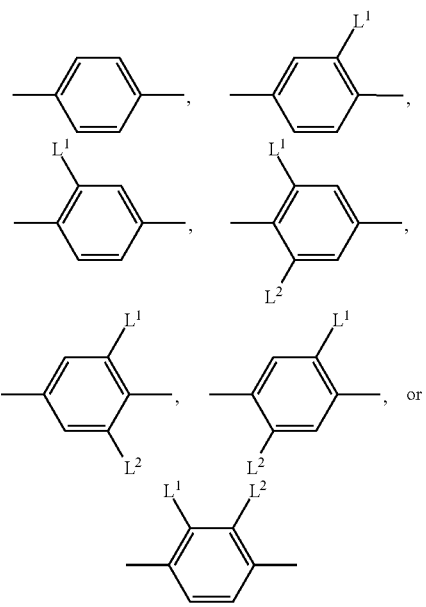

$L^1$ and $L^2$ identically or differently, denote F, Cl or methyl, and
t is 0, 1 or 2,
and
one or more compounds of formulae I, II and/or III,

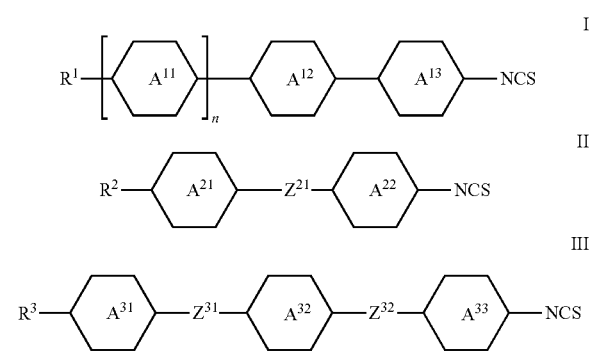

in which
$R^1$ denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more $CH_2$-groups are optionally replaced by

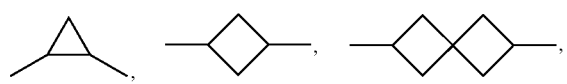

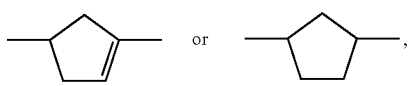

n is 0, 1 or 2,

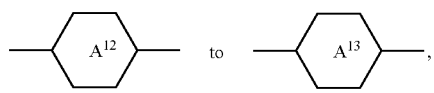

on each occurrence, independently of one another, denote

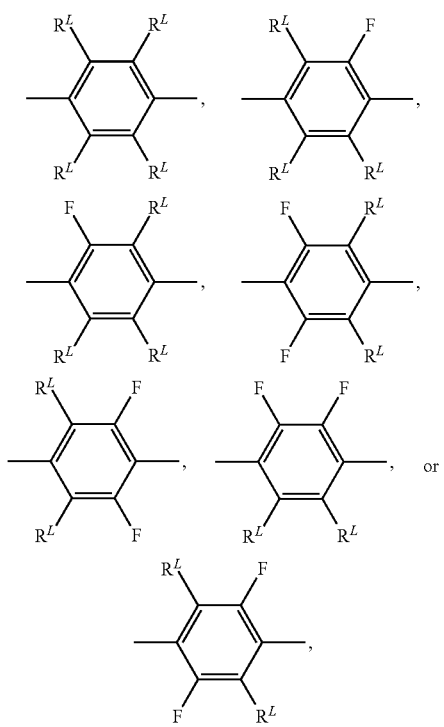

denotes

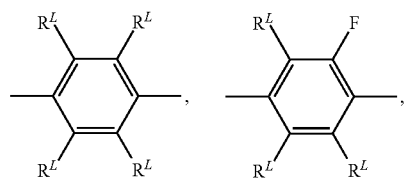

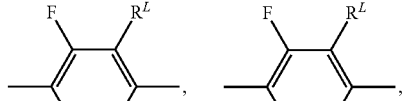

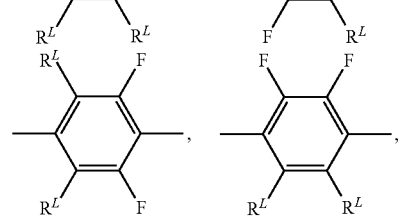

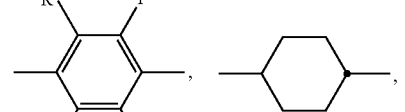

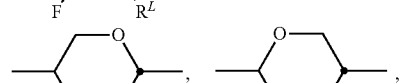

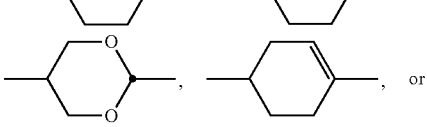

$R^2$ denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more $CH_2$-groups are optionally replaced by

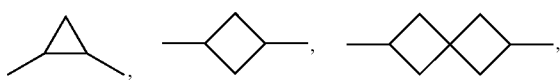

$Z^{21}$ denotes trans-CH=CH—, trans-CF=CF— or —C≡C—, and

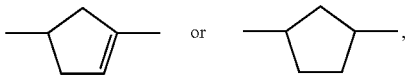

independently of one another, denote

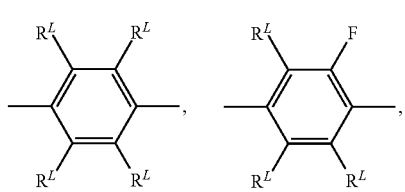

-continued

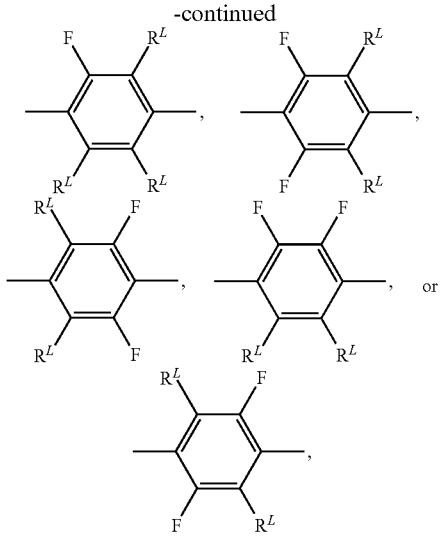

$R^L$ on each occurrence identically or differently, denotes H or alkyl having 1 to 6 C atoms, $R^3$ denotes H, unfluorinated alkyl or unfluorinated alkoxy having 1 to 17 C atoms, or unfluorinated alkenyl, unfluorinated alkenyloxy or unfluorinated alkoxyalkyl having 2 to 15 C atoms, in which one or more $CH_2$- groups are optionally replaced by

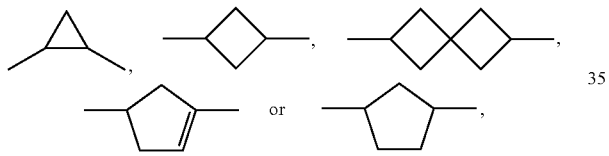

one of $Z^{31}$ and $Z^{32}$ denotes trans-CH=CH—, trans-CF=CF— or —C≡C— and the other one, independently thereof, denotes —C≡C—, trans-CH=CH—, trans-CF=CF— or a single bond, and

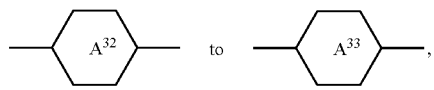

independently of one another, denote

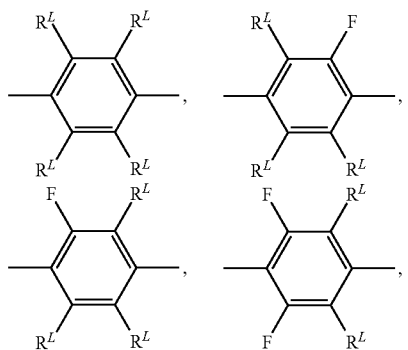

-continued

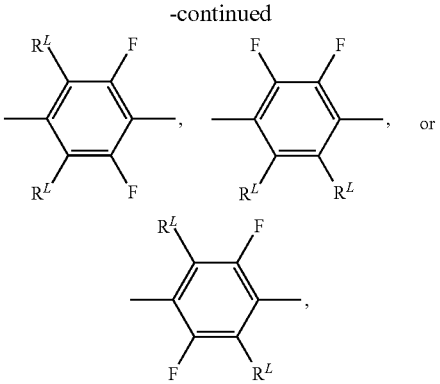

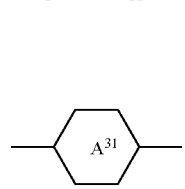

denotes

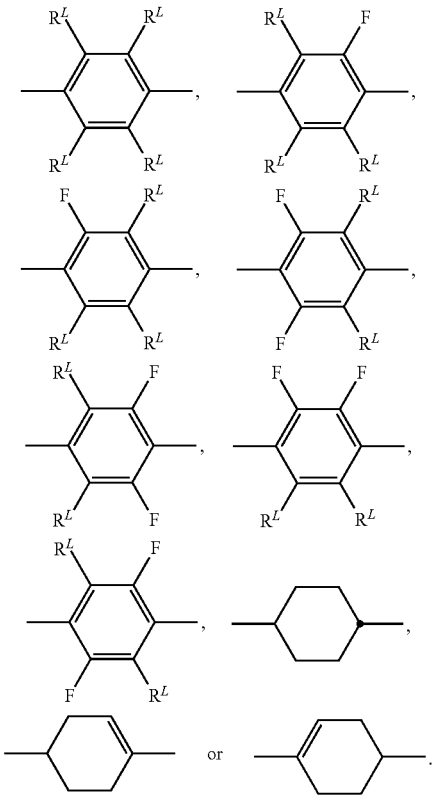

21. The component according to claim 20, which component for high-frequency technology is suitable for operation in the microwave range.

22. The component according to claim 20, which component for high-frequency technology is a liquid-crystal based antenna element, a phase shifter, a tunable filter, a tunable metamaterial structure, a matching network or a varactor.

23. A microwave antenna array, comprising one or more components according to claim 20 in said microwave antenna array.

\* \* \* \* \*